US011180644B2

(12) United States Patent
Cheng et al.

(10) Patent No.: US 11,180,644 B2
(45) Date of Patent: *Nov. 23, 2021

(54) MODIFIED POLYETHYLENE COMPOSITIONS WITH ENHANCED MELT STRENGTH

(71) Applicant: ExxonMobil Chemical Patents Inc., Baytown, TX (US)

(72) Inventors: Jianya Cheng, Kingwood, TX (US); Pradeep P. Shirodkar, McKinney, TX (US); Peijun Jiang, Katy, TX (US); Johannes M. Soulages, Basking Ridge, NJ (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 252 days.

This patent is subject to a terminal disclaimer.

(21) Appl. No.: 16/502,256

(22) Filed: Jul. 3, 2019

(65) Prior Publication Data

US 2019/0322848 A1 Oct. 24, 2019

Related U.S. Application Data

(60) Division of application No. 15/080,000, filed on Mar. 24, 2016, now abandoned, which is a division of
(Continued)

(51) Int. Cl.
*C08L 23/08* (2006.01)
*C08L 23/06* (2006.01)
(Continued)

(52) U.S. Cl.
CPC ............ *C08L 23/06* (2013.01); *C08F 210/18* (2013.01); *C08F 236/20* (2013.01); *C08J 5/18* (2013.01);
(Continued)

(58) Field of Classification Search
CPC ...... C08L 2207/07; C08L 23/06; C08L 23/08; C08L 23/0807; C08L 23/083;
(Continued)

(56) References Cited

U.S. PATENT DOCUMENTS 5,670,595 A 9/1997 Meka et al.
5,763,533 A 6/1998 Dharmarajan et al.
(Continued)

FOREIGN PATENT DOCUMENTS

EP 0 533 493 3/1993
EP 1 066 957 1/2001
(Continued)

OTHER PUBLICATIONS

Burfield et al., "DSC Studies of Tactic Polypropylenes: The Correlation of Sterochemistry with Thermal Properties," Journal of Applied Polymer Science, 1990, vol. 41, pp. 1095-1114.
(Continued)

*Primary Examiner* — Ling Siu Choi
*Assistant Examiner* — David L Miller
(74) *Attorney, Agent, or Firm* — ExxonMobil Chemical Patents Inc.—Law Department

(57) ABSTRACT

The present invention relates to a branched modifier and a composition comprising more than 25 wt % (based on the weight of the composition) of one or more linear ethylene polymers having a $g'_{vis}$ of 0.97 or more and an Mw of 20,000 g/mol or more and at least 0.1 wt % of a branched modifier where the modifier has a) a $g'_{vis}$ of 0.70 or less; b) an Mw of 100,000 g/mol or more; c) an Mw/Mn of 4.0 or more; d) a shear thinning ratio of 110 or more, e) a melt strength of 10 cN or more; f) a complex viscosity at 0.1 rad/sec at 190° C. of at least 130,000 Pa·s; and g) a phase angle of Z° or less where $Z=138.3G^{*(-0.142)}$, where $G^*$ is the complex modulus reported in Pascals measured at 190° C. and the phase angle
(Continued)

units are reported in degrees, wherein the G* is from 1,000 to 1,000,000 Pa.

16 Claims, 4 Drawing Sheets

Related U.S. Application Data application No. 13/800,098, filed on Mar. 13, 2013, now abandoned, which is a continuation-in-part of application No. 13/623,242, filed on Sep. 20, 2012, now Pat. No. 9,580,533.

(60) Provisional application No. 61/538,703, filed on Sep. 23, 2011.

(51) Int. Cl.
    *C08F 236/20*     (2006.01)
    *C08F 210/18*     (2006.01)
    *C08J 5/18*     (2006.01)
    *C08L 9/00*     (2006.01)

(52) U.S. Cl.
CPC ............ *C08L 9/00* (2013.01); *C08L 23/0815* (2013.01); *C08J 2323/06* (2013.01); *C08J 2323/08* (2013.01); *C08J 2423/08* (2013.01); *C08L 23/08* (2013.01); *C08L 23/083* (2013.01); *C08L 23/0807* (2013.01); *C08L 23/0823* (2013.01); *C08L 2205/02* (2013.01); *C08L 2207/07* (2013.01)

(58) Field of Classification Search
CPC ............ C08L 23/0815; C08L 23/0823; C08F 210/18; C08F 236/20
See application file for complete search history.

(56) References Cited

U.S. PATENT DOCUMENTS

| | | | |
|---|---|---|---|
| 6,114,457 A | 9/2000 | Markel et al. | |
| 6,147,180 A | 11/2000 | Markel et al. | |
| 6,300,451 B1 | 10/2001 | Mehta et al. | |
| 6,355,757 B2 | 3/2002 | Garcia-Franco et al. | |
| 6,391,998 B1 | 5/2002 | Garcia-Franco et al. | |
| 6,417,281 B1 | 7/2002 | Garcia-Franco et al. | |
| 6,509,431 B1 | 1/2003 | Duttweiler et al. | |
| 6,734,265 B1 | 5/2004 | Dekmezian et al. | |
| 6,870,010 B1 | 3/2005 | Lue et al. | |
| 7,511,106 B2 | 3/2009 | Ravishankar | |
| 7,687,580 B2 | 3/2010 | Lohse et al. | |
| 7,750,080 B2 | 7/2010 | Pehlert | |
| 7,985,804 B2 | 7/2011 | Fiscus et al. | |
| 9,321,911 B2 * | 4/2016 | Shirodkar | C08L 23/06 |
| 9,340,664 B2 * | 5/2016 | Shirodkar | B32B 5/00 |
| 10,563,027 B2 * | 2/2020 | Cheng | B29C 48/913 |
| 10,822,479 B2 * | 11/2020 | Shirodkar | C08F 210/18 |
| 10,836,853 B2 * | 11/2020 | Cheng | C08F 210/18 |
| 2002/0150757 A1 | 10/2002 | Luigi et al. | |
| 2004/0106738 A1 | 6/2004 | Machida et al. | |
| 2004/0118592 A1 | 6/2004 | Pehlert | |
| 2006/0178478 A1 | 8/2006 | Ellul | |
| 2007/0060016 A1 | 11/2007 | Best et al. | |
| 2008/0033112 A1 | 2/2008 | Squire et al. | |
| 2011/0118420 A1 | 5/2011 | Lohse et al. | |
| 2013/0090433 A1 | 4/2013 | Jiang et al. | |

FOREIGN PATENT DOCUMENTS

| | | |
|---|---|---|
| WO | 91/15365 | 10/1991 |
| WO | 97/19965 | 6/1997 |
| WO | 98/56012 | 12/1998 |
| WO | 99/07788 | 2/1999 |
| WO | 00/01766 | 1/2000 |
| WO | 00/69963 | 11/2000 |
| WO | 01/62808 | 8/2001 |
| WO | 02/085954 | 10/2002 |
| WO | 03/040202 | 5/2003 |
| WO | 2007/067307 | 6/2007 |
| WO | 2007/136494 | 11/2007 |
| WO | 2009/059781 | 5/2009 |
| WO | 2010/075111 | 7/2010 |
| WO | 2011/085375 | 7/2011 |
| WO | 2011/085379 | 7/2011 |

OTHER PUBLICATIONS

Guzman et al., "Simple Model to Predict Gel Formation in Olefin-Diene Copolymerizations Catalyzed by Constrained-Geometry Complexes," AIChE Journal, 2010, vol. 56, No. 5, pp. 1325-1333.

Liu et al., "Characterization of stress-whitening of tensile yielded isotactic polypropylene," Polymer, 1997, vol. 38, No. 11, pp. 2797-2805.

Naga et al., "Copolymerization of Ethylene and 1,7-Octadiene, 1,9-Decadiene with Zirconocene Catalysts," 2002, Macromolecular Chemistry and Physics, vol. 203, No. 15, pp. 2155-2162.

* cited by examiner

MODIFIED POLYETHYLENE COMPOSITIONS WITH ENHANCED MELT STRENGTH

CROSS-REFERENCE TO RELATED APPLICATIONS

This application is a divisional of U.S. application Ser. No. 15/408,040,000, filed Mar. 24, 2016, which was a Divisional application of U.S. Ser. No. 13/800,098, filed. Mar. 13, 2013, which was a continuation-in-part of U.S. application Ser. No. 13/623,242, filed Sep. 20, 2012, which claims the benefit of and priority to U.S. Application No. 61/538,703, filed Sep. 23, 2011.

FIELD OF THE INVENTION

The present invention relates to branched modifiers, and polyethylene compositions comprising an ethylene based polymer and a branched modifier. More particularly, the present invention relates to polyethylene compositions having significantly improved properties such as melt strength or extensional strain hardening, without substantial loss in mechanical properties.

BACKGROUND OF THE INVENTION

For many polyolefin applications, including films and fibers, increased melt strength and good optical properties are desirable attributes. Higher melt strength allows fabricators to run their blown film lines at a faster rate. It also allows them to handle thicker films in applications such as geomembranes.

Typical metallocene catalyzed polyethylenes (mPE) are somewhat more difficult to process than low-density polyethylenes (LDPE) made in a high-pressure polymerization process. Generally, mPEs (which tend to have narrow molecular weight distributions and low levels of branching) require more motor power and produce higher extruder pressures to match the extrusion rate of LDPEs. Typical mPEs also have lower melt strength which, for example, adversely affects bubble stability during blown film extrusion, and are prone to melt fracture at commercial shear rates. On the other hand, mPEs exhibit superior physical properties as compared to LDPEs. In the past, various levels of LDPE have been blended with the mPE to increase melt strength, to increase shear sensitivity, i.e. to increase flow at commercial shear rates in extruders; and to reduce the tendency to melt fracture. However, these blends generally have poor mechanical properties as compared with neat mPE. It has been a challenge to improve mPEs processability without sacrificing physical properties.

U.S. Publication No. 2007/0260016 discloses blends of linear low density polyethylene copolymers with other linear low density polyethylenes or very low density, low density, medium density, high density, and differentiated polyethylenes, as well as articles produced therefrom. U.S. Publication No. 2007/0260016 does not appear to disclose means to obtain a balance of improved processability and physical properties.

Guzman, et al., *AIChE Journal*, May 2010, Vol. 56, No. 5, p. 1325-1333 discloses ethylene/octene/1,9-decadiene copolymers and a method to predict gel formation in the production thereof. The publication is silent on the technical features that would be needed to make the decadiene terpolymer suitable for providing the optimum balance of processability and physical properties.

U.S. Pat. No. 6,300,451 discloses ethylene/butene/1,9-decadiene copolymers, and ethylene hexene vinyl norbornene copolymers (see Tables I and II). The decadiene terpolymers disclosed are designed to be used alone and not in blends for improved processability/property balance. The relatively high MI of the resins suggests that they would not be suitable in blends which exhibit improved extensional strain hardening.

U.S. Pat. No. 5,670,595 discloses diene modified polymers, particularly diene modified propylene polymers that would not be suitable for modification of polyethylene based polymers due to their incompatibility.

U.S. Pat. No. 6,509,431 discloses ethylene/hexene/1,9 decadiene copolymers. The low melt index ratio of the disclosed polymers suggests that they would not be suitable for rheology modification (increased strain hardening) of the base linear polyethylene.

Other references of interest include: U.S. Pat. Nos. 7,687,580; 6,355,757; 6,391,998; 6,417,281; 6,114,457; 6,734,265; 6,147,180; and PCT Publication Nos. WO 2007/067307; WO 2002/085954.

We have discovered that certain branched hydrocarbon modifiers, preferably comprising dienes, will advantageously improve processability of polyethylene without significantly impacting its mechanical properties. Moreover, addition of these branched hydrocarbon modifiers provides a means to change such properties on a continuous scale, based on real-time needs, which is typically not possible due to the availability of only discrete polyethylene grades. Furthermore, a different set of relationships between processability and properties is obtained, compared to those available from traditional polyethylenes and their blends with conventional LDPE, which allows for new and advantageous properties of the fabricated articles.

SUMMARY OF THE INVENTION

This invention relates to branched polyethylene modifiers comprising at least 50 mol % ethylene, one or more $C_4$ (preferably $C_6$) to $C_{40}$ comonomers, and a polyene having at least two polymerizable bonds, wherein said branched polyethylene modifier: a) has a $g'_{vis}$ of 0.70 or less; b) has an Mw of 100,000 g/mol or more; c) has an Mw/Mn of 4.0 or more; d) a shear thinning ratio of 110 or more; e) melt strength of 10 cN or more, f) a complex viscosity at 0.1 rad/sec at 190° C. of at least 130,000 Pa·s; and g) has a phase angle of Z° or less where $Z=138.3G^{*(-0.142)}$, where $G^*$ is the complex modulus reported in Pascals measured at 190° C. and the phase angle units are reported in degrees, wherein the $G^*$ is from 1,000 to 1,000,000 Pa.

This invention further relates to polyethylene compositions comprising one or more ethylene polymers and one or more branched polyethylene modifiers where the modifier has a complex viscosity ratio of Y or more, where $Y-0.27 \cdot \text{Log } \eta^*_{matrix}+1.4$, the complex viscosity ratio is defined to be, $(\text{Log } \eta^*_{modifier}-\text{Log } \eta^*_{matrix})/\text{Log } \eta^*_{matrix}$, and $\eta^*_{modifier}$ is the complex viscosity of the modifier measured at 0.1 rad/sec and 190° C., $\eta^*_{matrix}$ is the complex viscosity of the ethylene polymer measured at 0.1 rad/sec and 190° C.

This invention also relates to a blend comprising:
1) branched polyethylene modifier comprising at least 50 mol % ethylene, one or more $C_4$ (preferably $C_6$) to $C_{40}$ comonomers, and a polyene having at least two polymerizable bonds, wherein said branched polyethylene modifier has: a) a $g'_{vis}$ of 0.70 or less; b) an Mw of 100,000 g/mol or more; c) an Mw/Mn of 4.0 or more; d) a shear thinning ratio of 110 or more, e) a melt strength of 10 cN or more; f) a complex viscosity at 0.1 rad/sec at 190° C. of at least 130,000 Pa·s; g) a phase angle of Z° or less where $Z=138.3G^{*(-0.142)}$, where G* is the complex modulus reported in Pascals measured at 190° C. and the phase angle units are reported in degrees, wherein the G* is from 1,000 to 1,000,000 Pa, wherein the G* is from 1,000 to 1,000,000 Pa; and h) a complex viscosity ratio of Y or more, where $Y=-0.27*(\text{Log }\eta^*_{matrix})+1.4$, and the complex viscosity ratio is defined to be (Log $\eta^*_{modifier}$ minus Log $\eta^*_{matrix}$) divided by (Log $\eta^*_{matrix}$), wherein $\eta^*_{modifier}$ is the complex viscosity of the modifier measured at 0.1 rad/sec and 190° C., and $\eta^*_{matrix}$ is the complex viscosity of the polyethylene of step 2) below measured at 0.1 rad/sec and 190° C., complex viscosity is measured as described below and is reported in units of Pa·s;

2) polyethylene having a density of 0.88 g/cm³ or more and an Mw of 20,000 g/mol or more; wherein the melt strength ratio is Q or more, where $Q=0.0805[(\eta^*_{modifier}-\eta^*_{matrix})/(\eta^*_{matrix})]+0.5$, wherein $\eta^*_{modifier}$ is the complex viscosity of the modifier measured at 0.158 rad/sec and 190° C., and $\eta^*_{matrix}$ is the complex viscosity of the polyethylene measured at 0.158 rad/sec and 190° C.; and the melt strength ratio is defined to be [(MS$_{blend}$-MS$_{matrix}$)/(MS$_{matrix}$)], where MS$_{blend}$ is the melt strength of the blend, MS$_{matrix}$ is the melt strength of the polyethylene, melt strength is reported in cN and measured according to the procedure in the Test Methods section below.

This invention also relates to a polyethylene composition comprising one or more ethylene polymers having a density of 0.88 g/cc or more, a g'$_{vis}$ of 0.97 or more, and an Mw of 20,000 g/mol or more, and one or more branched polyethylene modifiers where the modifier has a complex viscosity ratio of Y or more, where Y−0.27·Log $\eta^*_{matrix}$+1.4, the complex viscosity ratio is defined to be (Log $\eta^*_{modifier}$−Log $\eta^*_{matrix}$)/Log $\eta^*_{matrix}$, and $\eta^*_{modifier}$ is the complex viscosity of the modifier measured at 0.1 rad/sec and 190° C., $\eta^*_{matrix}$ is the complex viscosity of the ethylene polymer measured at 0.1 rad/sec and 190° C.

DEFINITIONS

Figure 1:
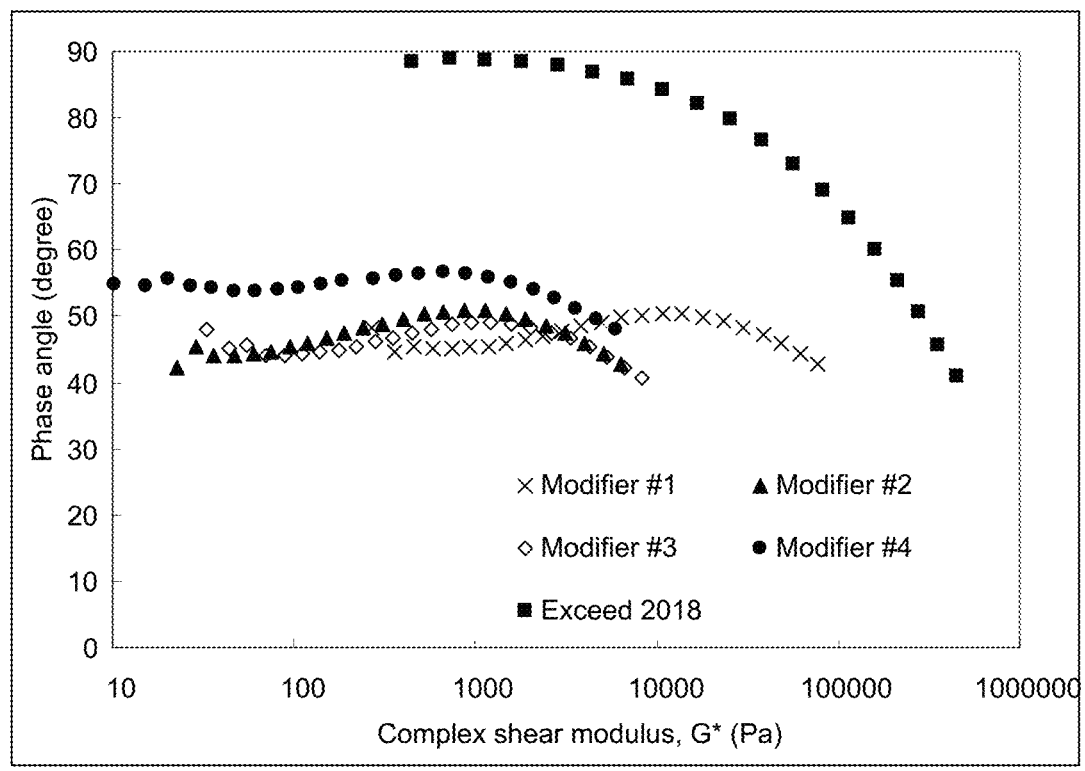
FIG. 1 is a Van Gurp-Palmen plot (phase angle vs. complex shear modulus) of the branched polyethylene modifiers produced in Examples 1 to 4 and Exceed™ 2018 polyethylene.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, including, but not limited to ethylene, hexene, and diene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. The term "different" as used to refer to mer units indicates that the mer units differ from each other by at least one atom or are different isomerically. Accordingly, the definition of copolymer, as used herein, includes terpolymers and the like. Likewise, the definition of polymer, as used herein, includes copolymers and the like. Thus, as used herein, the terms "polyethylene," "ethylene polymer," "ethylene copolymer," and "ethylene based polymer" mean a polymer or copolymer comprising at least 50 mol % ethylene units (preferably at least 70 mol % ethylene units, more preferably at least 80 mol % ethylene units, even more preferably at least 90 mol % ethylene units, even more preferably at least 95 mol % ethylene units or 100 mol % ethylene units (in the case of a homopolymer)). Furthermore, the term "polyethylene composition" means a blend containing one or more polyethylene components.

For purposes of this invention and the claims thereto, an ethylene polymer having a density of 0.86 g/cm³ or less is referred to as an ethylene elastomer or elastomer; an ethylene polymer having a density of more than 0.86 to less than 0.910 g/cm³ is referred to as an ethylene plastomer or plastomer; an ethylene polymer having a density of 0.910 to 0.940 g/cm³ is referred to as a low density polyethylene; and an ethylene polymer having a density of more than 0.940 g/cm³ is referred to as a high density polyethylene (HDPE). For these definitions, density is determined using the method described under Test Methods below.

Polyethylene in an overlapping density range, i.e. 0.890 to 0.930 g/cm³, typically from 0.915 to 0.930 g/cm³, which is linear and does not contain long chain branching is referred to as "linear low density polyethylene" (LLDPE) and can be produced with conventional Ziegler-Natta catalysts, vanadium catalysts, or with metallocene catalysts in gas phase reactors and/or in slurry reactors and/or with any of the disclosed catalysts in solution reactors. "Linear" means that the polyethylene has no long chain branches, typically referred to as a g'$_{vis}$ of 0.97 or above, preferably 0.98 or above.

Composition Distribution Breadth Index (CDBI) is a measure of the composition distribution of monomer within the polymer chains and is measured by the procedure described in PCT Publication No. WO 93/03093, published Feb. 18, 1993, specifically columns 7 and 8 as well as in Wild et al, *J. Poly. Sci.*, Poly. Phys. Ed., Vol. 20, p. 441 (1982) and U.S. Pat. No. 5,008,204, including that fractions having a weight average molecular weight (Mw) below 15,000 are ignored when determining CDBI.

DETAILED DESCRIPTION OF THE INVENTION

This invention relates to a branched polyethylene modifier comprising at least 50 mol % ethylene (preferably at least 70 mol % or more, preferably at least 90 mol % or more), one or more $C_4$ (preferably $C_6$) to $C_{40}$ comonomers (preferably 50 mol % or less, preferably 30 mol % or less, preferably from 0.5 to 30 mol %, preferably 1 to 25 mol %), and a polyene having at least two polymerizable bonds (preferably from 0.001 to 10 mol %, preferably from 0.01 to 5 mol %), wherein said branched polyethylene modifier has: a) a $g'_{vis}$ of 0.70 or less (preferably 0.65 or less, preferably 0.60 or less, preferably 0.55 or less, preferably 0.50 or less); b) an Mw of 100,000 g/mol or more, (preferably 120,000 or more, preferably 150,000 or more, preferably 200,000 or more); c) an Mw/Mn of 4.0 or more (preferably 4.5 or more, preferably 5.0 or more, preferably 6.0 or more, preferably 7.0 or more, preferably 8.0 or more, preferably 9.0 or more, preferably from 4.0 to 40); d) a shear thinning ratio of 110 or more (preferably 120 or more, preferably 130 or more, preferably 140 or more, preferably 150 or more, preferably from 110 to 300), e) a melt strength of 10 cN or more (preferably 15 or more, preferably 20 or more, preferably 25 or more, preferably 30 or more); f) a complex viscosity at 0.1 rad/sec at 190° C. of at least 130,000 Pa·s (preferably 150,000 or more, preferably 200,000 or more, preferably 250,000 or more, preferably 300,000 or more, preferably 400,000 or more, preferably 500,000 or more); and g) a phase angle of Z° or less where $Z=138.3G^{*(-0.142)}$, where G* is the complex modulus reported in Pascals measured at 190° C. and the phase angle units are reported in degrees, wherein the G* is from 1,000 to 1,000,000 Pa (preferably $Z=138.3G^{*(-0.142)}-2$, preferably $Z=138.3G^{*(-0.142)}-5$).

This invention relates to polyethylene compositions, preferably polyethylene blends, comprising one or more ethylene polymers and one or more branched modifiers (also referred to as a branched modifier polymer or branched polyethylene modifier), preferably comprising long chain branched polyethylene polymers.

This invention further relates to a composition comprising more than 25 wt % (based on the weight of the composition) of one or more ethylene polymers having a $g'_{vis}$ of 0.97 or more and an Mw of 20,000 g/mole or more, and at least 0.1 wt % (based on the weight of the composition) of a branched polyethylene modifier where the modifier has a) a $g'_{vis}$ of 0.70 or less; b) an Mw of 100,000 g/mol or more; c) an Mw/Mn of 4.0 or more; d) a shear thinning ratio of 110 or more, e) melt strength of 10 cN or more; f) a complex viscosity at 0.1 rad/sec at 190° C. of at least 130,000 Pa·s; g) a phase angle of Z° or less where $Z=138.3G^{*(-0.142)}$ where G* is the complex modulus reported in Pascals measured at 190° C. and the phase angle units are reported in degrees, wherein the G* is from 1,000 to 1,000,000 Pa, and h) a complex viscosity ratio of Y or more, where $Y=-0.27 \cdot \text{Log } \eta_{matrix}+1.4$, and the complex viscosity ratio is defined to be, $$(\text{Log } \eta^*_{modifier}-\text{Log } \eta^*_{matrix})/\text{Log } \eta^*_{matrix},$$

wherein $\eta^*_{modifier}$ is the complex viscosity of the modifier measured at 0.1 rad/sec and 190° C., and $\eta^*_{matrix}$ is the complex viscosity of the polyethylene measured at 0.1 rad/sec and 190° C.; wherein the melt strength ratio is Q or more, where $Q=0.0805[(\eta^*_{modifier}-\eta^*_{matrix})/(\eta^*_{matrix})]+0.5$, wherein $\eta^*_{modifier}$ is the complex viscosity of the modifier measured at 0.158 rad/sec and 190° C., and $\eta^*_{matrix}$ is the complex viscosity of the polyethylene measured at 0.158 rad/sec and 190° C.; and the melt strength ratio is defined to be $[(MS_{blend}-MS_{matrix})/(MS_{matrix})]$, where $MS_{blend}$ is the melt strength of the composition, $MS_{matrix}$ is the melt strength of the polyethylene, melt strength is reported in cN and measured according to the procedure in the Test Methods section below.

In another embodiment, the ratio of the complex viscosity of the branched modifier to the complex viscosity of the ethylene polymer component in the blend composition (i.e. $\eta^*\text{modifier}/(\eta^*_{matrix})$ is greater than 3 (preferably greater than 3.5, preferably greater than 5, preferably greater than 10, preferably greater than 15, preferably greater than 20, preferably greater than 25, preferably greater than 30) when the complex viscosity is measured at a frequency of 100 rad/sec and a temperature of 190° C. according to the procedure described in the Test Methods section below.

In another embodiment, this invention further relates to a composition comprising:

1) from 99.99 wt % to 50 wt % (preferably from 75 wt % to 99.9 wt %, preferably from 90 wt % to 99.9 wt %, preferably from 95 wt % to 99.5 wt %, preferably from 96 wt % to 99.5 wt %, preferably from 97 wt % to 99.5 wt %, preferably from 98 wt % to 99 wt %), based upon the weight of the blend, of a linear ethylene polymer having:

a) a branching index, $g'_{vis}$, (determined according the procedure described in the Test Methods section below) of 0.97 or more, preferably 0.98 or more, preferably 0.99 or more; and b) a density of 0.860 to 0.980 g/cm³ (preferably from 0.880 to 0.940 g/cc, preferably from 0.900 to 0.935 g/cc, preferably from 0.910 to 0.930 g/cc);

c) an Mw of 20,000 g/mol or more (preferably 20,000 to 2,000,000 g/mol, preferably 30,000 to 1,000,000, more preferably 40,000 to 200,000, preferably 50,000 to 750, 000); and 2) from 0.01 wt % to 50 wt % (preferably from 0.1 wt % to 25 wt %, preferably from 0.1 wt % to 10 wt %, preferably from 0.5 wt % to 5 wt %, preferably from 0.5 wt % to 4 wt %, preferably from 0.5 wt % to 3 wt %, preferably from 1 wt % to 2 wt %), based upon the weight of the blend, of a branched modifier, preferably comprising a terpolymer of ethylene, a $C_4$ to $C_{20}$ alpha-olefin, and a diene, said modifier having:

i) a $g'_{vis}$ of less than 0.70 (preferably 0.65 or less, preferably 0.60 or less, preferably 0.55 or less, preferably 0.50 or less);

ii) a density of from about 0.850 to about 0.980 g/cm³ (preferably from 0.890 to about 0.980, preferably from 0.880 to 0.940 g/cc, preferably from 0.900 to 0.935 g/cc, preferably from 0.910 to 0.930 g/cc);

iii) a molecular weight distribution (Mw/Mn) of from about 2.5 to about 40 (alternately 4.0 to 40, alternately 5.0 to 40, alternately 6.0 to 30, alternately 7.0 to 20);

iv) an Mw of 100,000 g/mol or more, (preferably 120,000 or more, preferably 150,000 or more, preferably 200,000 or more);

v) a shear thinning ratio of 110 or more (preferably 120 or more, preferably 130 or more, preferably 140 or more, preferably 150 or more, preferably from 110 to 300), vi) a melt strength of 10 cN or more (preferably 15 or more, preferably 20 or more, preferably 25 or more, preferably 30 or more);

vii) a complex viscosity at 0.1 rad/sec at 190° C. of at least 130,000 Pa·s (preferably 150,000 or more, preferably 200, 000 or more, preferably 250,000 or more, preferably 300, 000 or more, preferably 400,000 or more, preferably 500, 000 or more);

viii) a phase angle of Z° or less where $Z=138.3G^{*(-0.142)}$, where G* is the complex modulus reported in Pascals measured at 190° C. and the phase angle units are reported in degrees, wherein the G* is from 1,000 to 1,000,000 Pa (preferably $Z=138.3G^{*(-0.142)}-2$, preferably $Z=138.3G^{*(-0.142)}-5$); and ix) a complex viscosity ratio of Y or more, where $Y=-0.27*(Log\ \eta^*_{matrix})+1.4$, and the complex viscosity ratio is defined to be $[(Log\ \eta^*_{modifier})$ minus $(Log\ \eta^*_{matrix})]$ divided by $(Log\ \eta^*_{matrix})$, wherein $\eta^*_{modifier}$ is the complex viscosity of the modifier measured at 0.1 rad/sec and 190° C., and $\eta^*_{matrix}$ is the complex viscosity of the linear polyethylene measured at 0.1 rad/sec and 190° C., preferably $Y=-0.28*(Log\ \eta^*_{matrix})+1.5$, preferably $Y=-0.2954*(Log\ \eta^*_{matrix})+1.6065$;

where the melt strength ratio is Q or more, where $Q=0.0805[(\eta^*_{modifier}$ minus $\eta^*_{matrix})$ divided by $(\eta^*_{matrix})]+0.5$, where $\eta^*_{modifier}$ is the complex viscosity of the modifier measured at 0.158 rad/sec and 190° C., and $\eta^*_{matrix}$ is the complex viscosity of the linear polyethylene measured at 0.158 rad/sec and 190° C.; and the melt strength ratio is defined to be $[(MS_{blend}$ minus $MS_{matrix})$ divided by $(MS_{matrix})]$, where $MS_{blend}$ is the melt strength of the composition, $MS_{matrix}$ is the melt strength of the linear polyethylene, melt strength is reported in cN and measured according to the procedure in the Test Methods section below, preferably $Q=0.0805[(\eta^*_{modifier}-\eta^*_{matrix})/(\eta^*_{matrix})]+0.75$, preferably $Q=0.0805[(\eta^*_{modifier}-\eta^*_{matrix})/(\eta^*_{matrix})]+1.0$, preferably $Q=0.0805[(\eta^*_{modifier}-\eta^*_{matrix})/(\eta^*_{matrix})]+1.4$, preferably $Q=0.0805[(\eta^*_{modifier}-\eta^*_{matrix})/(\eta^*_{matrix})]+1.4988$.

In any embodiment described herein the composition of linear PE and branched modifier has an elasticity ratio of Z* or more, where $Z^*=0.009*(\delta_{matrix})+0.05$, where the elasticity ratio is defined to be $[(\delta_{matrix}-\delta_{modifier})/(\delta_{matrix})]$, where $\delta_{matrix}$ is the phase angle of the linear polyethylene measured at a complex modulus of 100,000 Pa, $\delta_{modifier}$ is the phase angle of the branched modifier at a complex modulus of 100,000 Pa, where phase angle is determined as described below, preferably $Z^*=0.008*(\delta_{matrix})+0.14$, preferably $Z^*=0.0079*(\delta_{matrix})+0.1318$.

In any embodiment described herein the composition of linear PE and branched modifier blend has a melt strength ratio of T or more, where $T=0.1.6762[(\eta^*_{blend}$ minus $\eta^*_{matrix})$ divided by $(\eta^*_{matrix})]-5$, where $\eta^*_{blend}$ is the complex viscosity of the blend measured at 0.158 rad/sec and 190° C., and $\eta^*_{matrix}$ is the complex viscosity of the linear polyethylene measured at 0.158 rad/sec and 190° C.; and the ratio of melt strength to viscosity is defined to be $[(MS_{blend}$ minus $MS_{matrix})$ divided by $(MS_{matrix})]$, where $MS_{blend}$ is the melt strength of the composition, $MS_{matrix}$ is the melt strength of the linear polyethylene, melt strength is reported in cN and measured according to the procedure in the Test Methods section below, preferably $T=0.1.6762[(\eta^*_{blend}$ minus $\eta^*_{matrix})$ divided by $(\eta^*_{matrix})]+0$, preferably $T=0.1.6762[(\eta^*_{blend}$ minus $\eta^*_{matrix})$ divided by $(\eta^*_{matrix})]+5$, preferably $T=0.1.6762[(\eta^*_{blend}$ minus $\eta^*_{matrix})$ divided by $(\eta^*_{matrix})]+10$, preferably $T=0.1.6762[(\eta^*_{blend}$ minus $\eta^*_{matrix})$ divided by $(\eta^*_{matrix})]+15$, preferably $T=0.1.6762[(\eta^*_{blend}$ minus $\eta^*_{matrix})$ divided by $(\eta^*_{matrix})]+16.153$. Alternately T is equal to $2.1957[(\eta^*_{blend}$ minus $\eta^*_{matrix})$ divided by $(\eta^*_{matrix})]+30$, preferably $T=2.1957[(\eta^*_{blend}$ minus $\eta^*_{matrix})$ divided by $(\eta^*_{matrix})]+40$, preferably $T=2.1957[(\eta^*_{blend}$ minus $\eta^*_{matrix})$ divided by $(\eta^*_{matrix})]+50$, preferably $T=2.1957[(\eta^*_{blend}$ minus $\eta^*_{matrix})$ divided by $(\eta^*_{matrix})]+60$.

In another embodiment, the branched modifier has a composition distribution breadth index of at least 60% and/or a melt index (ASTM 1238, 190° C., 2.16 kg) of 15 dg/min or less.

In some embodiments, compositions include a polymer blend composed of an ethylene polymer and any of the branched modifier polymers described herein, preferably a metallocene-catalyzed branched modifier polymer. The ethylene polymer of the blend includes any of the ethylene polymers described herein, preferably, a metallocene-catalyzed ethylene polymer, including those produced in high pressure, gas phase, and/or slurry processes. In a preferred embodiment, the blends include at least 0.1 wt % and up to 99.9 wt % of the branched modifier polymer and at least 0.1 wt % and up to 99.9 wt % of the ethylene polymer, with these weight percents based on the total weight of the blend. Alternative lower limits of the branched modifier polymer can be 1%, 5%, 10%, 20%, 30%, or 40% by weight. Alternative upper limits of the branched modifier polymer can be 95%, 90%, 80%, 70%, or 60% by weight. Ranges from any lower limit to any upper limit are within the scope of the invention. Preferred blends include from 1 wt % to 85 wt %, alternatively from 2 wt % to 50 wt % or from 3 wt % to 30 wt % of the branched modifier polymer. In one embodiment, the balance of the weight percentage is the weight of the ethylene polymer component.

In one preferred embodiment, the polymer blend includes a metallocene-catalyzed branched modifier comprising units derived from ethylene, one or more $C_4$ to $C_{20}$ α-olefin comonomers and a polyene with at least two polymerizable bonds. The branched modifier has a comonomer (α-olefin+polyene) content of from about 2 wt % to about 20 wt % (based upon the weight of the copolymer), a composition distribution breadth index of at least 60%, a melt index (ASTM 1238, 190° C., 2.16 kg) of 15 dg/min or less, a density of from about 0.850 to about 0.980 g/cm³ (preferably from about 0.890 to about 0.980 g/cm³), and a molecular weight distribution (Mw/Mn) of from about 2.5 to about 40.

In another preferred embodiment, the polymer blends include branched polyethylene modifier comprising units derived from ethylene and polyenes.

In a preferred embodiment, this invention comprises a blend comprising:

a) any branched modifier described herein present at from 0.1 wt % to 99.5 wt %, (preferably 0.5 wt % to 20 wt %, preferably 0.75 wt % to 10 wt %, preferably 0.9 wt % to 5 wt %, preferably 1 wt % to 3 wt %, preferably 1 wt % to 2 wt %); and b) ethylene polymer having a $g'_{vis}$ of 0.97 or more, a CDBI of 60% or more and a density of 0.90 g/cc or more, wherein the ethylene polymer has a $g'_{vis}$ of at least 0.01 units higher than the $g'_{vis}$ of the branched modifier (preferably at least 0.02, preferably at least 0.03, preferably 0.04, preferably at least 0.05, preferably at least 0.1, preferably at least 0.2, preferably at least 0.3, preferably at least 0.4, preferably at least 0.5 units higher), preferably the ethylene polymer is present at from 99.9 wt % to 0.5 wt %, preferably 99.5 wt % to 80 wt %, preferably 99.25 wt % to 90 wt %, preferably 99.1 wt % to 95 wt %, preferably 99 wt % to 97 wt %, preferably 99 wt % to 98 wt %).

Preferably, the ethylene copolymer comprises at least 50 wt % ethylene, and has up to 50 wt %, preferably 1 wt % to 35 wt %, even more preferably 1 wt % to 6 wt % of a $C_3$ to $C_{20}$ comonomer (preferably hexene or octene), based upon the weight of the copolymer. The polyethylene copolymers preferably have a composition distribution breadth index (CDBI) of 60% or more, preferably 60% to 80%, preferably 65% to 80%. In another preferred embodiment, the ethylene copolymer has a density of 0.910 to 0.950 g/cm³ (preferably 0.915 to 0.940 g/cm³, preferably 0.918 to 0.925 g/cm³) and a CDBI of 60% to 80%, preferably between 65% and 80%. Preferably, these polymers are metallocene polyethylenes (mPEs).

In another embodiment, the ethylene copolymer comprises mPEs described in U.S. Publication No. 2007/0260016 and U.S. Pat. No. 6,476,171, e.g. copolymers of an ethylene and at least one alpha olefin having at least 5 carbon atoms obtainable by a continuous gas phase polymerization using supported catalyst of an activated molecularly discrete catalyst in the substantial absence of an aluminum alkyl based scavenger (e.g. triethylaluminum, trimethylaluminum, tri-isobutyl aluminum, tri-n-hexylaluminum, and the like), which the polymer has a Melt Index of from 0.1 to 15 (ASTM D 1238, condition E); a CDBI of at least 70%, a density of from 0.910 to 0.930 g/cc; a Haze (ASTM D1003) value of less than 20; a Melt Index ratio (I21/I2, ASTMD 1238) of from 35 to 80; an averaged Modulus (M) (as defined in U.S. Pat. No. 6,255,426) of from 20,000 to 60,000 psi (13790 to 41369 N/cm$^2$) and a relation between M and the Dart Impact Strength (26 inch, ASTM D 1709) in g/mil (DIS) complying with the formula:

$$DIS \geq 0.8 \times [100 + e^{(11.71 - 0.000268 \times M + 2.183 \times 10^{-9} \times M^2)}],$$

where "e" represents 2.1783, the base Napierian logarithm, M is the averaged Modulus in psi and DIS is the 26 inch (66 cm) dart impact strength.

In another preferred embodiment, the polymer blend includes a metallocene-catalyzed branched modifier copolymer comprising units derived from ethylene and one or more $C_4$ to $C_{20}$ α-olefin comonomers. The branched modifier has a comonomer content of from about 2 wt % to about 20 wt %, a composition distribution breadth index (CDBI) of at least 60%, a melt index (MI or I2) of 1.0 dg/min or less and a branching index of $g'_{vis}$ of less than 0.97, preferably 0.96 or less, more preferably 0.94 or less, wherein the ethylene polymer has a $g'_{vis}$ of at least 0.01 units higher than the $g'_{vis}$ of the branched modifier.

In another embodiment, the difference in density of the branched modifier and ethylene polymer is 0.04 g/cm$^3$ or less, preferably 0.02 g/cm$^3$ or less. In another embodiment, the difference in density of the branched modifier and ethylene polymer is 0.03 g/cm$^3$ or more, preferably 0.05 g/cm$^3$ or more, preferably 0.08 g/cm$^3$ or more, preferably 0.10 g/cm$^3$ or more, preferably 0.20 g/cm$^3$ or more.

In another embodiment, the difference in melt flow index (190° C., 2.16 kg) of the branched modifier and the ethylene polymer is 10 dg/min or less, preferably 5 dg/min or less.

In one embodiment, the ratio of the complex viscosity of the branched modifier to the complex viscosity of the ethylene polymer component in the blend composition is at least 0.1:1 (preferably at 0.04:1). The complex viscosity is measured at a frequency of 0.1 rad/sec and a temperature of 190° C. according to procedure described in the Test Methods section below.

In an alternative embodiment, the MI (190° C., 2.16 kg) of the branched modifier is 90% or less of the MI of the ethylene polymer component, preferably 80% or less, preferably 70% or less.

In an alternative embodiment, the complex viscosity at 0.1 rad/sec of the modifier is equal to or greater than the complex viscosity at 0.1 rad/sec of the ethylene polymer prior to combination with the branched modifier.

In an alternative embodiment, the complex viscosity at 0.1 sec$^{-1}$ of the branched polyethylene modifier is at least 320% greater than (preferably 2000% greater than) the complex viscosity at 0.1.

In another embodiment, the polyethylene/modifier compositions of this invention comprise less than 50 wt % (preferably less than 40 wt %, preferably less than 30 wt %, preferably less than 20 wt %, preferably less than 10 wt %, more preferably less than 5 wt %, more preferably less than 1 wt %) propylene homopolymer or copolymer, based upon the weight of the composition, where a propylene homopolymer or copolymer is a polymer comprising at least 50 mol % propylene monomer units.

In another embodiment, the polyethylene/modifier compositions of this invention comprise less than 50 wt % (preferably less than 40 wt %, preferably less than 30 wt %, preferably less than 20 wt %, preferably less than 10 wt %, more preferably less than 5 wt %, more preferably less than 1 wt %) of EP Rubber, based upon the total weight of the composition. For purposes of this invention and the claims thereto, an "EP Rubber" is defined to be a copolymer of ethylene and propylene, and optionally diene monomer(s), chemically crosslinked (i.e. cured) or not, where the ethylene content is from 35 wt % to 80 wt %, the diene content is 0 wt % to 15 wt %, and the balance is propylene; and where the copolymer has a Mooney viscosity, ML(1+4) @ 125° C. (measured according to ASTM D1646) of 15 to 100. For purposes of this invention and the claims thereto, an "EPDM" or "EPDM Rubber" is defined to be an EP Rubber having diene present.

In a preferred embodiment, the polyethylene compositions comprising one or more ethylene polymers and one or more branched modifiers show characteristics of strain hardening in extensional viscosity. Strain hardening is observed as a sudden, abrupt upswing of the extensional viscosity in the transient extensional viscosity vs. time plot. This abrupt upswing, away from the behavior of a linear viscoelastic material, was reported in the 1960s for LDPE (reference: J. Meissner, *Rheology Acta.*, Vol. 8, p. 78, 1969) and was attributed to the presence of long branches in the polymer. In one embodiment, the inventive polyethylene compositions have strain-hardening in extensional viscosity. The strain-hardening ratio (SHR) is 1.1 or more for the inventive polyethylene compositions, preferably at least 1.5 or more, preferably 2.0 or more, preferably 2.5 or more, preferably 4 or more, more preferably 6 or more, and even more preferably 8 or more when the extensional viscosity is measured at a strain rate of 1 sec$^{-1}$ and at a temperature of 150° C.

In another embodiment of the invention the SHR of the blend is at least 10% higher than the SHR of the linear polyethylene used in the blend, preferably at least 20% higher, at least 30% higher, at least 50% higher, at least 100% higher, at least 500% higher, at least 800% higher, at least 1000% higher.

In one embodiment, the melt strength of inventive polyethylene composition is at least 5% higher than the melt strength of ethylene polymer component used in the blend (preferably at least 10%, preferably at least 20%, preferably at least 30%, preferably at least 40%, preferably at least 50%, preferably at least 60%, preferably at least 100%, preferably at least 200%, preferably at least 300%, preferably at least 400%, preferably at least 500%, preferably at least 600%, preferably at least 700%, preferably at least 800%).

In a preferred embodiment of the invention, the linear polyethylene is present in the blend at from 80 to 99.5 wt % (preferably 99.5 wt % to 90 wt %, preferably 99.25 wt % to 95 wt %, preferably 99 wt % to 95 wt %, preferably 99 wt % to 97 wt %, preferably 99 wt % to 98 wt %) and the branched modifier is present in the blend at from 0.5 to 20 wt % (preferably 0.5 wt % to 10 wt %, preferably 0.75 wt % to 5 wt %, preferably 1 wt % to 5 wt %, preferably 1 wt % to 3 wt %, preferably 1 wt % to 2 wt %), based upon the weight of the blend, and the melt strength of the blend is at least 5% higher than the melt strength of linear ethylene polymer component used in the blend (preferably at least 10%, preferably at least 20%, preferably at least 30%, preferably at least 40%, preferably at least 50%, preferably at least 100%, preferably at least 200%, preferably at least 300%, preferably at least 400%, preferably at least 500%, preferably at least 600%, preferably at least 700%, preferably at least 800%).

In a preferred embodiment, the composition has a melt strength at least 500% higher than the melt strength of the polyethylene prior to combination with the branched polyethylene modifier, preferably at least 600%, preferably at least 700%, preferably at least 800% higher.

Shear rheology of the inventive composition can be different from the rheology of the ethylene polymer component, depending on the properties of the branched modifier polymer. In one embodiment, the difference in complex viscosity between the inventive composition and ethylene polymer component is less than 10%, preferably less than 5% at all frequencies.

In another embodiment of the invention, the complex viscosity of the inventive polyethylene composition is at least 30% higher than the complex viscosity of the ethylene polymer component employed in the blend composition when the complex viscosity is measured at a frequency of 0.1 rad/sec and a temperature of 190° C., and the complex viscosity of the inventive polyethylene composition is the same or less than the complex viscosity of the ethylene polymer component used in the blend composition when the complex viscosity is measured at a frequency of 100 rad/sec and a temperature of 190° C. Complex viscosity is measured according to procedure described in the Test Methods section below. Alternatively, the shear thinning ratio of the inventive composition is at least 10% higher than the shear thinning ratio of the ethylene polymer component.

In one embodiment, crystallization temperature, Tc, (as determined by DSC as described in the Test Methods section below) of the branched modifier polymer is lower than the Tc of the ethylene polymer. Preferably, the Tc of the polyethylene composition is lower than the Tc of the ethylene polymer component by at least 2° C., preferably by at least 5° C.

In another embodiment, Tc of the branched modifier polymer is higher than the Tc of the ethylene polymer component in the blend; preferably the Tc of the polyethylene composition is higher than the Tc of the ethylene polymer component by at least 2° C., preferably by at least 5° C.

Preferably, the blend of the polyethylene and the branched modifier has a melt index, as measured by ASTM D-1238 at 190° C. and 2.16 kg (also referred to as 12) of up to 30 dg/min, alternately 0.1 to 25 dg/min, alternately 0.2 to than 20 dg/min, alternately less than 0.5 to 10 dg/min.

Preferably, the HLMI (ASTM D 1238 190° C., 21.6 kg, also referred to as 121) of the blend of the polyethylene and the modifier is 10.0 dg/min or less, preferably 5 dg/min or less, preferably 1 dg/min or less.

Branched Modifiers

The polyethylene compositions of the present invention include a branched modifier (also referred to as a "modifier", or a "branched polyethylene modifier" or a "branched modifier polymer" herein). It will be realized that the classes of materials described herein that are useful as modifiers can be utilized alone or admixed with other modifiers described herein in order to obtain desired properties.

In one embodiment, the branched modifier useful herein is a long chain branched polyethylene copolymer comprising units derived from at least one polymerizable polyene. Polymerizable polyene is a polyene with at least two double bonds that can be incorporated into growing polyethylene chains during a polymerization reaction. In a preferred embodiment, the branched modifier is a terpolymer of 1) ethylene; 2) up to 20 mol % (preferably from 0.1 mol % to 15 mol %, preferably from 1 mol % to 10 mol %) of one or more $C_4$ to $C_{40}$ (preferably $C_4$ to $C_{20}$, preferably $C_6$ to $C_{12}$) olefins, preferably alpha olefins (preferably 1-butene, 1-hexene, and 1-octene); and 3) one or more polymerizable polyenes (preferably present at 5 mol % or less, preferably 1 mol % or less, more preferably 0.5 mol % or less, alternately the polyene is present at 0.001 mol % to 5 mol %, alternately 0.01 mol % to 3 mol %, alternately 0.1 mol % to 1 mol %), preferably alpha-omega dienes, preferably one or more of 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, and 1,13-tetradecadiene, tetrahydroindene, norbornadiene also known as bicyclo-(2.2.1)-hepta-2,5-diene, dicyclopentadiene, 5-vinyl-2-norbornene, 1,4-cyclohexadiene, 1,5-cyclooctadiene, and 1,7-cyclododecadiene.

Long chain branched modifier polymers can be obtained when a polymer chain (also referred as macromonomer) with reactive polymerizable groups is incorporated into another polymer chain during the polymerization of the latter. The resulting product comprises a backbone of the second polymer chain with branches of the first polymer chains (i.e. macromonomer) extending from the backbone. For polymerization with presence of polymerizable polyene (normally a diene), the polyene can be incorporated into a polymer chain through one polymerizable double bond in a similar manner as the incorporation of other comonomers such as 1-hexene and 1-octene. Polymer chains containing polymerizable polyene thus become reactive due to the residual second polymerizable double bond of polyene. These reactive polymer chains can then be incorporated into another growing polymer chain during polymerization through the second double bond of a polyene. This doubly inserted polyene creates a linkage between two polymer chains and leads to branched structures. The branching structure formed through diene linkage between polymer chains is referred to as "H" type and is preferably a tetra-functional branching structure. The number of branches and level of branches (branches on branches) depend on the amount of polyene incorporated.

Polyene incorporation in polymerization is often catalyst specific. For polymerization with metallocene catalysts, examples of useful polymerizable polyenes include butadiene, 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, tetrahydroindene, norbornadiene also known as bicyclo-(2.2.1)-hepta-2,5-diene, dicyclopentadiene, 5-vinyl-2-norbornene, 1,4-cyclohexadiene, 1,5-cyclooctadiene, 1,7-cyclododecadiene, and vinyl cyclohexene.

In a polymerization system with a metallocene catalyst, a macromonomer with reactive double bonds can also be incorporated into another polymer chain to form a long chain branching polymer with tri-functional branching structures. These reactive double bonds can be vinyl groups on the chain ends of polymer chains produced in the polymerization system. The resulting product comprises a backbone of the second polymer chain with branches of the first polymer chains extending from the backbone. In one embodiment, the long chain branched modifier includes both tetra-functional and tri-functional branching structures.

In a further aspect, the modifiers comprise at least 80 mol % of ethylene and from 0.01 mol % to 10 mol % of at least one diene selected from the group consisting of norbomadiene, 5-vinyl-2-norbomene, $C_6$ to $C_{12}$ α,ω-dienes, and mixtures thereof with the balance being an alpha-olefin selected from the group consisting of propylene, butene, pentene, hexene, octene, and mixtures thereof.

Long chain branching structure of the modifiers can be detected using GPC-3D as described in the Test Methods section below. A branching index $g'_{vis}$ is used to measure the level of branching. In one embodiment, the branched modifier polymer has a $g'_{vis}$ of less than 0.70, preferably 0.65 or less, more preferably 0.60 or less, preferably 0.55 or less, even more preferably 0.50 or less.

For ethylene copolymers with α,ω-dienes, propylene, and 1-butene the presence of long chain branched structures in the branched modifier can be detected using nuclear magnetic resonance spectroscopy (NMR). In $^{13}$C-NMR, the modifiers are dissolved in tetrachloroethane-d2 at 140° C. and the spectra are collected at 125° C. Assignments of peaks for ethylene/propylene, ethylene/butene, ethylene/hexene, and ethylene/octene copolymers have been reviewed by James C. Randall in *Polymer Reviews*, 29 (2), p. 201-317, (1989). Assignments for propylene/butene, propylene/pentene, propylene/hexene, propylene/heptene, and propylene/octene are presented by U. M Wahner, et al., (*Macromol. Chem. Phys.* 2003, 204, p. 1738-1748). These assignments were made using hexamethyldisiloxane as the internal standard. To convert them to the same standard used in the other references add 2.0 to the chemical shifts. Assignments and a method of measuring decene concentration have been reported for propylene/ethylene/decene terpolymers in Escher, Galland, and Ferreira (*J. Poly. Sci., Part A: Poly. Chem.*, 41, p. 2531-2541 (2003)) and Ferreira, Galland, Damiani, and Villar (*J. Poly. Sci, Part A: Poly. Chem*, 39, p. 2005-2018, (2001)). The peaks in the $^{13}$C-NMR spectrum of ethylene/norbornadiene copolymers are assigned by Mönkkönen and Pakkanen (*Macromol. Chem. Phys.*, 200, p. 2623-2628 (1999)) and Radhakrishnan and Sivaram (*Macromol. Chem. Phys.*, 200, p. 858-862 (1999)).

In one embodiment, ethylene and optional comonomers, and α,ω-dienes are used in the synthesis of the branched modifier, in which the α,ω-dienes have their double bonds inserted into ethylene copolymer chains. In one embodiment, ethylene propylene, 1-butene and α,ω-dienes are used in the synthesis of the branched modifier, in which the α,ω-dienes have their double bonds inserted into ethylene copolymer chains. The numbers of α,ω-dienes inserted into each of these polymer backbones can be quantified in the $^{13}$C-NMR spectra using the assignments cited for ethylene/octene, propylene/octene, or propylene/ethylene/decene copolymers. The chemical shifts of the methines at the diene insertion sites, carbons adjacent to the methines on the backbones, and carbons α to the methines on the octene or decene will be unchanged when applied to copolymers containing $C_8$-$C_{12}$ α,ω-dienes, because the residual double bonds or second polymer chains at the ends of the α,ω-dienes are too far away (4 or more carbons) to change the shifts.

The following procedure can be used to calculate the diene branches per 10,000 carbons (B):

(a) Integrate the area under the vinyl allylic carbon peak at 33.91 ppm (V).

(b) Integrate the area of the aliphatic region (10-50 ppm) of the $^{13}$C-NMR spectrum (Ali). Do not include the area of the vinyl allylic peak.

(c) Calculate the total number of carbons in the spectrum, Tot, by summing the area of the aliphatic region and two times the area under vinyl allylic peak, i.e. Tot=Ali+2*V.

(d) Average the areas of the peaks assigned to the inserted ends of the α,ω-dienes to calculate the number of inserted diene ends (D).

(e) Estimate the number of diene branches, B, as 0.5*(D−V). This estimate may be slightly low, because some of the vinyl groups in the allylic vinyl peak may have been from chain ends. However, typically, the number of residual vinyl groups in the dienes is much larger than those at the chain ends, because there are many dienes inserted per chain.

(f) To convert to diene-branches per 10,000 carbons, divide B by the total number of carbons, Tot, and multiply by 10,000.

In other embodiments, copolymers of ethylene and norbomadiene are used to synthesize the branched modifier. The singly inserted norbomadienes can be quantified by integrating the peak for the bridging methylene, C7, at 42.7 to 43.5 ppm. When both double bonds have inserted, the bridging methylene is called BC7 and is found at 33.8 to 35.0 ppm. To calculate the norbomadiene branches per 10000 carbons, the area under the peak at 33.8 to 35.0 is multiplied by 10000 and divided by the total aliphatic area from 10 to 50 ppm. Because the bridging methylene is β to both of the double bonds of norbomadiene, it shifts after one double bond inserts and shifts again after the second double bond inserts. However, it is 4 carbons away from possible substituents at the β positions to the norbomene ring. These substituents produce very weak changes in the absorptions and these integration ranges can be used for all the norbomadiene-containing polymers described herein.

Branched structures can also be observed by Small Amplitude Oscillatory Shear (SAOS) measurement of the molten polymer performed on a dynamic (oscillatory) rotational rheometer. From the data generated by such a test it is possible to determine the phase or loss angle δ, which is the inverse tangent of the ratio of G" (the loss modulus) to G' (the storage modulus). For a typical linear polymer, the loss angle at low frequencies (or long times) approaches 90 degrees, because the chains can relax in the melt, adsorbing energy, and making the loss modulus much larger than the storage modulus. As frequencies increase, more of the chains relax too slowly to absorb energy during the oscillations, and the storage modulus grows relative to the loss modulus. Eventually, the storage and loss moduli become equal and the loss angle reaches 45 degrees. In contrast, a branched chain polymer relaxes very slowly, because the branches need to retract first before the chain backbone can relax along its tube in the melt. This polymer never reaches a state where all its chains can relax during an oscillation, and the loss angle never reaches 90 degrees even at the lowest frequency, ω, of the experiments. The loss angle is also relatively independent of the frequency of the oscillations in the SAOS experiment; another indication that the chains can not relax on these timescales.

As known by one of skill in the art, rheological data may be presented by plotting the phase angle versus the absolute value of the complex shear modulus (G*) to produce a van Gurp-Palmen plot. The plot of conventional polyethylene polymers shows monotonic behavior and a negative slope toward higher G* values. Conventional LLDPE polymer without long chain branches exhibit a negative slope on the van Gurp-Palmen plot. For branched modifiers, the phase angels shift to a lower value as compared with the phase angle of a conventional ethylene polymer without long chain branches at the same value of G*. The van Gurp-Palmen plots of some embodiments of the branched modifier polymers described in the present disclosure exhibit two slopes—a positive slope at lower G* values and a negative slope at higher G* values.

In a plot of the phase angle δ versus the measurement frequency ω, polymers that have long chain branches exhibit a plateau in the function of δ(ω), whereas linear polymers do not have such a plateau. According to Garcia-Franco et al. (*Macromolecules* 2001, 34, No. 10, p. 3115-3117), the plateau in the aforementioned plot will shift to lower phase angles δ when the amount of long chain branching occurring in the polymer sample increases. Dividing the phase angle at which the plateau occurs by a phase angle of 90°, one obtains the critical relaxation exponent n, which can then be used to calculate a gel stiffness using the equation:

$$\eta^*(\omega) = S\Gamma(1-n)\omega^{n-1}$$

wherein $\eta^*$ represents the complex viscosity (Pa·s), ω represents the frequency, S is the gel stiffness, Γ is the gamma function (see Beyer, W. H. Ed., *CRC Handbook of Mathematical Sciences* 5$^{th}$ Ed., CRC Press, Boca Rotan, 1978) and n is the critical relaxation exponent. Polymer modifiers produced herein preferably have a gel stiffness of more than 150 Pa·s, preferably at least 300 Pa·s, and more preferably at least 500 Pa·s. The gel stiffness is determined at the test temperature of 190° C. A preferred critical relaxation exponent n for the polymer modifiers produced herein is less than 1 and more than 0, generally, n will be between 0.1 and 0.92, preferably between 0.2 and 0.85.

Small amplitude oscillatory shear data can be transformed into discrete relaxation spectra using the procedure on p. 273-275 in R. B. Bird, R. C. Armstrong, and O. Hassager, *Dynamics of Polymeric Liquids, Volume 1, Fluid Mechanics*, 2$^{nd}$ *Edition*, John Wiley and Sons, (1987). The storage and loss moduli are simultaneously least squares fit with the functions, $$G'(\omega_j) = \Sigma \eta_k \lambda_k \omega_j^2 / (1 + (\eta_k \omega_k)^2)$$

$$G''(\omega_j) = \Sigma \eta_k \lambda_k \omega_j / (1 + (\eta_k \omega_k)^2)$$

at the relaxation times $\lambda_k$=0.01, 0.1, 1, 10, and 100 seconds. The sums are from k=1 to k=5. The sum of the $\eta_k$'s is equal to the zero shear viscosity, $\eta_0$. An indication of high levels of branched block products is a high value of $\eta_5$, corresponding to the relaxation time of 100 s, relative to the zero shear viscosity. The viscosity fraction of the 100 s relaxation time is $\eta_5$ divided by the zero shear viscosity, $\eta_0$. For the modifiers of this invention the viscosity fraction of the 100 second relaxation time is preferably at least 0.1, more preferably 0.4, and most preferably 0.8. In contrast, viscosity fractions of 100 second chains of conventional isotactic polypropylene are of the order of 0.10 or less and of conventional propylene/ethylene copolymers are of the order of 0.10 or less. Chains with long relaxation times can not relax during the cycle time of the small amplitude oscillatory shear experiment and lead to high zero shear viscosities.

The branched modifiers used herein preferably have good shear thinning. Shear thinning is characterized by the decrease of the complex viscosity with increasing shear rate. One way to quantify the shear thinning is to use a ratio of complex viscosity at a frequency of 0.1 rad/s to the complex viscosity at a frequency of 100 rad/s (referred to as the shear thinning ratio or the complex viscosity ratio). Preferably, the complex viscosity ratio of any modifier produced herein is 100 or more, preferably 120 or more, preferably 130 or more, preferably 140 or more, preferably 150 or more, when the complex viscosity is measured at 190° C.

Shear thinning can be also characterized using a shear thinning index. The term "shear thinning index" is determined using plots of the logarithm (base ten) of the dynamic viscosity versus logarithm (base ten) of the frequency. The slope is the difference in the log (dynamic viscosity) at a frequency of 100 rad/s and the log (dynamic viscosity) at a frequency of 0.01 rad/s divided by 4. These plots are the typical output of small amplitude oscillatory shear (SAOS) experiments. For purposes of this invention, the SAOS test temperature is 190° C. for ethylene polymers. Polymer viscosity is conveniently measured in Pascal·seconds (Pa·s) at shear rates within a range of from 0.01 to 398 rad/sec and at 190° C. under a nitrogen atmosphere using a dynamic mechanical spectrometer, such as the Advanced Rheometrics Expansion System (ARES). Generally a low value of shear thinning index indicates that the polymer is highly shear-thinning and that it is readily processable in high shear processes, for example by injection molding. The more negative this slope, the faster the dynamic viscosity decreases as the frequency increases. Preferably, the modifier has a shear thinning index of less than −0.2, preferably −0.4 or less, preferably −0.6 or less. These types of modifiers are easily processed in high shear rate fabrication methods, such as injection molding.

The branched modifier described herein also preferably has characteristics of strain hardening in extensional viscosity. An important feature that can be obtained from extensional viscosity measurements is the attribute of strain hardening in the molten state. Strain hardening is observed as a sudden, abrupt upswing of the extensional viscosity in the transient extensional viscosity vs. time plot. This abrupt upswing, away from the behavior of a linear viscoelastic material, was reported in the 1960s for LDPE (reference: J. Meissner, *Rheol. Acta.*, Vol. 8, p. 78, 1969) and was attributed to the presence of long branches in the polymer. The strain-hardening ratio (SHR) is defined as the ratio of the maximum transient extensional viscosity over three times the value of the transient zero-shear-rate viscosity at the same strain rate. Strain hardening is present in the material when the ratio is greater than 1. In one embodiment, the branched modifiers have strain-hardening in extensional viscosity. Preferably the strain-hardening ratio of the branched modifier is 2 or greater, preferably 5 or greater, more preferably 10 or greater, and even more preferably 15 or greater when extensional viscosity is measured at a strain rate of 1 sec$^{-1}$ and at a temperature of 150° C.

The branched modifiers of this invention generally exhibit melt strength values greater than that of conventional linear or long chain branched polyethylene of similar melt index. As used herein "melt strength" refers to the force required to draw a molten polymer extrudate at a rate of 12 mm/s$^2$ at an extrusion temperature of 190° C. until breakage of the extrudate, whereby the force is applied by take up rollers. In one embodiment, the melt strength of the branched modifier polymers is at least 20% higher than that of a linear polyethylene with the same density and MI. Preferably, any modifier produced herein has a melt strength of at least 10 cN, preferably at least 15 cN, preferably at least 20 cN, preferably at least 25 cN, preferably at least 30 cN.

The branched modifiers preferably have a density in a range of from 0.840 g/cm$^3$ to 0.960 g/cm$^3$ in one embodiment, from 0.850 g/cm$^3$ to 0.95 g/cm$^3$ in a more particular embodiment, from 0.850 g/cm$^3$ to 0.920 g/cm$^3$ in yet a more particular embodiment, from 0.860 g/cm$^3$ to 0.930 g/cm$^3$ in yet a more particular embodiment, from 0.870 g/cm$^3$ to 0.92 g/cm$^3$ in yet a more particular embodiment, less than 0.925 g/cm$^3$ in yet a more particular embodiment, less than 0.920 g/cm$^3$ in yet a more particular embodiment, and less than 0.900 g/cm$^3$ in yet a more particular embodiment.

When produced in a gas-phase or a slurry process, the branched modifiers of the invention have a bulk density of from 0.400 to 0.900 g/cm$^3$ in one embodiment, and from 0.420 to 0.800 g/cm$^3$ in another embodiment, and from 0.430 to 0.500 g/cm$^3$ in yet another embodiment, and from 0.440 to 0.60 g/cm$^3$ in yet another embodiment, wherein a desirable range may comprise any upper bulk density limit with any lower bulk density limit described herein.

In a preferred embodiment, the branched modifier has a strain hardening ratio of 5 or more, preferably 10 or more, preferably 20 or more, preferably 30 or more, preferably 40 or more, preferably 50 or more; and/or an Mw of 100,000 g/mol or more, preferably from 100,000 to 2,000,000 g/mol, alternately from 200,000 to 1,000,000 g/mol, alternately from 150,000 to 750,000 g/mol.

Preferably, the HLMI (ASTM D 1238 190° C., 21.6 kg) of the modifier is 1.0 dg/min or less, preferably 0.5 dg/min or less. HLMI is also referred as to I21.

The branched modifier of the invention preferably has an Mw of 100,000 to 2,000,000 g/mol, preferably 150,000 to 1,000,000, more preferably 200,000 to 500,000, as measured by size exclusion chromatography, as described in the Test Methods section below, and/or an $M_w/M_n$ of 2 to 40, preferably 2.5 to 30, more preferably 3 to 20, more preferably 3 to 25 as measured by size exclusion chromatography, and/or a $M_z/M_w$ of 2 to 50, preferably 2.5 to 30, more preferably 3 to 20, more preferably 3 to 25. The $M_w$ referred to herein and for purposes of the claims attached hereto is obtained from GPC using a light scattering detector as described in the Test Methods section below.

The branched modifier of the invention preferably has a density of 0.85 to 0.97 g/cm$^3$, preferably 0.86 to 0.965 g/cm$^3$, preferably 0.88 to 0.96 g/cm$^3$, alternatively between 0.860 and 0.910 g/cm$^3$, alternatively between 0.910 and 0.940 g/cm$^3$, or alternatively between 0.94 to 0.965 g/cm$^3$ (determined according to ASTM D 1505 using a density-gradient column on a compression-molded specimen that has been slowly cooled to room temperature (i.e. over a period of 10 minutes or more) and allowed to age for a sufficient time that the density is constant within +/−0.001 g/cm$^3$).

In a preferred embodiment, any branched modifier described herein has a $g'_{(Z\ ave)}$ of 0.80 or less, preferably 0.75 or less, preferably 0.70 or less, preferably 0.65 or less, preferably 0.60 or less, preferably 0.55 or less, preferably 0.50 or less, preferably 0.45 or less, preferably 0.40 or less, preferably 0.35 or less.

Z average branching index ($g'_{(Z\ ave)}$) is determined using data generated using the SEC-DRI-LS-VIS procedure described in the Test Methods section below, paragraph [0334] to [0341], p. 24-25 of U.S. Publication No. 2006/0173123 (including the references cited therein, except that the GPC procedure is run as described in the Test Methods section below), where $$g'_{Zave} = \frac{\sum C_i [\eta_i]_b}{\sum C_i K M_i^\alpha}$$

where $[\eta_i]_b$ is the viscosity of the polymer in slice i of the polymer peak, and $M_i$ is the weight averaged molecular weight in slice i of the polymer peak measured by light scattering, K and α are the parameters for linear polyethylene (K=0.000579 and α=0.695), $C_i$=polymer concentration in the slice i in the polymer peak times the mass of the slice squared, $M_i^2$.

In any embodiment of the invention described herein, the branched modifier may have a complex viscosity at 0.1 rad/sec and a temperature of 190° C. of at least 130,000 Pa·s (preferably at least 150,000 Pa·s, preferably at least 200,000 Pa·s, preferably at least 500,000 Pa·s, preferably from 130,000 to 1,000,000 Pa·s).

In any embodiment of the invention described herein, the branched modifier may have a phase angle of 25 degrees or less. Alternatively, any branched modifier may have a phase angle at a complex shear modulus of 100,000 Pascal of 30 degrees or less, preferably 28 degrees or less, more preferably 25 degrees or less. The shear rheology is measured at 190° C. according to the procedure described in the Example section.

In any embodiment of the invention described herein, the branched polyethylene modifier preferably has a complex viscosity of greater than 300% of the complex viscosity of the ethylene polymer (preferably greater than 350%, preferably greater than 400%, preferably greater than 500%, preferably greater than 600%, preferably greater than 700%). The complex viscosity is measured at a frequency of 0.1 rad/sec and a temperature of 190° C.

In any embodiment of the invention described herein, the branched polyethylene modifier preferably has a phase angle at complex shear modulus G*=100,000 Pa of less than 40°, preferably less than 35°, preferably less than 30°, preferably less than 28°, preferably less than 27°, preferably less than 26°, preferably less than 25°, preferably less than 24°, preferably less than 23°, preferably less than 22°, as measured at 190° C.

Polymerization Processes to Produce Modifiers

The modifiers described herein may be produced using catalyst and activator as described below in a high pressure, solution, gas or slurry polymerization process or a combination thereof, preferably solution phase or gas phase polymerization process. In a preferred embodiment, the diene is present in the monomer feed at a feed concentration of 2 to 5000 ppm, preferably 10 to 3000, more preferably 20 to 2000 ppm. The diene concentration is calculated based on the total weight of all monomer and comonomer in the feed.

The inventive polyethylene composition comprises a branched modifier, which typically is an ethylene co- or ter-polymer polymer, which preferably comprises at least one polymerizable diene. The main function of diene is to create linkages between polymer chains and thus produce long chain branched structures. The content of diene in the branched modifier is typically high enough to create high levels of branching for desired applications and low enough to produce gel-free product. Gel-free products can be obtained by controlling the diene types and its concentrations, by controlling monomer concentration and amount of polymer synthesized (polymer loading), or by adding H$_2$ or other chain transfer agents. Chain transfer agents lower the molecular weights of the polymers synthesized in the reactor. Increasing the total monomer concentration relative to the diene concentration makes the relative concentrations of dienes lower and a lower fraction of dienes will incorporate into each polymer chain. Higher total monomer concentrations also increase the molecular weights of the chains for most catalyst systems. Since the number of dienes incorporated per chain depends on the molecular weight or length of the chains, the addition of $H_2$ or chain transfer agents also affects the number of sites per chain available to form diene bridges during the polymerization.

Preferably the diene component is a straight chain diene, such as 1,7-octadiene or 1,9-decadiene, or is a cyclic diene, such as vinyl norbornene or norbornadiene. One particularly useful diene is norbornadiene because both of its double bonds are more reactive than α-olefins in a metallocene catalyzed system. Thus, norbornadiene is easy to incorporate into the polymer, leading to much higher concentrations of long chain branched products.

In polymerization systems with metallocene catalysts, a macromonomer with reactive double bonds can also be incorporated into another polymer chain(s) to form a long chain branching polymer with tri-functional branching structures. These reactive double bonds can be vinyl groups on the chain ends of polymer chains produced in the polymerization system. Proper selection of catalyst and process conditions can enhance the production of vinyl chain end macromonomers, and thus increase the level of long chain branching. In such system, lower diene concentration in the reactor is required to produce branched modifiers with same level of branching. Process operability might be also improved since low levels of diene concentration will greatly reduce the potential of gel formation in reactor. In one embodiment, the polymerization process includes a reactor system which can produce ethylene polymer (macromonomer) having reactive end groups, such as vinyl end groups. Generally, it is desirable that the macromonomers derived from the system have at least 50%, such as at least 70% of vinyl terminal unsaturations based on the total unsaturated olefin chain ends. Unsaturated chain ends (and percents thereof) are determined using proton NMR (collection at 120° C., 400 MHz) as described in U.S. Publication No. 2009/0318644 (U.S. application Ser. No. 12/143,663, filed Jun. 20, 2008), particularly the procedure described on p. 33 line 25 to p. 34, line 11, of the application as filed. Combination of a system capable of producing reactive macromonomer with a polymerizable diene can be an efficient method to produce the branched modifiers.

In one embodiment, this invention is directed toward the solution, bulk, slurry or gas phase polymerization reactions involving the polymerization of ethylene and one or more comonomers having from 3 to 40 carbon atoms, preferably 4 to 20 carbon atoms, and more preferably 6 to 8 carbon atoms, and one or more polymerizable dienes. Preferred comonomers include one or more of propylene, butene-1, pentene-1, 4-methyl-pentene-1, hexene-1, octene-1, decene-1, 3-methyl-pentene-1, and cyclic olefins or a combination thereof. Preferred polymerizable dienes include diolefins such as butadiene, α-ω diene such as 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, and 1,13-tetradecadiene; tetrahydroindene; norbornadiene also known as bicyclo-(2.2.1)-hepta-2,5-diene; dicyclopentadiene; 5-vinyl-2-norbornene; 1,4-cyclohexadiene; 1,5-cyclooctadiene; 1,7-cyclododecadiene and vinyl cyclohexene, and the like.

One or more reactors in series or in parallel may be used to produce the modifiers. Catalyst component and activator may be delivered as a solution or slurry, either separately to the reactor, activated in-line just prior to the reactor or in the reactor, or preactivated and pumped as an activated solution or slurry to the reactor. A preferred operation is two solutions activated in-line. For more information on methods to introduce multiple catalysts into reactors, please see U.S. Pat. No. 6,399,722, and PCT Publication No. WO 01/30862A1. While these references may emphasize gas phase reactors, the techniques described are equally applicable to other types of reactors, including continuous stirred tank reactors, slurry loop reactors and the like. Polymerizations are carried out in either single reactor operation, in which monomer, comonomers, catalyst/activator, scavenger, and optional modifiers are added continuously to a single reactor or in series reactor operation, in which the above components are added to each of two or more reactors connected in series. The catalyst components can be added to the first reactor in the series. The catalyst components may also be added to both reactors, with one component being added to first reactor and another component to other reactors.

In one embodiment 500 ppm or less of hydrogen is added to the polymerization, or 400 ppm or less, or 300 ppm or less. In other embodiments at least 50 ppm of hydrogen is added to the polymerization, or 100 ppm or more, or 150 ppm or more.

In a preferred embodiment, this invention also relates to a process to produce the branch modifier comprising contacting a catalyst, activator, ethylene, $C_4$ to $C_{40}$ alpha olefin and a polyene and obtaining a terpolymer, where the catalyst efficiency is 100,000 grams of polymer per gram of catalyst or more.

Gas phase polymerization, particularly a fluidized bed process, can be used to prepare the branched modifiers described herein. Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor.

Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference).

Slurry phase polymerization, particularly a slurry loop process, can be used to prepare the branched modifiers described herein. A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

In one embodiment, a preferred polymerization technique useful in the invention is referred to as a particle form polymerization or a slurry process where the temperature is kept below the temperature at which the polymer goes into solution. Such technique is well known in the art, and described in, for instance, U.S. Pat. No. 3,248,179 which is fully incorporated herein by reference. The preferred temperature in the particle form process is within the range of about 85° C. to about 110° C. Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

Particle form of polymerization has advantage over solution process for production of branched modifier with high level of branching. The polymer chains produced are present in discreted granular form and thus prevent many polymer chains from cross-linking together and forming reactor gels.

In another embodiment, the slurry process is carried out continuously in a loop reactor. The catalyst, as a slurry in isobutane or as a dry free flowing powder, is injected regularly to the reactor loop, which is itself filled with circulating slurry of growing polymer particles in a diluent of isobutane containing monomer and comonomer. Hydrogen, optionally, may be added as a molecular weight control. In one embodiment 500 ppm or less of hydrogen is added, or 400 ppm or less or 300 ppm or less. In other embodiments at least 50 ppm of hydrogen is added, or 100 ppm or more, or 150 ppm or more.

The reactor is maintained at a pressure of 3620 kPa to 4309 kPa and at a temperature in the range of about 60° C. to about 120° C., preferably up to about 104° C. depending on the desired polymer melting characteristics. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the diluent and all unreacted monomer and comonomers. The resulting hydrocarbon free powder is then compounded for use in various applications.

In yet another embodiment in the slurry process useful in the invention, the concentration of predominant monomer in the reactor liquid medium is in the range of from about 1 wt % to 30 wt %, preferably about 1 wt % to 10 wt %, preferably from about 2 wt % to about 7 wt %, more preferably from about 2.5 wt % to about 6 wt %, most preferably from about 3 wt % to about 6 wt %.

Another process useful in the invention is where the process, preferably a slurry process, is operated in the absence of or essentially free of any scavengers, such as triethylaluminum, trimethylaluminum, tri-isobutylaluminum and tri-n-hexylaluminum and diethyl aluminum chloride, dibutyl zinc and the like. This process is described in PCT Publication No. WO 96/08520 and U.S. Pat. No. 5,712,352, which are herein fully incorporated by reference.

In another embodiment, the process is run with scavengers. Typical scavengers include trimethyl aluminum, tri-isobutyl aluminum and an excess of alumoxane or modified alumoxane.

In another embodiment, homogeneous polymerization, particularly a bulk or solution phase process, can be used to prepare the branched modifiers described herein. Generally this involves polymerization in a continuous reactor in which the polymer formed and the starting monomer and catalyst materials supplied are agitated to reduce or avoid concentration gradients. Suitable processes operate above the melting point of the polymers at high pressures, from 1 bar to 3000 bar (0.1 MPa to 300 MPa), in which the monomer acts as diluent or in solution polymerization using a solvent.

Temperature control in the reactor is obtained by balancing the heat of polymerization with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds may also be used. The reactor temperature depends on the catalyst used. In general, the reactor temperature preferably can vary between about 30° C. and about 160° C., more preferably from about 90° C. to about 150° C., and most preferably from about 100° C. to about 140° C. Polymerization temperature may vary depending on catalyst choice. In series operation, the second reactor temperature is preferably higher than the first reactor temperature. In parallel reactor operation, the temperatures of the two reactors are independent. The pressure can vary from about 1 mm Hg to 2500 bar (250 MPa), preferably from 0.1 bar to 1600 bar (0.1 MPa to 160 MPa), most preferably from 1.0 bar to 500 bar (0.1 MPa to 50 MPa).

In one embodiment 500 ppm or less of hydrogen is added to the polymerization, or 400 ppm or less, or 300 ppm or less. In other embodiments at least 50 ppm of hydrogen is added to the polymerization, or 100 ppm or more, or 150 ppm or more.

Each of these processes may also be employed in single reactor, parallel or series reactor configurations. The liquid processes comprise contacting olefin monomers with the above described catalyst system in a suitable diluent or solvent and allowing said monomers to react for a sufficient time to produce the desired polymers. Hydrocarbon solvents are suitable, both aliphatic and aromatic. Alkanes, such as hexane, pentane, isopentane, and octane, are preferred.

The process can be carried out in a continuous stirred tank reactor, batch reactor or plug flow reactor, or more than one reactor operated in series or parallel. These reactors may have or may not have internal cooling or heating and the monomer feed may or may not be refrigerated. See the general disclosure of U.S. Pat. No. 5,001,205 for general process conditions. See also, PCT Application Nos. WO 96/33227 and WO 97/22639. All documents are incorporated by reference for U.S. purposes for description of polymerization processes, metallocene selection and useful scavenging compounds.

Preferably, the polymerization is conducted in a continuous, stirred tank reactor. Tubular reactors equipped with the hardware to introduce feeds, catalysts and scavengers in staged manner can also be used. Generally, polymerization reactors are agitated (stirred) to reduce or avoid concentration gradients. Reaction environments include the case where the monomer(s) acts as diluent or solvent as well as the case where a liquid hydrocarbon is used as diluent or solvent. Preferred hydrocarbon liquids include both aliphatic and aromatic fluids such as desulphurized light virgin naphtha and alkanes, such as propane, isobutane, mixed butanes, hexane, pentane, isopentane, isohexane, cyclohexane, isooctane, and octane. In an alternate embodiment a perfluorocarbon or hydrofluorocarbon is used as the solvent or diluent.

Suitable conditions for polymerization include a temperature from about 50° C. to about 250° C., such as from about 50° C. to about 150° C., for example from about 70° C. to about 150° C. and a pressure of 0.1 MPa or more, such as 2 MPa or more. The upper pressure limit is not critically constrained but is typically 200 MPa or less, such as 120 MPa or less, except when operating in supercritical phase then the pressure and temperature are above the critical point of the reaction media in question (typically over 95° C. and 4.6 MPa for propylene polymerizations). For more information on running supercritical polymerizations, see PCT Publication No. WO 2004/026921. Temperature control in the reactor is generally obtained by balancing the heat of polymerization with reactor cooling via reactor jackets or cooling coils, auto refrigeration, pre-chilled feeds, vaporization of liquid medium (diluent, monomers or solvent) or combinations of all three. Adiabatic reactors with pre-chilled feeds may also be used.

A polymer can be recovered from the effluent of either the first polymerization step or the second polymerization step by separating the polymer from other constituents of the effluent using conventional separation means. For example, polymer can be recovered from either effluent by coagulation with a non-solvent, such as methanol, isopropyl alcohol, acetone, or n-butyl alcohol, or the polymer can be recovered by stripping the solvent or other media with heat or steam. One or more conventional additives, such as antioxidants, can be incorporated in the polymer during the recovery procedure. Possible antioxidants include phenyl-beta-naphthylamine, di-tert-butylhydroquinone, triphenyl phosphate, heptylated diphenylamine, 2,2'-methylene-bis(4-methyl-6-tert-butyl)phenol, and 2,2,4-trimethyl-6-phenyl-1,2-dihydroquinoline. Other methods of recovery such as by the use of lower critical solution temperature (LCST) followed by devolatilization, are also envisioned. The catalyst may be deactivated as part of the separation procedure to reduce or eliminate further uncontrolled polymerization downstream in the polymer recovery processes. Deactivation may be effected by mixing with suitable polar substances such as water, whose residual effect following recycle can be counteracted by suitable sieves or scavenging systems.

Suitable catalysts for producing the branched modifier are those capable of polymerizing a $C_2$ to $C_{20}$ olefin to produce an ethylene copolymer. These include both metallocene and Ziegler-Natta catalysts. The catalysts employed in the first reaction zone should be able to produce polymers with reactive unsaturated chain ends, preferably at least 50% of vinyl unsaturation based on the total unsaturated olefin chain ends, while the catalyst used in the second reaction zone should be capable of incorporating the polymerizable macromonomer into a growing chain to form branched block polymers. For polymerization in single reaction zone using mixed catalysts, at least one of the catalysts is able to produce polymers with reactive unsaturated chain ends, preferably at least 50% of vinyl unsaturation based on the total unsaturated olefin chain ends, while at least one of the catalysts is capable of incorporating the polymerizable macromonomer into a growing chain to form branched block polymers. The catalysts can be in the form of a homogeneous solution, supported, or a combination thereof. In case two catalysts are employed in the same reaction zone, preferably, at least one of the catalyst is able to incorporate more comonomer (such as butene, hexene, or octene) than other catalysts so that the polymers produced will have different densities. A wide variety of transition metal compounds are known that, when activated with a suitable activator, will have poor alpha-olefins incorporation and hence will produce higher density ethylene copolymers.

Metallocene catalyst compounds are generally described throughout in, for example, 1 & 2 METALLOCENE-BASED POLYOLEFINS (John Scheirs & W. Kaminsky eds., John Wiley & Sons, Ltd. 2000); G. G. Hlatky in 181 COORDINATION CHEM. REV., p. 243-296 (1999) and in particular, for use in the synthesis of polyethylene in 1 METALLOCENE-BASED POLYOLEFINS, p. 261-377 (2000). The metallocene catalyst compounds as described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocenes" or "metallocene catalyst components".

The Cp ligands are typically i-bonded and/or fused ring(s) or ring systems. The ring(s) or ring system(s) typically comprise atoms selected from the group consisting of Groups 13 to 16 atoms, and more particularly, the atoms that make up the Cp ligands are selected from the group consisting of carbon, nitrogen, oxygen, silicon, sulfur, phosphorous, germanium, boron, aluminum, and combinations thereof, wherein carbon makes up at least 50% of the ring members. Even more particularly, the Cp ligand(s) may be selected from the group consisting of substituted and unsubstituted cyclopentadienyl ligands and ligands isolobal to cyclopentadienyl, non-limiting examples of which include cyclopentadienyl, indenyl, fluorenyl, and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g. 4,5,6,7-tetrahydroindenyl, or "$H_4$Ind"), substituted versions thereof, and heterocyclic versions thereof. In a particular embodiment, the metallocenes useful in the present invention may be selected from those including one or two (two, in a more particular embodiment) of the same or different Cp rings selected from the group consisting of cyclopentadienyl, indenyl, fluorenyl, tetrahydroindenyl, and substituted versions thereof.

The metal atom "M" of the metallocene catalyst compound, as described throughout the specification and claims, may be selected from the group consisting of Groups 3 through 12 atoms and lanthanide Group atoms in one embodiment; and selected from the group consisting of Groups 3 through 10 atoms in a more particular embodiment, and selected from the group consisting of Sc, Ti, Zr, Hf, V, Nb, Ta, Mn, Re, Fe, Ru, Os, Co, Rh, Ir, and Ni in yet a more particular embodiment; and selected from the group consisting of Groups 4, 5, and 6 atoms in yet a more particular embodiment, and from Ti, Zr, Hf atoms in yet a more particular embodiment, and may be Zr in yet a more particular embodiment. The oxidation state of the metal atom "M" may range from 0 to +7 in one embodiment; and in a more particular embodiment, is +1, +2, +3, +4, or +5; and in yet a more particular embodiment is +2, +3, or +4. The groups bound to the metal atom "M" are such that the compounds described below in the formulas and structures are electrically neutral, unless otherwise indicated. The Cp ligand(s) form at least one chemical bond with the metal atom "M" to form the "metallocene catalyst compound". The Cp ligands are distinct from the leaving groups bound to the catalyst compound in that they are not highly susceptible to substitution/abstraction reactions.

In one aspect of the invention, the one or more metallocene catalyst components of the invention are represented by the formula (I): $Cp^ACp^BM_X$ wherein M is as described above; each X is chemically bonded to M; each Cp group is chemically bonded to M; and n is 0, 1, 2, 3, or 4, and either 1 or 2 in a particular embodiment. The ligands represented by $Cp^A$ and $Cp^B$ in formula (I) may be the same or different cyclopentadienyl ligands or ligands isolobal to cyclopentadienyl, either or both of which may contain heteroatoms and either or both of which may be substituted by a group R. In one embodiment, $Cp^A$ and $Cp^B$ are independently selected from the group consisting of cyclopentadienyl, indenyl, tetrahydroindenyl, fluorenyl, and substituted derivatives of each. Independently, each $Cp^A$ and $Cp^B$ of formula (I) may be unsubstituted or substituted with any one or combination of substituent groups R. Non-limiting examples of substituent groups R as used in formula (I) as well as ring substituents in formulas (Va-d) include groups selected from the group consisting of hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. More particular non-limiting examples of alkyl substituents R associated with formula (I) through (IVa) include methyl, ethyl, propyl, butyl, pentyl, hexyl, cyclopentyl, cyclohexyl, benzyl, phenyl, methylphenyl, tert-butylphenyl groups, and the like, including all their isomers, for example tertiary-butyl, isopropyl, and the like. Other possible radicals include substituted alkyls and aryls, such as, for example, fluoromethyl, fluoroethyl, difluoroethyl, iodopropyl, bromohexyl, chlorobenzyl, and hydrocarbyl substituted organometalloid radicals including trimethylsilyl, trimethylgermyl, methyldiethylsilyl, and the like; halocarbyl-substituted organometalloid radicals including tris(trifluoromethyl)silyl, methylbis(difluoromethyl)silyl, bromomethyldimethylgermyl, and the like; disubstituted boron radicals including dimethylboron, for example; and disubstituted Group 15 radicals including dimethylamine, dimethylphosphine, diphenylamine, methylphenylphosphine, Group 16 radicals including methoxy, ethoxy, propoxy, phenoxy, methylsulfide, and ethylsulfide. Other substituents R include olefins, such as, but not limited to, olefinically-unsaturated substituents including vinyl-terminated ligands, for example 3-butenyl, 2-propenyl, 5-hexenyl, and the like. In one embodiment, at least two R groups (two adjacent R groups in one embodiment) are joined to form a ring structure having from 3 to 30 atoms selected from the group consisting of carbon, nitrogen, oxygen, phosphorous, silicon, germanium, aluminum, boron, and combinations thereof. Also, a substituent group R group, such as 1-butanyl, may form a bonding association to the element M.

Non-limiting examples of X groups include alkyls, amines, phosphines, ethers, carboxylates, dienes, hydrocarbon radicals having from 1 to 20 carbon atoms; fluorinated hydrocarbon radicals (e.g. —$C_6F_5$(pentafluorophenyl)), fluorinated alkylcarboxylates (e.g. $CF_3C(O)O$—), hydrides and halogen ions (such as chlorine or bromine) and combinations thereof. Other examples of X ligands include alkyl groups, such as cyclobutyl, cyclohexyl, methyl, heptyl, tolyl, trifluoromethyl, tetramethylene, pentamethylene, methylidene, methoxy, ethoxy, propoxy, phenoxy, bis(N-methylanilide), dimethylamide, dimethylphosphide radicals and the like. In one embodiment, two or more X's form a part of a fused ring or ring system.

In another aspect of the invention, the metallocene catalyst component includes those of formula (I) where $Cp^A$ and $Cp^B$ are bridged to each other by at least one bridging group, (A), such that the structure is represented by formula (II): $Cp^A(A)Cp^BMX_n$. These bridged compounds represented by formula (II) are known as "bridged metallocenes". $Cp^A$, $Cp^B$, M, X, and n in formula (II) are as defined above for formula (I); and wherein each Cp ligand is chemically bonded to M, and (A) is chemically bonded to each Cp. Non-limiting examples of bridging group (A) include divalent hydrocarbon groups containing at least one Group 13 to 16 atom, such as, but not limited to, at least one of a carbon, oxygen, nitrogen, silicon, aluminum, boron, germanium, tin atom, and combinations thereof, wherein the heteroatom also may be $C_1$ to $C_{12}$ alkyl or aryl substituted to satisfy neutral valency. The bridging group (A) also may contain substituent groups R as defined above (for formula (I)) including halogen radicals and iron. More particular non-limiting examples of bridging group (A) are represented by $C_1$ to $C_6$ alkylenes, substituted $C_1$ to $C_6$ alkylenes, oxygen, sulfur, $R'_2C=$, $R'_2Si=$, —$Si(R')_2Si(R'_2)$—, $R'_2Ge=$, $R'P=$ (wherein "=" represents two chemical bonds), where R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In one embodiment, the bridged metallocene catalyst component of formula (II) has two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl, and the corresponding moieties wherein the Si atom is replaced by a Ge or a C atom, dimethylsilyl, diethylsilyl, dimethylgermyl, and diethylgermyl.

In another embodiment, bridging group (A) also may be cyclic, comprising, for example 4 to 10 ring members (5 to 7 ring members in a more particular embodiment). The ring members may be selected from the elements mentioned above, from one or more of B, C, Si, Ge, N, and O in a particular embodiment. Non-limiting examples of ring structures which may be present as or part of the bridging moiety are cyclobutylidene, cyclopentylidene, cyclohexylidene, cycloheptylidene, cyclooctylidene, and the corresponding rings where one or two carbon atoms are replaced by at least one of Si, Ge, N, and O (in particular, Si and Ge). The bonding arrangement between the ring and the Cp groups may be either cis-, trans-, or a combination.

The cyclic bridging groups (A) may be saturated or unsaturated and/or may carry one or more substituents and/or may be fused to one or more other ring structures. If present, the one or more substituents are selected from the group consisting of hydrocarbyl (e.g. alkyl, such as methyl) and halogen (e.g. F, Cl) in one embodiment. The one or more Cp groups to which the above cyclic bridging moieties may optionally be fused may be saturated or unsaturated, and may be selected from the group consisting of those having 4 to 10 (more particularly 5, 6, or 7) ring members (selected from the group consisting of C, N, O, and S in a particular embodiment) such as, for example, cyclopentyl, cyclohexyl, and phenyl. Moreover, these ring structures may themselves be fused, such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

The ligands $Cp^A$ and $Cp^B$ of formulae (I) and (II) are different from each other in one embodiment, and the same in another embodiment.

In yet another aspect of the invention, the metallocene catalyst components include bridged mono-ligand metallocene compounds (e.g. mono cyclopentadienyl catalyst components). In this embodiment, the at least one metallocene catalyst component is a bridged "half-sandwich" metallocene represented by the formula (III): $Cp^A(A)QMX_n$ wherein $Cp^A$ is defined above and is bound to M; (A) is a bridging group bonded to Q and $Cp^A$; and wherein an atom from the Q group is bonded to M; and n is an integer 0, 1, or 2. In formula (III) above, $Cp^A$, (A), and Q may form a fused ring system. The X groups and n of formula (III) are as defined above in formula (I) and (II). In one embodiment, $Cp^A$ is selected from the group consisting of cyclopentadienyl, indenyl, tetrahydroindenyl, fluorenyl, substituted versions thereof, and combinations thereof. In formula (III), Q is a heteroatom-containing ligand in which the bonding atom (the atom that is bonded with the metal M) is selected from the group consisting of Group 15 atoms and Group 16 atoms in one embodiment, and selected from the group consisting of nitrogen, phosphorus, oxygen, or sulfur atom in a more particular embodiment, and nitrogen and oxygen in yet a more particular embodiment. Non-limiting examples of Q groups include alkylamines, arylamines, mercapto compounds, ethoxy compounds, carboxylates (e.g. pivalate), carbamates, azenyl, azulene, pentalene, phosphoyl, phosphinimine, pyrrolyl, pyrozolyl, carbazolyl, borabenzene, and other compounds comprising Group 15 and Group 16 atoms capable of bonding with M.

In yet another aspect of the invention, the at least one metallocene catalyst component may be an unbridged "half sandwich" metallocene represented by the formula (IVa):

$$Cp^AMQ_qX_n \quad (IVa)$$

wherein $Cp^A$ is defined as for the Cp groups in (I) and is a ligand that is bonded to M; each Q is independently bonded to M; X is a leaving group as described above in (I); n ranges from 0 to 3, and is 0 or 3 in one embodiment; q ranges from 0 to 3, and is 0 or 3 in one embodiment. In one embodiment, $Cp^A$ is selected from the group consisting of cyclopentadienyl, indenyl, tetrahydroindenyl, fluorenyl, substituted version thereof, and combinations thereof. In formula (IVa), Q is selected from the group consisting of ROO⁻, RO—, R(O)—, —NR—, —CR$_2$—, —S—, —NR$_2$, —CR$_3$, —SR, —SiR$_3$, —PR$_2$, —H, and substituted and unsubstituted aryl groups, wherein R is selected from the group consisting of $C_1$ to $C_6$ alkyls, $C_6$ to $C_{12}$ aryls, $C_1$ to $C_6$ alkylamines, $C_6$ to $C_{12}$ alkylarylamines, $C_1$ to $C_6$ alkoxys, $C_6$ to $C_{12}$ aryloxys, and the like. Non-limiting examples of Q include $C_1$ to $C_{12}$ carbamates, $C_1$ to $C_{12}$ carboxylates (e.g. pivalate), $C_2$ to $C_{20}$ alkyls, and $C_2$ to $C_{20}$ heteroallyl moieties.

In another aspect of the invention, the metallocene catalyst component is one or more as described in U.S. Pat. Nos. 5,703,187, and 5,747,406, including a dimer or oligomeric structure, such as disclosed in, for example, U.S. Pat. Nos. 5,026,798 and 6,069,213. In another aspect of the invention, the metallocene catalyst component is one or more as described in U.S. Pat. No. 6,069,213.

It is contemplated that the metallocene catalyst components described above include their structural or optical or enantiomeric isomers (racemic mixture), and may be a pure enantiomer in one embodiment. As used herein, a single, bridged, asymmetrically substituted metallocene catalyst component having a racemic and/or meso isomer does not, itself, constitute at least two different bridged, metallocene catalyst components. The "metallocene catalyst component" useful in the present invention may comprise any combination of any embodiment described herein.

Particularly useful metallocene catalyst compounds include: dimethylsilyl-bis-(tetrahydroindenyl) zirconium dichloride, dimethylsilyl-bis-(tetrahydroindenyl) zirconium dimethyl, dimethylsilyl-bis-(tetrahydroindenyl) hafnium dichloride, dimethylsilyl-bis-(tetrahydroindenyl) hafnium dimethyl, ethylene (bis indenyl) zirconium dimethyl, ethylene (bis indenyl) zirconium dichloride, ethylene (bis indenyl) hafnium dimethyl, ethylene (bis indenyl) hafnium dichloride, rac-dimethylsilylbis(indenyl)zirconium dimethyl, rac-dimethylsilylbis(indenyl)zirconium dichloride, rac-dimethylsilylbis(indenyl)hafnium dimethyl, and rac-dimethylsilylbis(indenyl)hafnium dichloride.

Activators

The terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds (such as methyl alumoxane), modified alumoxane compounds, and ionizing anion precursor compounds that abstract a reactive, σ-bound, metal ligand making the metal complex cationic and providing a charge-balancing noncoordinating or weakly coordinating anion.

In one embodiment, alumoxane activators are utilized as an activator in the catalyst composition. Examples of useful alumoxanes include methylalumoxane (MAO), modified methylalumoxane (MMAO), ethylalumoxane and isobutylalumoxane. When the activator is an alumoxane (modified or unmodified), some embodiments select the maximum amount of activator at a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

Non-coordinating anions may be used as activators herein. The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization.

It is within the scope of this invention to use an ionizing or stoichiometric activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (PCT Publication No. WO 98/43983), boric acid (U.S. Pat. No. 5,942,459), or combination thereof. It is also within the scope of this invention to use neutral or ionic activators alone or in combination with alumoxane or modified alumoxane activators.

Examples of neutral stoichiometric activators include tri-substituted boron, tellurium, aluminum, gallium, and indium, or mixtures thereof. The three substituent groups are each independently selected from alkyls, alkenyls, halogens, substituted alkyls, aryls, arylhalides, alkoxy, and halides. Preferably, the three groups are independently selected from halogen, mono or multicyclic (including halosubstituted) aryls, alkyls, and alkenyl compounds, and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, naphthyl, or mixtures thereof. Even more preferably, the three groups are halogenated, preferably fluorinated, aryl groups. A preferred neutral stoichiometric activator is tris perfluorophenyl boron or tris perfluoronaphthyl boron.

Ionic stoichiometric activator compounds may contain an active proton, or some other cation associated with, but not coordinated to, or only loosely coordinated to, the remaining ion of the ionizing compound. Such compounds and the like are described in European Publication Nos. EP 0 570 982 A; EP 0 520 732 A; EP 0 495 375 A; EP 0 500 944 B1; EP 0 277 003 A; EP 0 277 004 A; U.S. Pat. Nos. 5,153,157; 5,198,401; 5,066,741; 5,206,197; 5,241,025; 5,384,299; 5,502,124; and U.S. patent application Ser. No. 08/285,380, filed Aug. 3, 1994; all of which are herein fully incorporated by reference.

Preferred compounds useful as an activator in the process of this invention comprise a cation, which is preferably a Bronsted acid capable of donating a proton, and a compatible non-coordinating anion which anion is relatively large (bulky), capable of stabilizing the active catalyst species (the Group 4 cation) which is formed when the two compounds are combined and said anion will be sufficiently labile to be displaced by olefinic, diolefinic and acetylenically unsaturated substrates or other neutral Lewis bases, such as ethers, amines, and the like. Two classes of useful compatible non-coordinating anions have been disclosed in European Publication Nos. EP 0 277,003 A1, and EP 0 277,004 A1: 1) anionic coordination complexes comprising a plurality of lipophilic radicals covalently coordinated to and shielding a central charge-bearing metal or metalloid core; and 2) anions comprising a plurality of boron atoms such as carboranes, metallacarboranes, and boranes.

In a preferred embodiment, the stoichiometric activators include a cation and an anion component, and are preferably represented by the following formula (II):

$$(Z)_d^+(A^{d-}) \qquad (II)$$

wherein Z is (L-H) or a reducible Lewis Acid, L is an neutral Lewis base; H is hydrogen; (L-H)$^+$ is a Bronsted acid; A$^{d-}$ is a non-coordinating anion having the charge d−; and d is an integer from 1 to 3.

When Z is (L-H) such that the cation component is (L-H)$_d^+$, the cation component may include Bronsted acids such as protonated Lewis bases capable of protonating a moiety, such as an alkyl or aryl, from the bulky ligand metallocene containing transition metal catalyst precursor, resulting in a cationic transition metal species. Preferably, the activating cation (L-H)$_d^+$ is a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid it is preferably represented by the formula: (Ar$_3$C$^+$), where Ar is aryl or aryl substituted with a heteroatom, a $C_1$ to $C_{40}$ hydrocarbyl, or a substituted $C_1$ to $C_{40}$ hydrocarbyl, preferably the reducible Lewis acid is represented by the formula: (Ph$_3$C+), where Ph is phenyl or phenyl substituted with a heteroatom, a $C_1$ to $C_{40}$ hydrocarbyl, or a substituted $C_1$ to $C_{40}$ hydrocarbyl. In a preferred embodiment, the reducible Lewis acid is triphenyl carbenium.

The anion component A$^{d-}$ includes those having the formula [M$^{k+}$Q$_n$]$^{d-}$ wherein k is 1, 2, or 3; n is 1, 2, 3, 4, 5, or 6, preferably 3, 4, 5 or 6; n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide, and two Q groups may form a ring structure. Preferably, each Q is a fluorinated hydrocarbyl group having 1 to 20 carbon atoms, more preferably each Q is a fluorinated aryl group, and most preferably each Q is a pentafluoryl aryl group. Examples of suitable A$^{d-}$ components also include diboron compounds as disclosed in U.S. Pat. No. 5,447,895, which is fully incorporated herein by reference.

In another embodiment, the NCA is a Bulky activator. A "Bulky activator" as used herein refers to anionic activators represented by the formula:

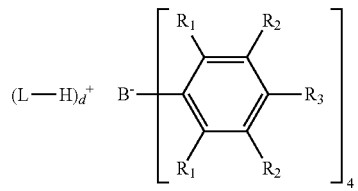

where:
each R$_1$ is, independently, a halide, preferably a fluoride;
each R$_2$ is, independently, a halide, a $C_6$ to $C_{20}$ substituted aromatic hydrocarbyl group or a siloxy group of the formula —O—Si—R$_a$, where R$_a$ is a $C_1$ to $C_{20}$ hydrocarbyl or hydrocarbylsilyl group (preferably R$_2$ is a fluoride or a perfluorinated phenyl group); each R$_3$ is a halide, $C_6$ to $C_{20}$ substituted aromatic hydrocarbyl group or a siloxy group of the formula —O—Si—R$_a$, where R$_a$ is a $C_1$ to $C_{20}$ hydrocarbyl or hydrocarbylsilyl group (preferably R$_3$ is a fluoride or a $C_6$ perfluorinated aromatic hydrocarbyl group); wherein R$_2$ and R$_3$ can form one or more saturated or unsaturated, substituted or unsubstituted rings (preferably R$_2$ and R$_3$ form a perfluorinated phenyl ring);

L is an neutral Lewis base; (L-H)$^+$ is a Bronsted acid; d is 1, 2, or 3;

wherein the anion has a molecular weight of greater than 1020 g/mol; and wherein at least three of the substituents on the B atom each have a molecular volume of greater than 250 cubic Å, alternately greater than 300 cubic Å, or alternately greater than 500 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," *Journal of Chemical Education*, Vol. 71, No. 11, November 1994, p. 962-964. Molecular volume (MV), in units of cubic Å, is calculated using the formula: MV=8.3V$_s$, where V$_s$ is the scaled volume. V$_s$ is the sum of the relative volumes of the constituent atoms, and is calculated from the molecular formula of the substituent using the following table of relative volumes. For fused rings, the V$_s$ is decreased by 7.5% per fused ring.

| Element | Relative Volume |
|---|---|
| H | 1 |
| 1$^{st}$ short period, Li to F | 2 |
| 2$^{nd}$ short period, Na to Cl | 4 |
| 1$^{st}$ long period, K to Br | 5 |
| 2$^{nd}$ long period, Rb to I | 7.5 |
| 3$^{rd}$ long period, Cs to Bi | 9 |

Exemplary activators useful herein include: methylalumoxane, modified methylalumoxane, N,N-dimethylanilinium tetrakis(heptafluoronaphthyl)borate, N,N-dimethylanilinium tetrakis(perfluorophenyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, and triphenylcarbenium tetra(perfluorophenyl)borate.

Further, the typical NCA activator-to-catalyst ratio, e.g. all NCA activators-to-catalyst ratio is a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

It is also within the scope of this invention that the catalyst compounds can be combined with combinations of alumoxanes and NCA's (see for example, U.S. Pat. Nos. 5,153,157; 5,453,410; European Publication No. EP 0 573 120 B1; PCT Publication Nos. WO 94/07928; and WO 95/14044; which discuss the use of an alumoxane in combination with an ionizing activator).

Optional Support Materials

In embodiments herein, the catalyst system may comprise an inert support material. Preferably the supported material is a porous support material, for example, talc, and inorganic oxides. Other support materials include zeolites, clays, organoclays, or any other organic or inorganic support material and the like, or mixtures thereof.

Preferably, the support material is an inorganic oxide in a finely divided form.

Suitable inorganic oxide materials for use in metallocene catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include Al$_2$O$_3$, ZrO$_2$, SiO$_2$, and combinations thereof, more preferably SiO$_2$, Al$_2$O$_3$, or SiO$_2$/Al$_2$O$_3$.

It is preferred that the support material, most preferably an inorganic oxide, has a surface area in the range of from about 10 to about 700 m$^2$/g, pore volume in the range of from about 0.1 to about 4.0 cc/g and average particle size in the range of from about 5 to about 500 m. More preferably, the surface area of the support material is in the range of from about 50 to about 500 m$^2$/g, pore volume of from about 0.5 to about 3.5 cc/g and average particle size of from about 10 to about 200 m. Most preferably the surface area of the support material is in the range of from about 100 to about 400 m$^2$/g, pore volume from about 0.8 to about 3.0 cc/g and average particle size is from about 5 to about 100 m. The average pore size of the support material useful in the invention is in the range of from 10 to 1000 Å, preferably 50 to about 500 Å, and most preferably 75 to about 350 Å. In some embodiments, the support material is a high surface area, amorphous silica (surface area=300 m$^2$/gm; pore volume of 1.65 cm$^3$/gm). Preferred silicas are marketed under the tradenames of DAVISON 952 or DAVISON 955 by the Davison Chemical Division of W.R. Grace and Company. In other embodiments DAVISON 948 is used.

Ethylene Polymers

The modifiers described herein are blended with at least one ethylene polymer to prepare the compositions of this invention.

In one aspect of the invention, the ethylene polymer is selected from ethylene homopolymers, ethylene copolymers, and blends thereof. Useful copolymers comprise one or more comonomers in addition to ethylene and can be a random copolymer, a statistical copolymer, a block copolymer, and/or blends thereof. In particular, the ethylene polymer blends described herein may be physical blends or in situ blends of more than one type of ethylene polymer or blends of ethylene polymers with polymers other than ethylene polymers where the ethylene polymer component is the majority component (e.g. greater than 50 wt %). The method of making the polyethylene is not critical, as it can be made by slurry, solution, gas phase, high pressure or other suitable processes, and by using catalyst systems appropriate for the polymerization of polyethylenes, such as Ziegler-Natta-type catalysts, chromium catalysts, metallocene-type catalysts, other appropriate catalyst systems or combinations thereof, or by free-radical polymerization. In a preferred embodiment, the ethylene polymers are made by the catalysts, activators and processes described in U.S. Pat. Nos. 6,342,566; 6,384,142; 5,741,563; PCT Publication Nos. WO 03/040201; and WO 97/19991. Such catalysts are well known in the art, and are described in, for example, ZIEGLER CATALYSTS (Gerhard Fink, Rolf Mulhaupt and Hans H. Brintzinger, eds., Springer-Verlag 1995); Resconi et al.; and I, II METALLOCENE-BASED POLYOLEFINS (Wiley & Sons 2000).

Preferred ethylene polymers and copolymers that are useful in this invention include those sold by ExxonMobil Chemical Company in Houston Tex., including those sold as ExxonMobil HDPE, ExxonMobil LLDPE, and ExxonMobil LDPE; and those sold under the ENABLE™, EXACT™, EXCEED™, ESCORENE™, EXXCO™, ESCOR™, PAXON™, and OPTEMA™ tradenames.

Preferred ethylene homopolymers and copolymers useful in this invention typically have:
1. an $M_w$ of 20,000 g/mol or more, 20,000 to 2,000,000 g/mol preferably 30,000 to 1,000,000, preferably 40,000 to 200,000, preferably 50,000 to 750,000, as measured by size exclusion chromatography according to the procedure described in the Test Methods section below; and/or
2. an $M_w/M_n$ of 1 to 40, preferably 1.6 to 20, more preferably 1.8 to 10, more preferably 1.8 to 4, preferably 8 to 25 as measured by size exclusion chromatography as described in the Test Methods section below; and/or
3. a $T_m$ of 30° C. to 150° C., preferably 30° C. to 140° C., preferably 50° C. to 140° C., more preferably 60° C. to 135° C. as determined by the DSC method described in the Test Methods section below; and/or
4. a crystallinity of 5% to 80%, preferably 10% to 70%, more preferably 20% to 60% (alternatively, the polyethylene may have a crystallinity of at least 30%, preferably at least 40%, alternatively at least 50%, where crystallinity is determined by the DSC method described in the Test Methods section below); and/or
5. a heat of fusion of 300 J/g or less, preferably 1 to 260 J/g, preferably 5 to 240 J/g, preferably 10 to 200 J/g as measured by the DSC method described in the Test Methods section below; and/or
6. a crystallization temperature (Tc) of 15° C. to 130° C., preferably 20° C. to 120° C., more preferably 25° C. to 110° C., preferably 60° C. to 125° C., as measured by the method described in the Test Methods section below; and/or
7. a heat deflection temperature of 30° C. to 120° C., preferably 40° C. to 100° C., more preferably 50° C. to 80° C. as measured according to ASTM D648 on injection molded flexure bars, at 66 psi load (455 kPa); and/or
8. a Shore hardness (D scale) of 10 or more, preferably 20 or more, preferably 30 or more, preferably 40 or more, preferably 100 or less, preferably from 25 to 75 (as measured by ASTM D 2240); and/or
9. a percent amorphous content of at least 50%, alternatively at least 60%, alternatively at least 70%, even alternatively between 50% and 95%, or 70% or less, preferably 60% or less, preferably 50% or less as determined by subtracting the percent crystallinity from 100; and/or
10. a branching index ($g'_{vis}$) of 0.97 or more, preferably 0.98 or more, preferably 0.99 or more, preferably 1, as measured using the method described in the Test Methods section below, and/or
11. a density of 0.860 to 0.980 g/cc (preferably from 0.880 to 0.940 g/cc, preferably from 0.900 to 0.935 g/cc, preferably 0.910 to 0.930 g/cc) (alternately from 0.85 to 0.97 g/cm³, preferably 0.86 to 0.965 g/cm³, preferably 0.88 to 0.96 g/cm³, alternatively between 0.860 and 0.910 g/cm³, alternatively between 0.910 and 0.940 g/cm³, or alternatively between 0.94 to 0.965 g/cm³) (determined according to ASTM D 1505 using a density-gradient column on a compression-molded specimen that has been slowly cooled to room temperature (i.e. over a period of 10 minutes or more) and allowed to age for a sufficient time that the density is constant within +/−0.001 g/cm³).

The polyethylene may be an ethylene homopolymer, such as HDPE. In another embodiment the ethylene homopolymer has a molecular weight distribution ($M_w/M_n$) of up to 40, preferably ranging from 1.5 to 20, and from 1.8 to 10 in another embodiment, and from 1.9 to 5 in yet another embodiment, and from 2.0 to 4 in yet another embodiment. In another embodiment, the 1% secant flexural modulus (determined according to ASTM D790A, where test specimen geometry is as specified under the ASTM D790 section "Molding Materials (Thermoplastics and Thermosets)," and the support span is 2 inches (5.08 cm)) of the ethylene polymer falls in a range of 200 to 1000 MPa, and from 300 to 800 MPa in another embodiment, and from 400 to 750 MPa in yet another embodiment, wherein a desirable polymer may exhibit any combination of any upper flexural modulus limit with any lower flexural modulus limit. The melt index (MI) of preferred ethylene homopolymers range from 0.05 to 800 dg/min in one embodiment, and from 0.1 to 100 dg/min in another embodiment, as measured according to ASTM D1238 (190° C., 2.16 kg).

In a preferred embodiment, the polyethylene comprises less than 20 mol % propylene units (preferably less than 15 mol %, preferably less than 10 mol %, preferably less than 5 mol %, preferably 0 mol % propylene units).

In another embodiment of the invention, the ethylene polymer useful herein is produced by polymerization of ethylene and, optionally, an alpha-olefin with a catalyst having as a transition metal component a bis(n-$C_{3-4}$ alkyl cyclopentadienyl) hafnium compound, wherein the transition metal component preferably comprises from about 95 mol % to about 99 mol % of the hafnium compound as further described in U.S. Pat. No. 9,956,088.

In another embodiment of the invention, the ethylene polymer is an ethylene copolymer, either random, or block, of ethylene and one or more comonomers selected from $C_3$ to $C_{20}$ α-olefins, typically from $C_3$ to $C_{10}$ α-olefins in another embodiment. Preferably, the comonomers are present from 0.1 wt % to 50 wt % of the copolymer in one embodiment, and from 0.5 wt % to 30 wt % in another embodiment, and from 1 wt % to 15 wt % in yet another embodiment, and from 0.1 wt % to 5 wt % in yet another embodiment, wherein a desirable copolymer comprises ethylene and $C_3$ to $C_{20}$ α-olefin derived units in any combination of any upper wt % limit with any lower wt % limit described herein. Preferably the ethylene copolymer will have a weight average molecular weight of from greater than 8,000 g/mol in one embodiment, and greater than 10,000 g/mol in another embodiment, and greater than 12,000 g/mol in yet another embodiment, and greater than 20,000 g/mol in yet another embodiment, and less than 1,000,000 g/mol in yet another embodiment, and less than 800,000 g/mol in yet another embodiment, wherein a desirable copolymer may comprise any upper molecular weight limit with any lower molecular weight limit described herein.

In another embodiment, the ethylene copolymer comprises ethylene and one or more other monomers selected from the group consisting of $C_3$ to $C_{20}$ linear, branched or cyclic monomers, and in some embodiments is a $C_3$ to $C_{12}$ linear or branched alpha-olefin, preferably butene, pentene, hexene, heptene, octene, nonene, decene, dodecene, 4-methyl-pentene-1, 3-methyl pentene-1, 3,5,5-trimethyl-hexene-1, and the like. The monomers may be present at up to 50 wt %, preferably from 0 wt % to 40 wt %, more preferably from 0.5 wt % to 30 wt %, more preferably from 2 wt % to 30 wt %, more preferably from 5 wt % to 20 wt %.

Preferred linear alpha-olefins useful as comonomers for the ethylene copolymers useful in this invention include $C_3$ to $C_8$ alpha-olefins, more preferably 1-butene, 1-hexene, and 1-octene, even more preferably 1-hexene. Preferred branched alpha-olefins include 4-methyl-1-pentene, 3-methyl-1-pentene, and 3,5,5-trimethyl-1-hexene, 5-ethyl-1-nonene. Preferred aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to $C_1$ to $C_{10}$ alkyl groups. Additionally, two adjacent substitutions may be joined to form a ring structure. Preferred aromatic-group-containing monomers contain at least one aromatic structure appended to a polymerizable olefinic moiety. Particularly, preferred aromatic monomers include styrene, alpha-methylstyrene, para-alkyl-styrenes, vinyltoluenes, vinylnaphthalene, allyl benzene, and indene, especially styrene, paramethyl styrene, 4-phenyl-1-butene and allyl benzene.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e. di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes ($M_w$ less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

In a preferred embodiment, one or more dienes are present in the ethylene polymer at up to 10 wt %, preferably at 0.00001 wt % to 2 wt %, preferably 0.002 wt % to 1 wt %, even more preferably 0.003 wt % to 0.5 wt %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

In a particularly desirable embodiment, the ethylene polymer used herein is a plastomer having a density of 0.91 g/cm³ or less, as determined by ASTM D1505, and a melt index (MI) between 0.1 and 50 dg/min, as determined by ASTM D1238 (190° C., 2.16 kg). In one embodiment, the useful plastomer is a copolymer of ethylene and at least one $C_3$ to $C_{12}$ α-olefin, preferably $C_4$ to $C_8$ α-olefins. The amount of $C_3$ to $C_{12}$ α-olefin present in the plastomer ranges from 2 wt % to 35 wt % in one embodiment, and from 5 wt % to 30 wt % in another embodiment, and from 15 wt % to 25 wt % in yet another embodiment, and from 20 wt % to 30 wt % in yet another embodiment.

Preferred plastomers useful in the invention have a melt index of between 0.1 and 40 dg/min in one embodiment, and from 0.2 to 20 dg/min in another embodiment, and from 0.5 to 10 dg/min in yet another embodiment. The average molecular weight of preferred plastomers ranges from 10,000 to 800,000 g/mole in one embodiment, and from 20,000 to 700,000 g/mole in another embodiment. The 1% secant flexural modulus (ASTM D790A Flexural properties at room temperature are determined according to ASTM D790 Å,-test specimen geometry was as specified under the ASTM D790 section "Molding Materials (Thermoplastics and Thermosets)," and the support span was 2 inches (5.08 cm).) of preferred plastomers ranges from 5 MPa to 100 MPa in one embodiment, and from 10 MPa to 50 MPa in another embodiment. Further, preferred plastomers that are useful in compositions of the present invention have a melting temperature ($T_m$) of from 30° C. to 100° C. in one embodiment, and from 40° C. to 80° C. in another embodiment. The degree of crystallinity of preferred plastomers is between 3% and 30%.

Particularly, preferred plastomers useful in the present invention are synthesized using a single-site catalyst, such as a metallocene catalyst, and comprise copolymers of ethylene and higher α-olefins such as propylene, 1-butene, 1-hexene and 1-octene, and which contain enough of one or more of these comonomer units to yield a density between 0.86 and 0.91 g/cm³ in one embodiment. The molecular weight distribution ($M_w/M_n$) of desirable plastomers ranges from 1.5 to 5 in one embodiment and from 2.0 to 4 in another embodiment. Examples of commercially available plastomers are EXACT™ 4150, a copolymer of ethylene and 1-hexene, the 1-hexene derived units making up from 18 wt % to 22 wt % of the plastomer and having a density of 0.895 g/cm³ and MI of 3.5 dg/min (ExxonMobil Chemical Company, Houston, Tex.); and EXACT™ 8201, a copolymer of ethylene and 1-octene, the 1-octene derived units making up from 26 wt % to 30 wt % of the plastomer, and having a density of 0.882 g/cm³ and MI of 1.0 dg/min (ExxonMobil Chemical Company, Houston, Tex.).

The melt index (MI) of preferred ethylene polymers, as measured according to ASTM D1238 (190° C., 2.16 kg), ranges from 0.02 dg/min to 800 dg/min in one embodiment, from 0.05 to 500 dg/min in another embodiment, and from 0.1 to 100 dg/min in another embodiment. In another embodiment of the present invention, the polyethylene has a MI of 20 dg/min or less, 7 dg/min or less, 5 dg/min or less, or 2 dg/min or less, or less than 2 dg/min. In yet another embodiment, the polymer has a Mooney viscosity, ML(1+4) @ 125° C. (measured according to ASTM D1646) of 100 or less, 75 or less, 60 or less, or 30 or less.

In yet another embodiment, the 1% secant flexural modulus of preferred ethylene polymers ranges from 5 MPa to 1000 MPa, and from 10 MPa to 800 MPa in another embodiment, and from 5 MPa to 200 MPa in yet another embodiment, wherein a desirable polymer may exhibit any combination of any upper flexural modulus limit with any lower flexural modulus limit.

The crystallinity of the polymer may also be expressed in terms of crystallinity percent. The thermal energy for the highest order of polyethylene is estimated at 290 J/g. That is, 100% crystallinity is equal to 290 J/g. Preferably, the polymer has a crystallinity (as determined by DSC as described in the Test Methods section below) within the range having an upper limit of 80%, 60%, 40%, 30%, or 20%, and a lower limit of 1%, 3%, 5%, 8%, or 10%. Alternately, the polymer has a crystallinity of 5% to 80%, preferably 10% to 70, more preferably 20% to 60%. Alternatively the polyethylene may have a crystallinity of at least 30%, preferably at least 40%, alternatively at least 50%, where crystallinity is determined.

The level of crystallinity may be reflected in the melting point. In one embodiment of the present invention, the ethylene polymer has a single melting point. Typically, a sample of ethylene copolymer will show secondary melting peaks adjacent to the principal peak, which is considered together as a single melting point. The highest of these peaks is considered the melting point. The polymer preferably has a melting point (as determined by DSC as described in the Test Methods section below) ranging from an upper limit of 150° C., 130° C. or 100° C. to a lower limit of 0° C., 30° C., 35° C., 40° C., or 45° C.

Preferred ethylene copolymers useful herein are preferably a copolymer comprising at least 50 wt % ethylene and having up to 50 wt %, preferably 1 wt % to 35 wt %, even more preferably 1 wt % to 6 wt % of a $C_3$ to $C_{20}$ comonomer (preferably hexene or octene), based upon the weight of the copolymer. The polyethylene copolymers preferably have a composition distribution breadth index (CDBI) of 60% or more, preferably 60% to 80%, preferably 65% to 80%. In another preferred embodiment, the ethylene copolymer has a density of 0.910 to 0.950 g/cm³ (preferably 0.915 to 0.940 g/cm³, preferably 0.918 to 0.925 g/cm³) and a CDBI of 60% to 80%, preferably between 65% and 80%. Preferably these polymers are metallocene polyethylenes (mPEs).

Further useful mPEs include those described in U.S. Publication No. 2007/0260016 and U.S. Pat. No. 6,476,171, e.g. copolymers of an ethylene and at least one alpha olefin having at least 5 carbon atoms obtainable by a continuous gas phase polymerization using supported catalyst of an activated molecularly discrete catalyst in the substantial absence of an aluminum alkyl based scavenger (e.g. triethylaluminum, trimethylaluminum, tri-isobutyl aluminum, tri-n-hexylaluminum and the like), which polymer has a Melt Index of from 0.1 to 15 (ASTM D 1238, condition E); a CDBI of at least 70%, a density of from 0.910 to 0.930 g/cc; a Haze (ASTM D1003) value of less than 20; a Melt Index ratio (I21/I1, ASTMD 1238) of from 35 to 80; an averaged Modulus (M) (as defined in U.S. Pat. No. 6,255,426) of from 20,000 to 60,000 psi (13790 to 41369 N/cm²) and a relation between M and the Dart Impact Strength (26 inch, ASTM D 1709) in g/mil (DIS) complying with the formula:

$$DIS \geq 0.8 \times [100 + e^{(11.71 - 0.000268 \times M + 2.183 \times 10^{-9} \times M^2)}]$$

where "e" represents 2.1783, the base Napierian logarithm, M is the averaged Modulus in psi and DIS is the 26 inch (66 cm) dart impact strength.

Useful mPE homopolymers or copolymers may be produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted. Several commercial products produced with such catalyst/activator combinations are commercially available from ExxonMobil Chemical Company in Baytown, Tex. under the tradename EXCEED™ Polyethylene or ENABLE™ Polyethylene.

Additives

The polyethylene compositions of the present invention may also contain other additives. Those additives include antioxidants, nucleating agents, acid scavengers, stabilizers, anticorrosion agents, plasticizers, blowing agents, cavitating agents, surfactants, adjuvants, block, antiblock, UV absorbers such as chain-breaking antioxidants, etc., quenchers, antistatic agents, slip agents, processing aids, UV stabilizers, neutralizers, lubricants, waxes, color masterbatches, pigments, dyes and fillers and cure agents such as peroxide. In a preferred embodiment, the additives may each individually present at 0.01 wt % to 50 wt % in one embodiment, from 0.01 wt % to 10 wt % in another embodiment, and from 0.1 wt % to 6 wt % in another embodiment, based upon the weight of the composition. In a preferred embodiment, dyes and other colorants common in the industry may be present from 0.01 wt % to 10 wt % in one embodiment, and from 0.1 wt % to 6 wt % in another embodiment, based upon the weight of the composition. Preferred fillers, cavitating agents and/or nucleating agents include titanium dioxide, calcium carbonate, barium sulfate, silica, silicon dioxide, carbon black, sand, glass beads, mineral aggregates, talc, clay and the like.

In particular, antioxidants and stabilizers such as organic phosphites, hindered amines, and phenolic antioxidants may be present in the polyethylene compositions of the invention from 0.001 wt % to 2 wt %, based upon the weight of the composition, in one embodiment, and from 0.01 wt % to 0.8 wt % in another embodiment, and from 0.02 wt % to 0.5 wt % in yet another embodiment. Non-limiting examples of organic phosphites that are suitable are tris(2,4-di-tert-butylphenyl)phosphite (IRGAFOS 168) and di(2,4-di-tert-butylphenyl)pentaerithritol diphosphite (ULTRANOX 626). Non-limiting examples of hindered amines include poly[2-N,N'-di(2,2,6,6-tetramethyl-4-piperidinyl)-hexanediamine-4-(1-amino-1,1,3,3-tetramethylbutane)sym-triazine] (CHIMASORB 944); bis(1,2,2,6,6-pentamethyl-4-piperidyl) sebacate (TINUVIN 770). Non-limiting examples of phenolic antioxidants include pentaerythrityl tetrakis(3,5-di-tert-butyl-4-hydroxyphenyl) propionate (IRGANOX 1010); and 1,3,5-Tri(3,5-di-tert-butyl-4-hydroxybenzyl-isocyanurate (IRGANOX 3114).

Fillers may be present from 0.001 wt % to 50 wt % in one embodiment, and from 0.01 wt % to 25 wt %, based upon the weight of the composition, in another embodiment, and from 0.2 wt % to 10 wt % in yet another embodiment. Desirable fillers include but are not limited to titanium dioxide, silicon carbide, silica (and other oxides of silica, precipitated or not), antimony oxide, lead carbonate, zinc white, lithopone, zircon, corundum, spinel, apatite, Barytes powder, barium sulfate, magnesiter, carbon black, dolomite, calcium carbonate, talc and hydrotalcite compounds of the ions Mg, Ca, or Zn with Al, Cr or Fe and $CO_3$ and/or $HPO_4$, hydrated or not; quartz powder, hydrochloric magnesium carbonate, glass fibers, clays, alumina, and other metal oxides and carbonates, metal hydroxides, chrome, phosphorous and brominated flame retardants, antimony trioxide, silica, silicone, and blends thereof. These fillers may particularly include any other fillers and porous fillers and supports known in the art, and may have the modifier of the invention pre-contacted, or pre-absorbed into the filler prior to addition to the ethylene polymer in one embodiment.

Metal salts of fatty acids may also be present in the polyethylene compositions of the present invention. Such salts may be present from 0.001 wt % to 1 wt % of the composition in one embodiment, and from 0.01 wt % to 0.8 wt % in another embodiment. Examples of fatty acids include lauric acid, stearic acid, succinic acid, stearyl lactic acid, lactic acid, phthalic acid, benzoic acid, hydroxystearic acid, ricinoleic acid, naphthenic acid, oleic acid, palmitic acid, erucic acid, or any monocarboxylic aliphatic saturated or unsaturated acid having a chain length of 7 to 22 carbon atoms. Suitable metals include Li, Na, Mg, Ca, Sr, Ba, Zn, Cd, Al, Sn, Pb, and so forth. Preferably, metal salts of fatty acids are magnesium stearate, calcium stearate, sodium stearate, zinc stearate, calcium oleate, zinc oleate, and magnesium oleate.

In a preferred embodiment, slip additives may be present in the compositions of this invention. Preferably, the slip additives are present at 0.001 wt % to 1 wt % (10 ppm to 10,000 ppm), more preferably 0.01 wt % to 0.5 wt % (100 ppm to 5000 ppm), more preferably 0.1 wt % to 0.3 wt % (1000 ppm to 3000 ppm), based upon the weight of the composition. Desirable slip additives include but are not limited to saturated fatty acid amides (such as palmitamide, stearamide, arachidamide, behenamide, stearyl stearamide, palmityl pamitamide, and stearyl arachidamide); saturated ethylene-bis-amides (such as stearamido-ethyl-stearamide, stearamido-ethyl-palmitamide, and palmitamido-ethyl-stearamide); unsaturated fatty acid amides (such as oleamide, erucamide, and linoleamide); unsaturated ethylene-bis-amides (such as ethylene-bis-stearamide, ethylene-bis-oleamide, stearyl-erucamide, erucamido-ethyl-erucamide, oleamido-ethyl-oleamide, erucamido-ethyl-oleamide, oleamido-ethy-lerucamide, stearamido-ethyl-erucamide, erucamido-ethyl-palmitamide, and palmitamido-ethyl-oleamide); glycols; polyether polyols (such as Carbowax); acids of aliphatic hydrocarbons (such as adipic acid and sebacic acid); esters of aromatic or aliphatic hydrocarbons (such as glycerol monostearate and pentaerythritol monooleate); styrene-alpha-methyl styrene; fluoro-containing polymers (such as polytetrafluoroethylene, fluorine oils, and fluorine waxes); silicon compounds (such as silanes and silicone polymers, including silicone oils, modified silicones and cured silicones); sodium alkylsulfates, alkyl phosphoric acid esters; and mixtures thereof. Preferred slip additives are unsaturated fatty acid amides, which are commercially available from Crompton (Kekamide™ grades), Croda Universal (Crodamide™ grades), and Akzo Nobel Amides Co. Ltd. (ARMOSLIP™ grades).

Particularly, preferred slip agents include unsaturated fatty acid amides having the chemical structure:

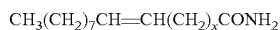

$CH_3(CH_2)_7CH=CH(CH_2)_xCONH_2$ where x is 5 to 15. Preferred versions include: 1) Erucamide, where x is 11, also referred to as cis-13-docosenoamide (commercially available as ARMOSLIP E); 2) Oleylamide, where x is 8; and 3) Oleamide, where x is 7, also referred to as N-9-octadecenyl-hexadecanamide. In another embodiment, stearamide is also useful in this invention. Other preferred slip additives include those described in PCT Publication No. WO 2004/005601A1.

In some embodiments, the polyethylene compositions produced by this invention may be blended with one or more other polymers, including but not limited to, thermoplastic polymer(s) and/or elastomer(s).

By "thermoplastic polymer(s)" is meant a polymer that can be melted by heat and then cooled without appreciable change in solid-state properties before and after heating. Thermoplastic polymers typically include, but are not limited to, polyolefins, polyamides, polyesters, polycarbonates, polysulfones, polyacetals, polylactones, acrylonitrile-butadiene-styrene resins, polyphenylene oxide, polyphenylene sulfide, styrene-acrylonitrile resins, styrene maleic anhydride, polyimides, aromatic polyketones, or mixtures of two or more of the above. Preferred polyolefins include, but are not limited to, polymers comprising one or more linear, branched or cyclic $C_2$ to $C_{40}$ olefins, preferably polymers comprising ethylene copolymerized with one or more $C_3$ to $C_{40}$ olefins, preferably a $C_3$ to $C_{20}$ alpha olefin, more preferably $C_3$ to $C_{10}$ alpha-olefins. A particularly preferred example is polybutene. The most preferred polyolefin is polypropylene. Other preferred polyolefins include, but are not limited to, polymers comprising ethylene including but not limited to ethylene copolymerized with a $C_3$ to $C_{40}$ olefin, preferably a $C_3$ to $C_{20}$ alpha olefin, more preferably propylene, butene, hexene, and/or octene.

By "elastomers" is meant all natural and synthetic rubbers, including those defined in ASTM D1566. Examples of preferred elastomers include, but are not limited to, ethylene propylene rubber, ethylene propylene diene monomer rubber, styrenic block copolymer rubbers (including SEBS, SI, SIS, SB, SBS, SIBS and the like, where S=styrene, EB=random ethylene+butene, I=isoprene, and B=butadiene), butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber, chlorinated isoprene rubber, acrylonitrile chlorinated isoprene rubber, polybutadiene rubber (both cis and trans).

In another embodiment, the blend comprising the modifier may further be combined with one or more polymers polymerizable by a high-pressure free radical process, polyvinylchloride, polybutene-1, isotactic polybutene, ABS resins, block copolymer, styrenic block copolymers, polyamides, polycarbonates, PET resins, crosslinked polyethylene, copolymers of ethylene and vinyl alcohol (EVOH), polymers of aromatic monomers such as polystyrene, poly-1 esters, polyacetal, polyvinylidine fluoride, polyethylene glycols and/or polyisobutylene.

Tackifiers may be blended with the ethylene compositions of this invention. Examples of useful tackifiers include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments, the tackifier is hydrogenated. In other embodiments the tackifier is non-polar. Non-polar means that the tackifier is substantially free of monomers having polar groups. Preferably, the polar groups are not present; however, if they are, preferably they are present at not more than 5 wt %, preferably not more than 2 wt %, even more preferably no more than 0.5 wt %, based upon the weight of the tackifier. In some embodiments, the tackifier has a softening point (Ring and Ball, as measured by ASTM E-28) of 80° C. to 140° C., preferably 100° C. to 130° C. The tackifier, if present, is typically present at about 1 wt % to about 50 wt %, based upon the weight of the blend, more preferably 10 wt % to 40 wt %, even more preferably 20 wt % to 40 wt %. Preferably, however, tackifier is not present, or if present, is present at less than 10 wt %, preferably less than 5 wt %, more preferably at less than 1 wt %.

Blending and Processing

The compositions and blends described herein may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process. Additionally, additives may be included in the blend, in one or more components of the blend, and/or in a product formed from the blend, such as a film, as desired. Such additives are well known in the art, and can include, for example: fillers; antioxidants (e.g. hindered phenolics such as IRGANOX™ 1010 or IRGANOX™ 1076 available from Ciba-Geigy); phosphites (e.g. IRGAFOS™ 168 available from Ciba-Geigy); anti-cling additives; tackifiers, such as polybutenes, terpene resins, aliphatic and aromatic hydrocarbon resins, alkali metal and glycerol stearates and hydrogenated rosins; UV stabilizers; heat stabilizers; agents; release agents; anti-static agents; pigments; colorants; dyes; waxes; silica; fillers; talc; and the like.

The polymers suitable for use in the present invention can be in any physical form when used to blend with the modifier of the invention. In one embodiment, reactor granules, defined as the granules of polymer that are isolated from the polymerization reactor prior to any processing procedures, are used to blend with the modifier of the invention. The reactor granules typically have an average diameter of from 50 μm to 10 mm in one embodiment, and from 10 μm to 5 mm in another embodiment. In another embodiment, the polymer is in the form of pellets, such as, for example, having an average diameter of from 1 mm to 10 mm that are formed from melt extrusion of the reactor granules.

The components of the present invention can be blended by any suitable means, and are typically blended to yield an intimately mixed composition which may be a homogeneous, single phase mixture. For example, they may be blended in a static mixer, batch mixer, extruder, or a combination thereof, that is sufficient to achieve an adequate dispersion of modifier in the polymer.

The mixing step may involve first dry blending using, for example, a tumble blender, where the polymer and modifier are brought into contact first, without intimate mixing, which may then be followed by melt blending in an extruder. Another method of blending the components is to melt blend the polymer pellets with the modifier directly in an extruder or batch mixer. It may also involve a "master batch" approach, where the final modifier concentration is achieved by combining neat polymer with an appropriate amount of modified polymer that had been previously prepared at a higher modifier concentration. The mixing step may take place as part of a processing method used to fabricate articles, such as in the extruder on an injection molding machine or blown-film line or fiber line.

In a preferred aspect of the invention, the ethylene polymer and modifier are "melt blended" in an apparatus such as an extruder (single or twin screw) or batch mixer. The ethylene polymer may also be "dry blended" with the modifier using a tumbler, double-cone blender, ribbon blender, or other suitable blender. In yet another embodiment, the ethylene polymer and modifier are blended by a combination of approaches, for example a tumbler followed by an extruder. A preferred method of blending is to include the final stage of blending as part of an article fabrication step, such as in the extruder used to melt and convey the composition for a molding step like injection molding or blow molding. This could include direct injection of the modifier into the extruder, either before or after the polyethylene is fully melted. Extrusion technology for polyethylene is described in more detail in, for example, PLASTICS EXTRUSION TECHNOLOGY p. 26-37 (Friedhelm Hensen, ed. Hanser Publishers 1988).

In another aspect of the invention, the polyethylene composition may be blended in solution by any suitable means, by using a solvent that dissolves both components to a significant extent. The blending may occur at any temperature or pressure where the modifier and the ethylene polymer remain in solution. Preferred conditions include blending at high temperatures, such as 10° C. or more, preferably 20° C. or more over the melting point of the ethylene polymer. Such solution blending would be particularly useful in processes where the ethylene polymer is made by solution process and the modifier is added directly to the finishing train, rather than added to the dry polymer in another blending step altogether. Such solution blending would also be particularly useful in processes where the ethylene polymer is made in a bulk or high pressure process where both the polymer and the modifier were soluble in the monomer. As with the solution process, the modifier is added directly to the finishing train rather than added to the dry polymer in another blending step altogether.

Thus, in the cases of fabrication of articles using methods that involve an extruder, such as injection molding or blow molding, any means of combining the polyethylene and modifier to achieve the desired composition serve equally well as fully formulated pre-blended pellets, since the forming process includes a re-melting and mixing of the raw material; example combinations include simple blends of neat polymer pellets and modifier, neat polymer granules and modifier, neat polymer pellets and pre-blended pellets, and neat polymer granules and pre-blended pellets. Here, "pre-blended pellets" means pellets of a polyethylene composition comprising ethylene polymer and modifier at some concentration. In the process of compression molding, however, little mixing of the melt components occurs, and pre-blended pellets would be preferred over simple blends of the constituent pellets (or granules) and modifier. Those skilled in the art will be able to determine the appropriate procedure for blending of the polymers to balance the need for intimate mixing of the component ingredients with the desire for process economy.

Applications

The enhanced properties of the polyethylene compositions described herein are useful in a wide variety of applications, including transparent articles such as cook and storage ware, and in other articles such as furniture, automotive components, toys, sportswear, medical devices, sterilizable medical devices and sterilization containers, nonwoven fibers and fabrics and articles therefrom such as drapes, gowns, filters, hygiene products, diapers, and films, oriented films, sheets, tubes, pipes and other items where softness, high impact strength, and impact strength below freezing is important.

Additional examples of desirable articles of manufacture made from compositions of the invention include films, sheets, fibers, woven and nonwoven fabrics, automotive components, furniture, sporting equipment, food storage containers, transparent and semi-transparent articles, toys, tubing and pipes, sheets, packaging, bags, sacks, coatings, caps, closures, crates, pallets, cups, non-food containers, pails, insulation, and medical devices. Further examples include automotive components, wire and cable jacketing, pipes, agricultural films, geomembranes, toys, sporting equipment, medical devices, casting and blowing of packaging films, extrusion of tubing, pipes and profiles, sporting equipment, outdoor furniture (e.g. garden furniture), playground equipment, boat and water craft components, and other such articles. In particular, the compositions are suitable for automotive components such as bumpers, grills, trim parts, dashboards, instrument panels, exterior door and hood components, spoiler, wind screen, hub caps, mirror housing, body panel, protective side molding, and other interior and external components associated with automobiles, trucks, boats, and other vehicles.

Other useful articles and goods may be formed economically by the practice of our invention including: crates, containers, packaging, labware, such as roller bottles for culture growth and media bottles, office floor mats, instrumentation sample holders and sample windows; liquid storage containers such as bags, pouches, and bottles for storage and IV infusion of blood or solutions; packaging material including those for any medical device or drugs including unit-dose or other blister or bubble pack as well as for wrapping or containing food preserved by irradiation. Other useful items include medical tubing and valves for any medical device including infusion kits, catheters, and respiratory therapy, as well as packaging materials for medical devices or food which is irradiated including trays, as well as stored liquid, particularly water, milk, or juice, containers including unit servings and bulk storage containers as well as transfer means such as tubing, pipes, and such.

Fabrication of these articles may be accomplished by injection molding, extrusion, thermoforming, blow molding, rotational molding (rotomolding), fiber spinning, spin bonding or melt blown bonding such as for non-woven fabrics, film blowing, stretching for oriented films, casting such as for films (including use of chill rolls), profile deformation, coating (film, wire, and cable), compression molding, calendering, foaming, laminating, transfer molding, cast molding, pultrusion, protrusion, draw reduction, and other common processing methods, or combinations thereof, such as is known in the art and described in, for example, PLASTICS PROCESSING (Radian Corporation, Noyes Data Corp. 1986). Use of at least thermoforming or film applications allows for the possibility of and derivation of benefits from uniaxial or biaxial orientation. Sufficient mixing should take place to assure that an intimately mixed, preferably uniform blend will be produced prior to conversion into a finished product.

Adhesives

The polymers of this invention or blends thereof can be used as adhesives, either alone or combined with tackifiers. Preferred tackifiers are described above. The tackifier is typically present at about 1 wt % to about 50 wt %, based upon the weight of the blend, more preferably 10 wt % to 40 wt %, even more preferably 20 wt % to 40 wt %. Other additives, as described above, may also be added.

The adhesives of this invention can be used in any adhesive application, including but not limited to, disposables, packaging, laminates, pressure sensitive adhesives, tapes labels, wood binding, paper binding, non-wovens, road marking, reflective coatings, and the like. In a preferred embodiment the adhesives of this invention can be used for disposable diaper and napkin chassis construction, elastic attachment in disposable goods converting, packaging, labeling, bookbinding, woodworking, and other assembly applications. Particularly, preferred applications include: baby diaper leg elastic, diaper frontal tape, diaper standing leg cuff, diaper chassis construction, diaper core stabilization, diaper liquid transfer layer, diaper outer cover lamination, diaper elastic cuff lamination, feminine napkin core stabilization, feminine napkin adhesive strip, industrial filtration bonding, industrial filter material lamination, filter mask lamination, surgical gown lamination, surgical drape lamination, and perishable products packaging.

Films

The compositions described above and the blends thereof may be formed into monolayer or multilayer films. These films may be formed by any of the conventional techniques known in the art including extrusion, co-extrusion, extrusion coating, lamination, blowing and casting. The film may be obtained by the flat film or tubular process which may be followed by orientation in a uniaxial direction or in two mutually perpendicular directions in the plane of the film. One or more of the layers of the film may be oriented in the transverse and/or longitudinal directions to the same or different extents. This orientation may occur before or after the individual layers are brought together. For example a polyethylene layer can be extrusion coated or laminated onto an oriented polypropylene layer or the polyethylene and polypropylene can be coextruded together into a film then oriented. Likewise, oriented polypropylene could be laminated to oriented polyethylene, or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15 preferably 7 to 9. However in another embodiment the film is oriented to the same extent in both the MD and TD directions.

In multilayer constructions, the other layer(s) may be any layer typically included in multilayer film structures. For example the other layer or layers may be:

1. Polyolefins. Preferred polyolefins include homopolymers or copolymers of $C_2$ to $C_{40}$ olefins, preferably $C_2$ to $C_{20}$ olefins, preferably a copolymer of an alpha-olefin and another olefin or alpha-olefin (ethylene is defined to be an alpha-olefin for purposes of this invention). Preferably homopolyethylene, homopolypropylene, propylene copolymerized with ethylene and or butene, ethylene copolymerized with one or more of propylene, butene or hexene, and optional dienes. Preferred examples include thermoplastic polymers such as ultra low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene and ethylene and/or butene and/or hexene, elastomers such as ethylene propylene rubber, ethylene propylene diene monomer rubber, neoprene, and blends of thermoplastic polymers and elastomers, such as, for example, thermoplastic elastomers and rubber toughened plastics.

2. Polar polymers. Preferred polar polymers include homopolymers and copolymers of esters, amides, acetates, anhydrides, copolymers of a $C_2$ to $C_{20}$ olefin, such as ethylene and/or propylene and/or butene with one or more polar monomers such as acetates, anhydrides, esters, alcohol, and or acrylics. Preferred examples include polyesters, polyamides, ethylene vinyl acetate copolymers, and polyvinyl chloride.

3. Cationic polymers. Preferred cationic polymers include polymers or copolymers of geminally disubstituted olefins, alpha-heteroatom olefins and/or styrenic monomers. Preferred geminally disubstituted olefins include isobutylene, isopentene, isoheptene, isohexane, isooctene, isodecene, and isododecene. Preferred alpha-heteroatom olefins include vinyl ether and vinyl carbazole, preferred styrenic monomers include styrene, alkyl styrene, para-alkyl styrene, alpha-methyl styrene, chloro-styrene, and bromo-para-methyl styrene. Preferred examples of cationic polymers include butyl rubber, isobutylene copolymerized with para methyl styrene, polystyrene, and poly-alpha-methyl styrene.

4. Miscellaneous. Other preferred layers can be paper, wood, cardboard, metal, metal foils (such as aluminum foil and tin foil), metallized surfaces, glass (including silicon oxide ($SiO_x$) coatings applied by evaporating silicon oxide onto a film surface), fabric, spunbonded fibers, and non-wovens (particularly polypropylene spun bonded fibers or non-wovens), and substrates coated with inks, dyes, pigments, and the like.

The films may vary in thickness depending on the intended application; however, films of a thickness from 1 μm to 250 μm are usually suitable. Films intended for packaging are usually from 10 to 60 micron thick. The thickness of the sealing layer is typically 0.2 μm to 50 μm. There may be a sealing layer on both the inner and outer surfaces of the film or the sealing layer may be present on only the inner or the outer surface. Films intended for heavier use, such as geomembranes), can be from 25 μm to 260 μm thick, preferably from 25 μm to 130 μm thick, preferably from 50 μm to 110 μm thick.

Additives such as block, antiblock, antioxidants, pigments, fillers, processing aids, UV stabilizers, neutralizers, lubricants, surfactants and/or nucleating agents may also be present in one or more than one layer in the films. Preferred additives include silicon dioxide, titanium dioxide, polydimethylsiloxane, talc, dyes, wax, calcium sterate, carbon black, low molecular weight resins and glass beads, preferably these additives are present at from 0.1 ppm to 1000 ppm.

In another embodiment, one more layers may be modified by corona treatment, electron beam irradiation, gamma irradiation, or microwave irradiation. In a preferred embodiment, one or both of the surface layers is modified by corona treatment.

The films described herein may also comprise from 5 wt % to 60 wt %, based upon the weight of the polymer and the resin, of a hydrocarbon resin. The resin may be combined with the polymer of the seal layer(s) or may be combined with the polymer in the core layer(s). The resin preferably has a softening point above 100° C., even more preferably from 130° C. to 180° C. Preferred hydrocarbon resins include those described above. The films comprising a hydrocarbon resin may be oriented in uniaxial or biaxial directions to the same or different degrees. For more information on blends of tackifiers and modifiers useful herein, see U.S. Application No. 60/617,594, filed Oct. 8, 2004.

The films described above may be used as stretch and/or cling films. Stretch/cling films are used in various bundling, packaging and palletizing operations. To impart cling properties to, or improve the cling properties of a particular film, a number of well-known tackifying additives have been utilized. Common tackifying additives include polybutenes, terpene resins, alkali metal stearates and hydrogenated rosins and rosin esters. The cling properties of a film can also be modified by the well-known physical process referred to as corona discharge. Some polymers (such as ethylene methyl acrylate copolymers) do not need cling additives and can be used as cling layers without tackifiers. Stretch/cling films may comprise a slip layer comprising any suitable polyolefin or combination of polyolefins such as polyethylene, polypropylene, copolymers of ethylene and propylene, and polymers obtained from ethylene and/or propylene copolymerized with minor amounts of other olefins, particularly $C_4$ to $C_{12}$ olefins. Particularly, preferred is linear low density polyethylene (LLDPE). Additionally, the slip layer may include one or more anticling (slip and/or antiblock) additives which may be added during the production of the polyolefin or subsequently blended in to improve the slip properties of this layer. Such additives are well-known in the art and include, for example, silicas, silicates, diatomaceous earths, talcs, and various lubricants. These additives are preferably utilized in amounts ranging from about 100 ppm to about 20,000 ppm, more preferably between about 500 ppm to about 10,000 ppm, by weight based upon the weight of the slip layer. The slip layer may, if desired, also include one or more other additives as described above.

In a preferred embodiment, films prepared from the compositions described herein have improved bubble stability compared to the ethylene copolymers of the compositions alone as determined by reduced gauge variation, e.g. a gauge variation of 10% or less, preferably 8% or less, preferably 5% or less.

In a preferred embodiment, films prepared from the compositions described herein have excellent optical properties, such as a haze (ASTM D1003) of 20 or less, preferably 15 or less, preferably 10 or less.

Molded and Extruded Products

The polyethylene composition described above may also be used to prepare molded products in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art.

The compositions described herein may be shaped into desirable end use articles by any suitable means known in the art. Thermoforming, vacuum forming, blow molding, rotational molding, slush molding, transfer molding, wet lay-up or contact molding, cast molding, cold forming, matched-die molding, injection molding, spray techniques, profile co-extrusion, or combinations thereof are typically used methods.

Thermoforming is a process of forming at least one pliable plastic sheet into a desired shape. An embodiment of a thermoforming sequence is described, however, this should not be construed as limiting the thermoforming methods useful with the compositions of this invention. First, an extrudate film of the composition of this invention (and any other layers or materials) is placed on a shuttle rack to hold it during heating. The shuttle rack indexes into the oven which pre-heats the film before forming. Once the film is heated, the shuttle rack indexes back to the forming tool. The film is then vacuumed onto the forming tool to hold it in place and the forming tool is closed. The forming tool can be either "male" or "female" type tools. The tool stays closed to cool the film and the tool is then opened. The shaped laminate is then removed from the tool. Thermoforming is accomplished by vacuum, positive air pressure, plug-assisted vacuum forming, or combinations and variations of these, once the sheet of material reaches thermoforming temperatures, typically of from 140° C. to 185° C.

or higher. A pre-stretched bubble step is used, especially on large parts, to improve material distribution. In one embodiment, an articulating rack lifts the heated laminate towards a male forming tool, assisted by the application of a vacuum from orifices in the male forming tool. Once the laminate is firmly formed about the male forming tool, the thermoformed shaped laminate is then cooled, typically by blowers. Plug-assisted forming is generally used for small, deep drawn parts. Plug material, design, and timing can be critical to optimization of the process. Plugs made from insulating foam avoid premature quenching of the plastic. The plug shape is usually similar to the mold cavity, but smaller and without part detail. A round plug bottom will usually promote even material distribution and uniform side-wall thickness. For a semicrystalline polymer, fast plug speeds generally provide the best material distribution in the part. The shaped laminate is then cooled in the mold. Sufficient cooling to maintain a mold temperature of 30° C. to 65° C. is desirable. The part is below 90° C. to 100° C. before ejection in one embodiment. The shaped laminate is then trimmed of excess laminate material.

Blow molding is another suitable forming means, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING (Jacqueline I. Kroschwitz, ed., John Wiley & Sons 1990).

In yet another embodiment of the formation and shaping process, profile co-extrusion can be used. The profile co-extrusion process parameters are as above for the blow molding process, except the die temperatures (dual zone top and bottom) range from 150° C. to 235° C., the feed blocks are from 90° C. to 250° C., and the water cooling tank temperatures are from 10° C. to 40° C.

One embodiment of an injection molding process is described as follows. The shaped laminate is placed into the injection molding tool. The mold is closed and the substrate material is injected into the mold. The substrate material has a melt temperature between 180° C. and 300° C. in one embodiment, and from 200° C. and 250° C. in another embodiment, and is injected into the mold at an injection speed of between 2 and 10 seconds. After injection, the material is packed or held at a predetermined time and pressure to make the part dimensionally and aesthetically correct. Typical time periods are from 5 to 25 seconds and pressures from 1,000 kPa to 15,000 kPa. The mold is cooled between 10° C. and 70° C. to cool the substrate. The temperature will depend on the desired gloss and appearance. Typical cooling time is from 10 to 30 seconds, depending in part on the thickness. Finally, the mold is opened and the shaped composite article ejected.

Likewise, molded articles may be fabricated by injecting molten polymer blend into a mold that shapes and solidifies the molten polymer into desirable geometry and thickness of molded articles. A sheet may be made either by extruding a substantially flat profile from a die, onto a chill roll, or alternatively by calendering. Sheet will generally be considered to have a thickness of from 10 mils to 100 mils (254 µm to 2540 µm), although sheet may be substantially thicker. Tubing or pipe may be obtained by profile extrusion for uses in medical, potable water, land drainage applications or the like. The profile extrusion process involves the extrusion of molten polymer through a die. The extruded tubing or pipe is then solidified by chill water or cooling air into a continuous extruded article. The tubing will generally be in the range of from 0.31 cm to 2.54 cm in outside diameter, and have a wall thickness in the range of from 254 µm to 0.5 cm. The pipe will generally be in the range of from 2.54 cm to 254 cm in outside diameter, and have a wall thickness in the range of from 0.5 cm to 15 cm. Sheet made from the products of an embodiment of a version of the present invention may be used to form containers. Such containers may be formed by thermoforming, solid phase pressure forming, stamping and other shaping techniques. Sheets may also be formed to cover floors or walls or other surfaces.

In an embodiment of the thermoforming process, the oven temperature is between 160° C. and 195° C., the time in the oven between 10 and 20 seconds, and the die temperature, typically a male die, between 10° C. and 71° C. The final thickness of the cooled (room temperature), shaped laminate is from 10 µm to 6000 µm in one embodiment, from 200 µm to 6000 µm in another embodiment, and from 250 µm to 3000 µm in yet another embodiment, and from 500 µm to 1550 µm in yet another embodiment, a desirable range being any combination of any upper thickness limit with any lower thickness limit.

In an embodiment of the injection molding process, wherein a substrate material is injection molded into a tool including the shaped laminate, the melt temperature of the substrate material is between 190° C. and 255° C. in one embodiment, and between 210° C. and 250° C. in another embodiment, the fill time from 2 to 10 seconds in one embodiment, from 2 to 8 seconds in another embodiment, and a tool temperature of from 25° C. to 65° C. in one embodiment, and from 27° C. and 60° C. in another embodiment. In a desirable embodiment, the substrate material is at a temperature that is hot enough to melt any tie-layer material or backing layer to achieve adhesion between the layers.

In yet another embodiment of the invention, the compositions of this invention may be secured to a substrate material using a blow molding operation. Blow molding is particularly useful in such applications for making closed articles, such as fuel tanks and other fluid containers, playground equipment, outdoor furniture and small enclosed structures.

It will be understood by those skilled in the art that the steps outlined above may be varied, depending upon the desired result. For example, the extruded sheet of the compositions of this invention may be directly thermoformed or blow molded without cooling, thus skipping a cooling step. Other parameters may be varied as well in order to achieve a finished composite article having desirable features.

In another embodiment, this invention relates to:

1. A branched polyethylene modifier comprising at least 50 mol % ethylene, one or more $C_4$ to $C_{40}$ comonomers, and a polyene having at least two polymerizable bonds, wherein said branched polyethylene modifier has: a) a $g'_{vis}$ of 0.70 or less; b) an $M_w$ of 100,000 g/mol or more; c) an $M_w/M_n$ of 4.0 or more; d) a shear thinning ratio of 110 or more; e) a melt strength of 10 cN or more, f) a complex viscosity at 0.1 rad/sec at 190° C. of at least the branched modifier may have, 000 Pa·s; and g) has a phase angle of Z° or less where $Z=138.3G^{*(-0.142)}$, where $G^*$ is the complex modulus reported in Pascals measured at 190° C. and the phase angle units are reported in degrees, wherein the $G^*$ is from 1,000 to 1,000,000 Pa.

2. The modifier of paragraph 1, wherein the comonomer is present at from 0.5 to 30 mol %.

3. The modifier of paragraph 1 or 2, wherein the polyene is present at from 0.001 to 10 mol %.

4. The modifier of paragraph 1, 2, or 3, wherein the modifier has a $g'_{(Zave)}$ of 0.70 or less.

5. The modifier of paragraph 1, 2, 3, or 4, wherein the modifier has a strain-hardening ratio of 2 or greater.

6. The modifier of any of paragraphs 1 to 5, wherein the $C_4$ to $C_{40}$ comonomers are one or more $C_6$ to $C_{40}$ alpha olefin comonomers.

7. The modifier of any of paragraphs 1 to 6, wherein the modifier has a phase angle at complex shear modulus $G^*$=100,000 Pa of at least 300.

8. The modifier of any of paragraphs 1 to 7, wherein the $C_4$ to $C_{40}$ comonomers are one or more hexene, butene, or octene.

9. The modifier of any of paragraphs 1 to 8, wherein the polyene is selected from the group consisting of: 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, and 1,13-tetradecadiene; tetrahydroindene; norbornadiene also known as bicyclo-(2.2.1)-hepta-2,5-diene; dicyclopentadiene; 5-vinyl-2-norbornene; 1,4-cyclohexadiene; 1,5-cyclooctadiene; and 1,7-cyclododecadiene.

10. The modifier of any of paragraphs 1 to 9, wherein the modifier is an ethylene, octene, 1,9-decadiene copolymer.

11. A blend comprising:
1) the modifier of any of paragraphs 1 to 10 and/or a branched polyethylene modifier comprising at least 50 mol % ethylene, one or more $C_4$ to $C_{40}$ comonomers, and a polyene having at least two polymerizable bonds, wherein said branched polyethylene modifier has: a) a $g'_{vis}$ of 0.70 or less; b) an $M_w$ of 100,000 g/mol or more; c) an Mw/Mn of 4.0 or more; d) a shear thinning ratio of 110 or more; e) a melt strength of 10 cN or more, f) a complex viscosity at 0.1 rad/sec at 190° C. of at least 120,000 Pa·s; and g) a phase angle of Z° or less where $Z=138.3G^{*(-0.142)}$, where $G^*$ is the complex modulus reported in Pascals measured at 190° C. and the phase angle units are reported in degrees, wherein the $G^*$ is from 1,000 to 1,000,000 Pa; and h) a complex viscosity ratio of Y or more, where
$Y=-0.27*(\text{Log } \eta^*_{matrix})+1.4$, and the complex viscosity ratio is defined to be (Log $\eta^*_{modifier}$ minus Log $\eta^*_{matrix}$) divided by (Log $\eta^*_{matrix}$), wherein $\eta^*_{modifier}$ is the complex viscosity of the modifier measured at 0.1 rad/sec and 190° C., and $\eta^*_{matrix}$ is the complex viscosity of the polyethylene of step 2) below measured at 0.1 rad/sec and 190° C.; and
2) polyethylene having a density of 0.88 g/cc or more and an Mw of 20,000 g/mol or more, and preferably a $g'_{vis}$ of 0.97 or more, wherein the melt strength ratio is Q or more, where $Q=0.0805[(\eta^*_{modifier}-\eta^*_{matrix})/(\eta^*_{matrix})]+0.5$, wherein $\eta^*_{modifier}$ is the complex viscosity of the modifier measured at 0.158 rad/sec and 190° C., and $\eta^*_{matrix}$ is the complex viscosity of the polyethylene measured at 0.158 rad/sec and 190° C.; and the melt strength ratio is defined to be $[(MS_{blend}-MS_{matrix})/(MS_{matrix})]$, where $MS_{blend}$ is the melt strength of the blend, $MS_{matrix}$ is the melt strength of the polyethylene.

12. The composition of paragraph 11, wherein the complex viscosity at 0.1 sec$^{-1}$ of the branched polyethylene modifier is at least 320% greater than (preferably at least 2000% greater than) the complex viscosity at 0.1 sec$^{-1}$ of the polyethylene prior to combination with the branched polyethylene modifier.

13. The composition of paragraph 11 or 12, wherein the branched polyethylene modifier is present at 0.5 wt % to 10 wt %.

14. The composition of paragraph 11, 12, or 13, wherein the polyethylene comprises a copolymer of ethylene and one or more $C_3$ to $C_{20}$ alphaolefins and has an $M_w$ of 20,000 to 1,000,000 g/mol.

15. The composition of paragraph 11, 12, 13, or 14, wherein the polyethylene has a density of 0.91 to 0.96 g/cm$^3$.

16. The composition of paragraph 11, 12, 13, 14, or 15, wherein the branched polyethylene modifier is present at from 0.1 wt % to 99.5 wt % (based upon the weight of the blend); and the polyethylene has a composition distribution breadth index of 60% or more and a density of 0.90 g/cc or more.

17. The blend composition of any of paragraphs 11 to 16, which has a strain hardening ratio of greater than 1.5.

18. The blend of any of paragraphs 11 to 17, wherein the $C_4$ to $C_{40}$ comonomers of the modifier are one or more $C_6$ to $C_{40}$ alpha olefin comonomers.

19. The composition of any of paragraphs 1 to 10, wherein the branched polyethylene modifier has an $M_w$ of 20,000 g/mol or more.

20. The blend of any of paragraphs 11 to 18 wherein the blend has an elasticity ratio of $Z^*$ or more, where $Z^*=0.009*(\delta_{matrix})+0.05$, where the elasticity ratio is defined to be $[(\delta_{matrix}-\delta_{modifier})/(\delta_{matrix})]$, where $\delta_{matrix}$ is the phase angle of the linear polyethylene measured at a complex modulus of 100,000 Pa, $\delta_{modifier}$ is the phase angle of the branched modifier at a complex modulus of 100,000 Pa, where phase angle is determined as described below, preferably $Z^*=0.008*(\delta_{matrix})+0.14$, preferably $Z^*=0.0079*(\delta_{matrix})+0.1318$.

21. The blend of any of paragraphs 11 to 18 wherein the blend has a melt strength ratio of T or more, where $T=0.1.6762[(\eta^*_{blend}$ minus $\eta^*_{matrix})$ divided by $(\eta^*_{matrix})]-5$, where $\eta^*_{blend}$ is the complex viscosity of the blend measured at 0.158 rad/sec and 190° C., and $\eta^*_{matrix}$ is the complex viscosity of the linear polyethylene measured at 0.158 rad/sec and 190° C.; and the ratio of melt strength to viscosity is defined to be melt strength ratio is defined to be $[(MS_{blend}$ minus $MS_{matrix})$ divided by $(MS_{matrix})]$, where $MS_{blend}$ is the melt strength of the composition, $MS_{matrix}$ is the melt strength of the linear polyethylene, melt strength is reported in cN and measured according to the procedure in the Test Methods section below, preferably $T=0.1.6762[(\eta^*_{blend}$ minus $\eta^*_{matrix})$ divided by $(\eta^*_{matrix})]+0$, preferably $T=0.1.6762[(\eta^*_{blend}$ minus $\eta^*_{matrix})$ divided by $(\eta^*_{matrix})]+5$, preferably $T=0.1.6762[(\eta^*_{blend}$ minus $\eta^*_{matrix})$ divided by $(\eta^*_{matrix})]+10$, preferably $T=0.1.6762[(\eta^*_{blend}$ minus $\eta^*_{matrix})$ divided by $(\eta^*_{matrix})]+15$, preferably $T=0.1.6762[(\eta^*_{blend}$ minus $\eta^*_{matrix})$ divided by $(\eta^*_{matrix})]+16.153$.

22. The blend of any of paragraphs 11 to 18 wherein the blend has a melt strength ratio of T or more, where T is equal to $2.1957[(\eta^*_{blend}$ minus $\eta^*_{matrix})$ divided by $(\eta^*_{matrix})]+30$, preferably $T=2.1957[(\eta^*_{blend}$ minus $\eta^*_{matrix})$ divided by $(\eta^*_{matrix})]+40$, preferably $T=2.1957[(\eta^*_{blend}$ minus $\eta^*_{matrix})$ divided by $(\eta^*_{matrix})]+50$, preferably $T=2.1957[(\eta^*_{blend}$ minus $\eta^*_{matrix})$ divided by $(\eta^*_{matrix})]+60$.

23. A film or foam comprising the composition of any of paragraphs 1 to 10 or 19.

24. A film or foam comprising the composition of any of paragraphs 11 to 18, or 20-22.

Test Methods

Melt Index (MI, also referred to as 12) is measured according to ASTM D1238 at 190° C., under a load of 2.16 kg unless otherwise noted. The units for MI are g/10 min or dg/min.

High Load Melt Index (HLMI, also referred to as I21) is the melt flow rate measured according to ASTM D-1238 at 190° C., under a load of 21.6 kg. The units for HLMI are g/10 min or dg/min.

Melt Index Ratio (MIR) is the ratio of the high load melt index to the melt index, or I21/I2.

Density is measured by density-gradient column, as described in ASTM D1505, on a compression-molded specimen that has been slowly cooled to room temperature (i.e. over a period of 10 minutes or more) and allowed to age for a sufficient time that the density is constant within +/−0.001 g/cm$^3$. The units for density are g/cm$^3$.

Gauge, reported in mils, was measured using a Measuretech Series 200 instrument. The instrument measures film thickness using a capacitance gauge. For each film sample, ten film thickness data points were measured per inch of film as the film was passed through the gauge in a transverse direction. From these measurements, an average gauge measurement was determined and reported. Coefficient of variation (Gauge COV) is used to measure the variation of film thickness in the transverse direction. The Gauge COV is defined as a ratio of the standard deviation to the mean of film thickness.

Elmendorf Tear, reported in grams (g) or grams per mil (g/mil), was measured as specified by ASTM D-1922.

Tensile Strength at Yield, Tensile Strength at Break, Ultimate Tensile Strength and Tensile Strength at 50%, 100%, and/or 200% Elongation were measured as specified by ASTM D-882.

Tensile Peak Load was measured as specified by ASTM D-882.

Tensile Energy, reported in inch-pounds (in-lb), was measured as specified by ASTM D-882.

Elongation at Yield and Elongation at Break, reported as a percentage (%), were measured as specified by ASTM D-882.

1% Secant Modulus (M), reported in pounds per square inch (lb/in$^2$ or psi), was measured as specified by ASTM D-882.

Haze, reported as a percentage (%), was measured as specified by ASTM D-1003.

Gloss, a dimensionless number, was measured as specified by ASTM D-2457 at 45 degrees.

Dart Drop Impact or Dart Drop Impact Strength (DIS), reported in grams (g) and/or grams per mil (g/mil), was measured as specified by ASTM D-1709, method A, unless otherwise specified.

Peak Puncture Force, reported in pounds (lb) and/or pounds per mil (lb/mil), was determined according to ASTM D-3763.

Puncture Break Energy, reported in inch-pounds (in-lb) and/or inch-pounds per mil (in-lb/mil), was determined according to ASTM D-3763.

"Melt strength" is defined as the force required to draw a molten polymer extrudate at a rate of 12 mm/s$^2$ and at an extrusion temperature of 190° C. until breakage of the extrudate whereby the force is applied by take up rollers. The polymer is extruded at a velocity of 0.33 mm/s through an annular die of 2 mm diameter and 30 mm length. Melt strength values reported herein are determined using a Gottfert Rheotens tester and are reported in centi-Newtons (cN). Additional experimental parameters for determining the melt strength are listed in Table 1. For the measurements of melt strength, the resins were stabilized with 500 ppm of Irganox 1076 and 1500 ppm of Irgafos168.

TABLE 1

| Melt Strength test parameters | |
|---|---|
| Acceleration | 12 mm/s$^2$ |
| Temperature | 190° C. |
| Piston diameter | 12 mm |
| Piston speed | 0.178 mm/s |
| Die diameter | 2 mm |
| Die length | 30 mm |
| Shear rate at the die | 40.05 s$^{-1}$ |
| Strand length | 100.0 mm |
| Vo (velocity at die exit) | 10.0 mm/s |

Dynamic shear melt rheological data was measured with an Advanced Rheometrics Expansion System (ARES) using parallel plates (diameter=25 mm) in a dynamic mode under nitrogen atmosphere. For all experiments, the rheometer was thermally stable at 190° C. for at least 30 minutes before inserting compression-molded sample of resin onto the parallel plates. To determine the samples viscoelastic behavior, frequency sweeps in the range from 0.01 to 385 rad/s were carried out at a temperature of 190° C. under constant strain. Depending on the molecular weight and temperature, strains of 10% and 15% were used and linearity of the response was verified. A nitrogen stream was circulated through the sample oven to minimize chain extension or cross-linking during the experiments. All the samples were compression molded at 190° C. and no stabilizers were added. A sinusoidal shear strain is applied to the material. If the strain amplitude is sufficiently small the material behaves linearly. It can be shown that the resulting steady-state stress will also oscillate sinusoidally at the same frequency but will be shifted by a phase angle δ with respect to the strain wave. The stress leads the strain by δ. For purely elastic materials δ=0° (stress is in phase with strain) and for purely viscous materials, δ=90° (stress leads the strain by 90° although the stress is in phase with the strain rate). For viscoelastic materials, 0<δ<90. The shear thinning slope (STS) was measured using plots of the logarithm (base ten) of the dynamic viscosity versus logarithm (base ten) of the frequency. The slope is the difference in the log(dynamic viscosity) at a frequency of 100 s$^{-1}$ and the log(dynamic viscosity) at a frequency of 0.01 s$^{-1}$ divided by 4. Dynamic viscosity is also referred to as complex viscosity or dynamic shear viscosity.

The dynamic shear viscosity (η*) versus frequency (ω) curves were fitted using the Cross model (see, for example, C. W. Macosco, Rheology: Principles, Measurements, and Applications, Wiley-VCH, 1994):

$$\eta^* = \frac{\eta_0}{1 + (\lambda\omega)^{1-n}}$$

The three parameters in this model are: $\eta_0$, the zero-shear viscosity; $\lambda$, the average relaxation time; and n, the power-law exponent. The zero-shear viscosity is the value at a plateau in the Newtonian region of the flow curve at a low frequency, where the dynamic viscosity is independent of frequency. The average relaxation time corresponds to the inverse of the frequency at which shear-thinning starts. The power-law exponent describes the extent of shear-thinning, in that the magnitude of the slope of the flow curve at high frequencies approaches 1−n on a log(η*)−log(ω) plot. For Newtonian fluids, n=1 and the dynamic complex viscosity is independent of frequency. For the polymers of interest here, n<1, so that enhanced shear-thinning behavior is indicated by a decrease in n (increase in 1−n).

The transient uniaxial extensional viscosity was measured using a SER-2-A Testing Platform available from Xpansion Instruments LLC, Tallmadge, Ohio, USA. The SER Testing Platform was used on a Rheometrics ARES-LS (RSA3) strain-controlled rotational rheometer available from TA Instruments Inc., New Castle, Del., USA. The SER Testing Platform is described in U.S. Pat. Nos. 6,578,413 & 6,691,569, which are incorporated herein for reference. A general description of transient uniaxial extensional viscosity measurements is provided, for example, in "Strain hardening of various polyolefins in uniaxial elongational flow", The Society of Rheology, Inc., J. Rheol., 47(3), p. 619-630 (2003); and "Measuring the transient extensional rheology of polyethylene melts using the SER universal testing platform", The Society of Rheology, Inc., J. Rheol., 49(3), p. 585-606 (2005), incorporated herein for reference Strain hardening occurs when a polymer is subjected to uniaxial extension and the transient extensional viscosity increases more than what is predicted from linear viscoelastic theory. Strain hardening is observed as an abrupt upswing of the extensional viscosity in the transient extensional viscosity vs. time plot. A strain hardening ratio (SHR) is used to characterize the upswing in extensional viscosity and is defined as the ratio of the maximum transient extensional viscosity over three times the value of the transient zero-shear-rate viscosity at the same strain. Strain hardening is present in the material when the ratio is greater than 1.

Comonomer content (such as for butene, hexene and octene) was determined via FTIR measurements according to ASTM D3900 (calibrated versus $^{13}C$ NMR). A thin homogeneous film of polymer, pressed at a temperature of about 150° C., was mounted on a Perkin Elmer Spectrum 2000 infrared spectrophotometer. The weight percent of copolymer is determined via measurement of the methyl deformation band at ~1375 cm-1. The peak height of this band is normalized by the combination and overtone band at ~4321 cm-1, which corrects for path length differences.

Peak melting point, Tm, (also referred to as melting point), peak crystallization temperature, Tc, (also referred to as crystallization temperature), glass transition temperature (Tg), heat of fusion ($\Delta Hf$ or Hf), and percent crystallinity were determined using the following DSC procedure according to ASTM D3418-03. Differential scanning calorimetric (DSC) data were obtained using a TA Instruments model Q200 machine. Samples weighing approximately 5-10 mg were sealed in an aluminum hermetic sample pan. The DSC data were recorded by first gradually heating the sample to 200° C. at a rate of 10° C./minute. The sample was kept at 200° C. for 2 minutes, then cooled to −90° C. at a rate of 10° C./minute, followed by an isothermal for 2 minutes and heating to 200° C. at 10° C./minute. Both the first and second cycle thermal events were recorded. Areas under the endothermic peaks were measured and used to determine the heat of fusion and the percent of crystallinity. The percent crystallinity is calculated using the formula, [area under the melting peak (Joules/gram)/B (Joules/gram)]*100, where B is the heat of fusion for the 100% crystalline homopolymer of the major monomer component. These values for B are to be obtained from the Polymer Handbook, Fourth Edition, published by John Wiley and Sons, New York 1999, provided; however, that a value of 189 J/g (B) is used as the heat of fusion for 100% crystalline polypropylene, a value of 290 J/g is used for the heat of fusion for 100% crystalline polyethylene. The melting and crystallization temperatures reported here were obtained during the second heating/cooling cycle unless otherwise noted.

For polymers displaying multiple endothermic and exothermic peaks, all the peak crystallization temperatures and peak melting temperatures were reported. The heat of fusion for each endothermic peak was calculated individually. The percent crystallinity is calculated using the sum of heat of fusions from all endothermic peaks. Some of the polymer blends produced show a secondary melting/cooling peak overlapping with the principal peak, which peaks are considered together as a single melting/cooling peak. The highest of these peaks is considered the peak melting temperature/crystallization point. For the amorphous polymers, having comparatively low levels of crystallinity, the melting temperature is typically measured and reported during the first heating cycle. Prior to the DSC measurement, the sample was aged (typically by holding it at ambient temperature for a period of 2 days) or annealed to maximize the level of crystallinity.

Polymer molecular weight (weight-average molecular weight, Mw, number-average molecular weight, Mn, and Z-averaged molecular weight, Mz) and molecular weight distribution (Mw/Mn) are determined using Size-Exclusion Chromatography. Equipment consists of a High Temperature Size Exclusion Chromatograph (either from Waters Corporation or Polymer Laboratories), with a differential refractive index detector (DRI), an online light scattering detector, and a viscometer (SEC-DRI-LS-VIS). For purposes of the claims, SEC-DRI-LS-VIS shall be used. Three Polymer Laboratories PLgel 10 mm Mixed-B columns are used. The nominal flow rate is 0.5 $cm^3$/min and the nominal injection volume is 300 μL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of reagent grade 1,2,4 trichlorobenzene (TCB). The TCB mixture is then filtered through a 0.7 μm glass pre-filter and subsequently through a 0.1 μm Teflon filter. The TCB is then degassed with an online degasser before entering the SEC.

Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/ml at room temperature and 1.324 g/ml at 135° C. The injection concentration can range from 1.0 to 2.0 mg/ml, with lower concentrations being used for higher molecular weight samples.

Prior to running each sample the DRI detector and the injector are purged. Flow rate in the apparatus is then increased to 0.5 ml/minute, and the DRI allowed to stabilize for 8 to 9 hours before injecting the first sample. The LS laser is turned on 1 to 1.5 hours before running samples.

The concentration, c, at each point in the chromatogram is calculated from the DRI signal after subtracting the prevailing baseline, $I_{DRI}$, using the following equation:

$$c=K_{DRI}I_{DRI}/(dn/dc)$$

where $K_{DRI}$ is a constant determined by calibrating the DRI, and (dn/dc) is the same as described below for the LS analysis. The processes of subtracting the prevailing baseline (i.e. background signal) and setting integration limits that define the starting and ending points of the chromatogram are well known to those familiar with SEC analysis. Units on parameters throughout this description of the SEC method are such that concentration is expressed in $g/cm^3$, molecular weight is expressed in g/mole, and intrinsic viscosity is expressed in dL/g.

The light scattering detector is a Wyatt Technology High Temperature mini-DAWN. The polymer molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle $\theta$, c is the polymer concentration determined from the DRI analysis, $A_2$ is the second virial coefficient, $P(\theta)$ is the form factor for a monodisperse random coil (described in the above reference), and $K_o$ is the optical constant for the system:

$$K_O = \frac{4\pi^2 n^2 (dn/dc)^2}{\lambda^4 N_A}$$

in which NA is Avogadro's number, and (dn/dc) is the refractive index increment for the system. The refractive index, n=1.500 for TCB at 135° C. and $\lambda$=690 nm. In addition, $A_2$=0.0015 and (dn/dc)=0.104 for polyethylene in TCB at 135° C.; both parameters may vary with average composition of an ethylene copolymer. Thus, the molecular weight determined by LS analysis is calculated by solving the above equations for each point in the chromatogram; together these allow for calculation of the average molecular weight and molecular weight distribution by LS analysis.

A high temperature Viscotek Corporation viscometer is used, which has four capillaries arranged in a Wheatstone bridge configuration with two pressure transducers. One transducer measures the total pressure drop across the detector, and the other, positioned between the two sides of the bridge, measures a differential pressure. The specific viscosity for the solution flowing through the viscometer at each point in the chromatogram, $(\eta_s)_i$, is calculated from the ratio of their outputs. The intrinsic viscosity at each point in the chromatogram, $[\eta]_i$, is calculated by solving the following equation (for the positive root) at each point i:

$(\eta_s)_i = c_i [\eta]_i + 0.3(c_i [\eta]_i)^2$ where $c_i$ is the concentration at point i as determined from the DRI analysis.

The branching index ($g'_{vis}$) is calculated using the output of the SEC-DRI-LS-VIS method (described above) as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index g' is defined as:

$$g'_{vis} = \frac{[\eta]_{avg}}{k M_v^\alpha}$$

where the Mark-Houwink parameters k and a are given by k=0.000579 for polyethylene homopolymer and $\alpha$=0.695 for all polyethylene polymers. For ethylene copolymers, k decreases with increasing comonomer content. $M_v$ is the viscosity-average molecular weight based on molecular weights determined by LS analysis.

Experimental and analysis details not described above, including how the detectors are calibrated and how to calculate the composition dependence of Mark-Houwink parameters and the second-virial coefficient, are described by T. Sun, P. Brant, R. R. Chance, and W. W. Graessley (*Macromolecules*, 2001 volume 34(19), p. 6812-6820).

Proton NMR spectra were collected using a 500 MHz Varian pulsed fourier transform NMR spectrometer equipped with a variable temperature proton detection probe operating at 120° C. The polymer sample is dissolved in 1,1,2,2-tetrachloroethane-d2 (TCE-d2) and transferred into a 5 mm glass NMR tube. Typical acquisition parameters are sweep width=10 KHz, pulse width=30 degrees, acquisition time=2 s, acquisition delay=5 s and number of scans=120. Chemical shifts are determined relative to the TCE-d2 signal which is set to 5.98 ppm.

The chain end unsaturations are measured as follows. The vinyl resonances of interest are between from about 5.0 to 5.1 ppm (VRA), the vinylidene resonances between from about 4.65 to 4.85 ppm (VDRA), the vinylene resonances from about 5.31 to 5.55 ppm (VYRA), the trisubstituted unsaturated species from about 5.11 to 5.30 ppm (TSRA) and the aliphatic region of interest between from about 0 to 2.1 ppm (IA). The number of vinyl groups/1000 Carbons is determined from the formula: (VRA*500)/((IA+VRA+VYRA+VDRA)/2)+TSRA). Likewise, the number of vinylidene groups/1000 Carbons is determined from the formula: (VDRA*500)/((IA+VRA+VYRA+VDRA)/2)+TSRA), the number of vinylene groups/1000 Carbons from the formula (VYRA*500)/((IA+VRA+VYRA+VDRA)/2)+TSRA) and the number of trisubstituted groups from the formula (TSRA*1000)/((IA+VRA+VYRA+VDRA)/2)+TSRA). VRA, VDRA, VYRA, TSRA and IA are the integrated normalized signal intensities in the chemical shift regions defined above.

In conducting the $^{13}$C NMR investigations, samples are prepared by adding about 0.3 g sample to approximately 3 g of tetrachloroethane-d2 in a 10 mm NMR tube. The samples are dissolved and homogenized by heating the tube and its contents to 150° C. The data are collected using a Varian spectrometer, with corresponding $^1$H frequencies of either 400 or 700 MHz (in event of conflict, 700 MHz shall be used). The data are acquired using nominally 4000 transients per data file with a about a 10 second pulse repetition delay. To achieve maximum signal-to-noise for quantitative analysis, multiple data files may be added together. The spectral width was adjusted to include all the NMR resonances of interest and FIDs were collected containing a minimum of 32K data points. The samples are analyzed at 120° C. in a 10 mm broad band probe.

Where applicable, the properties and descriptions below are intended to encompass measurements in both the machine and transverse directions. Such measurements are reported separately, with the designation "MD" indicating a measurement in the machine direction, and "TD" indicating a measurement in the transverse direction.

EXAMPLES

The present invention, while not meant to be limited by, may be better understood by reference to the following examples and tables.

Examples 1 to 4

Four branched modifiers were produced in a 1-liter autoclave reactor operated in a slurry process. The reactor system was equipped with a stirrer, an external water/steam jacket for temperature control, a regulated supply of dry nitrogen, ethylene, propylene, hydrogen and a septum inlet for introduction of other solvents, catalysts, liquid monomer, and scavenger solutions. The reactor was first washed using hot toluene and then dried and degassed thoroughly prior to use. All the solvents and monomers were purified by passing through a 1-liter basic alumina column activated at 600° C., followed by a column of molecular sieves activated at 600° C. or Selexsorb CD column prior to transferring into the reactor.

Dimethylsilyl-bis-(tetrahydroindenyl) zirconium dichloride was used as metallocene Catalyst A. The metallocene was supported on silica particles according to the procedure described in U.S. Pat. No. 6,476,171 B1. In brief, a solution of 1300 ml of 30 wt % alumoxane (MAO) in toluene as determined by reference to the total Al content, which may include unhydrolyzed TMA was charged to a two gallon (7.57 Liter), jacketed glass-walled reactor, equipped with a helical ribbon blender and an auger-type shaft. 2080 ml of toluene was added and stirred. A suspension of 31.5 g metallocene catalyst in 320 ml of toluene purchased from Albemarle Labs, was cannulated to the reactor. An additional bottle of dry toluene (250 ml) was used to rinse solid metallocene crystals into the reactor by cannula under nitrogen pressure. The mixture was allowed to stir at 69° F. (20.6° C.) for one hour, before being transferred to a four-liter Erlenmeyer flask under nitrogen. 1040 grams of silica (Davison MS 948, 1.65 ml/g pore volume) was charged to the reactor. Half of the solution from the 4 liter Erlenmeyer flask was then transferred back to the 2 gallon (7.57 liter) stirred glass reactor. The reaction temperature rose from 70° F. (21.1° C.) to 100° F. (37.8° C.) in a five minute exotherm. The balance of the solution in the 4 liter Erlenmeyer was subsequently added back to the glass reactor, and stirred twenty minutes. Then, toluene was added (273 ml, 238 g) to dilute the active catalyst slurry, and stirred an additional twenty-five minutes. 7 grams of Antistat AS-990, a surface modifier made from ethoxylated stearylamine sold by Witco Chemical Corp. (7 g in 73 ml toluene), was cannulated to the reactor and the slurry mixed for thirty minutes. Removal of solvent commenced by reducing pressure to less than 18 inches of mercury (457 mmHg) while feeding a small stream of nitrogen into the bottom of the reactor and raising the temperature from 74° F. (23.3° C.) to 142° F. (61.1° C.) over a period of one hour. Then five additional hours of drying at 142° F. (61.1° C.) to 152° F. (66.7° C.) and vacuum which ranged from 5 inches to 22 inches Hg (127 to 559 mmHg) were used to dry the support and yield 1709.0 g of free-flowing active supported catalyst material. Head space gas chromatograph (HSGC) measurements showed 13,000 weight parts per million (1.3 wt %) of residual toluene. A second drying step under stronger vacuum conditions resulted in HSGC analysis measurement of residual toluene at 0.18%.

1,9-decadiene was used as the polymerizable diene. The 1,9-decadiene was obtained from Sigma-Aldrich and was purified by first passing through an alumina column activated at high temperature under nitrogen, followed by a molecular sieve activated at high temperature under nitrogen.

In polymerization run, 2 ml of triisobutyl aluminum (TIBAL) (25 wt % in hexane, purchased from Sigma-Aldrich) solution was first added to the reactor. In succession, 400 ml of isohexane (diluent), 1-hexene, 1,9 decadiene and hydrogen were added into the reactor. All of these were conducted at room temperature. The mixture was then stirred and heated to a desired temperature. The supported catalyst was cannulated into the reactor using about 200 ml of solvent, followed immediately by ethylene addition. The ethylene was fed on demand to maintain a relative constant reactor pressure during the polymerization reaction. The ethylene pressure reported in Table 2 was the difference between the reactor pressure immediately before ethylene addition and ethylene feed pressure during the polymerization. The ethylene consumption was monitored during the reaction using a mass flow meter. The polymerization reaction was terminated when desired amount of polymer was produced. Thereafter, the reactor was cooled down and unreacted monomer and diluent were vented to the atmosphere. The resulting mixture, containing mostly diluent, polymer and unreacted monomers, was collected in a collection box and first air-dried in a hood to evaporate most of the solvent, and then dried in a vacuum oven at a temperature of about 90° C. for about 12 hours. Details of the experimental conditions, catalysts employed and the properties of the resultant polymer are listed in Table 2. Each run was repeated 3-5 times to produce enough material for application evaluation.

TABLE 2

Branched modifier produced in a slurry process

| Modifier # | 1 | 2 | 3 | 4 |
|---|---|---|---|---|
| Catalyst | Catalyst A | Catalyst A | Catalyst A | Catalyst A |
| Catalyst amount (mg) | 120 | 120 | 120 | 120 |
| Reaction temp. (° C.) | 80 | 80 | 80 | 80 |
| Reaction time (min) | 60 | 60 | 60 | 60 |
| Hydrogen (mmol) | 5 | 5 | 5 | 5 |
| Ethylene feed pressure (psi) | 214 | 214 | 214 | 214 |
| 1-hexene (ml) | 2.0 | 20 | 20 | 20 |
| 1,9 decadiene (ml) | 0.05 | 0.05 | 0.02 | 0.01 |
| Ethylene content(wt %) | 96.0 | | | |
| Yield (g) | 42 | 49 | 43 | 40 |
| Tc (° C.) | 113.1 | 110.2 | 113.5 | 113.5 |
| Tm (° C.) | 126.9 | 127.3 | 126.8 | 127.1 |
| Heat of fusion (J/g) | 190.7 | 194.9 | 193.3 | 209.0 |
| Ethylene content (wt %) | 96 | | | |
| Mn_DRI (g/mol) | 6,704 | | | |
| Mw_DRI (g/mol) | 94,866 | | | |
| Mz_DRI (g/mol) | 627,782 | | | |
| Mn_LS (g/mol) | 17,607 | | | |
| Mw_LS (g/mol) | 111,717 | | | |
| Mz_LS (g/mol) | 795,054 | | | |
| $g'_{vis}$ | 0.969 | | | |
| I2 (dg/min) | 0.76 | 0.41 | 3.30 | 5.68 |
| I21 (dg/min) | 53.42 | 33.55 | 129.89 | 192.91 |
| MIR | 69.93 | 81.82 | 39.36 | 33.96 |
| Complex viscosity @ 0.01 rad/sec (Pa · s) | 27053 | 2247 | 3284 | 818 |
| Complex viscosity @ 398 rad/sec (Pa · s) | 194 | 16 | 21 | 13 |
| Complex viscosity @ 100 rad/sec (Pa · s) | 384.4 | 31.4 | 42.2 | 24.7 |
| Complex viscosity @ 0.1 rad/sec (Pa · s) | 9283.0 | 749.7 | 1117.9 | 350.5 |

For the measurement of branching index, $g'_{vis}$, the Mark-Houwink parameters, k, are corrected for comonomer content and type without taking into account of diene content.

Figure 2:
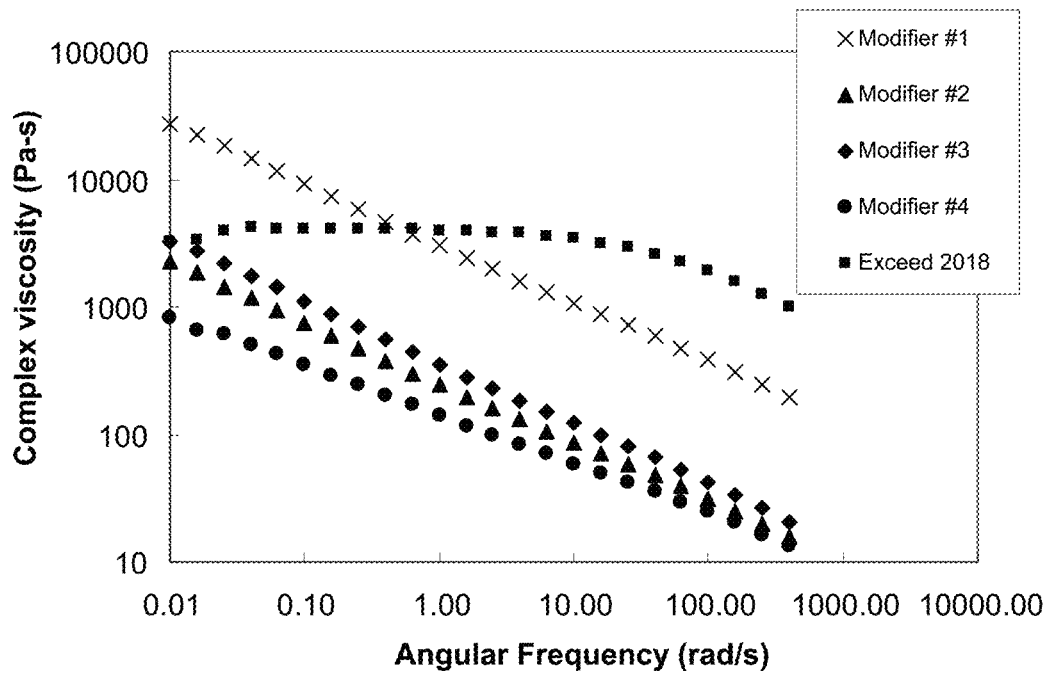
FIG. 2 provides a comparison of the shear thinning characteristics of the branched polyethylene modifiers produced in Examples 1 to 4 and Exceed™ 2018 polyethylene.
Figure 3:
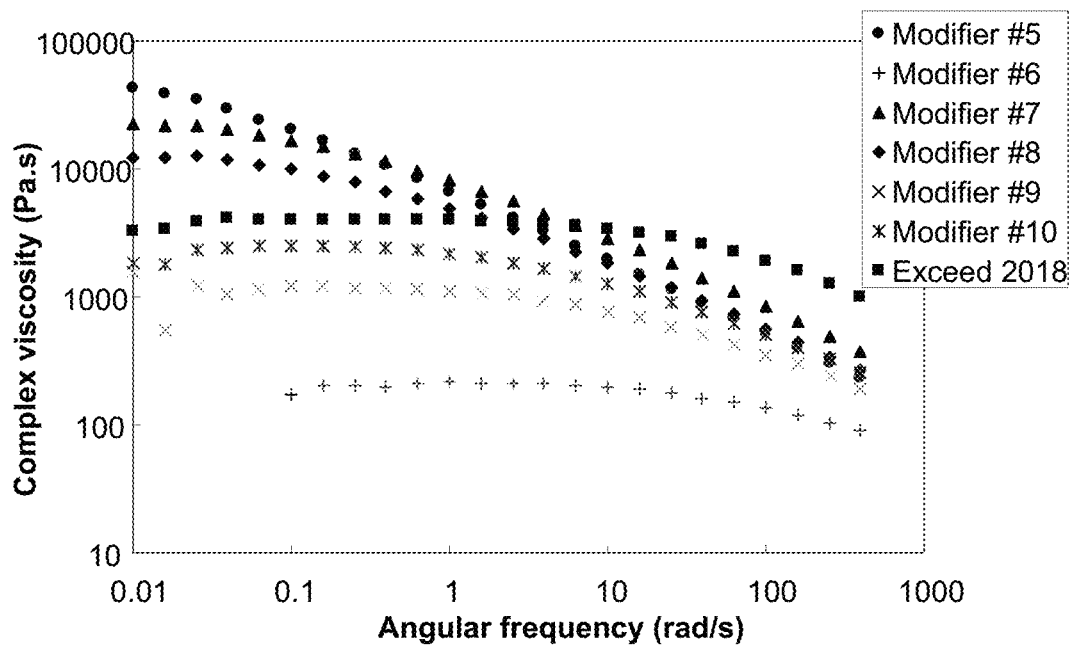
FIG. 3 provides a comparison of the shear thinning characteristics of the branched polyethylene modifiers produced in Examples 5 to 10 and Exceed™ 2018 polyethylene.

The complex viscosity of the branched modifier polymer produced in Examples 1 to 4 was measured at temperature 190° C. over an angular frequency ranging from 0.01 to 398 rad/s. Significant shear thinning was observed. The ratio of complex viscosity at a frequency of 0.01 rad/s to the complex viscosity at a frequency of 398 rad/s is 139, 141, 160, and 62 for materials produced in Example 1, 2, 3, and 4, respectively. The complex viscosity profiles are shown in FIG. 2. Examples 1 to 4 have shear thinning slope, the slope of the log (complex viscosity) versus log (frequency) curve, of −0.466, −0.468, −0.479, and −0.389, respectively. The more negative this slope, the faster the dynamic viscosity decreases as the frequency increases. These types of polymer are easily processed in high shear rate fabrication methods, such as injection molding. Large negative shear thinning slopes occur when polymers are highly branched. Significant shear thinning is also reflected in the high values of MIR.

When the phase angle is plotted versus frequency for material made in Examples 1 to 4, the phase angles are nearly independent of frequency and a plateau is observed. The phase angels vary between 40 to 60 degrees over a frequency range from 0.01 to 398 rad/sec. This is a signature of a gel-like relaxation behavior and the critical relaxation exponent can be calculated as the ratio of the phase angle of the plateau divided by 90 degrees. The critical relaxation exponents for Examples 1 to 4 are less than 0.63. Linear polyolefins do not have plateaus in their plots of phase angle versus frequency. According to Garcia-Franco, et al, *Macromolecules*, 34(10), 2001, p. 3115-3117, the lower the critical relaxation exponent, the more extensive the long chain branches in the sample. The critical relaxation exponents observed for the branched modifier of this invention are lower than any reported in this paper.

The phase angle is the inverse tangent of the loss modulus divided by the storage modulus. For linear polymer chains the polymer melt is fully relaxed at small frequencies or long relaxation times; the storage modulus is much smaller than the loss modulus and the phase angles are 90 degrees. For the branched modifier of Examples 1 to 4 the loss modulus is comparable to the storage modulus even at a frequency of 0.1 rad/s. The chains are unable to relax, because of the presence of significant amounts of branching.

The transient extensional viscosity of the modifier produced in Example 1 was measured at a temperature of 150° C. and strain rate of 1 sec$^{-1}$. A strain hardening ratio of 50.8 was observed.

Examples 5 to 13

Branched modifiers in Examples 5 to 13 were made in a continuous stirred-tank reactor operated in a solution process. The reactor was a 0.5-liter stainless steel autoclave reactor and was equipped with a stirrer, a water cooling/steam heating element with a temperature controller and a pressure controller. Solvents and comonomers were first purified by passing through a three-column purification system. The purification system consisted of an Oxiclear column (Model # RGP-R1-500 from Labclear) followed by a 5A and a 3A molecular sieve column. Purification columns were regenerated periodically whenever there was evidence of lower activity of polymerization. Both the 3A and 5A molecular sieve columns were regenerated in-house under nitrogen at a set temperature of 260° C. and 315° C., respectively. The molecular sieve material was purchased from Aldrich. Oxiclear column was regenerated in the original manufacture. Ethylene was delivered as a gas solubilized in the chilled solvent/monomer mixture. The purified solvents and monomers were then chilled to about −15° C. by passing through a chiller before being fed into the reactor through a manifold. Solvent and monomers were mixed in the manifold and fed into the reactor through a single tube. All liquid flow rates were measured using Brooksfield mass flow controller.

The metallocenes were pre-activated with an activator of N,N-dimethyl anilinium tetrakis (heptafluoro-2-naphthyl) borate at a molar ratio of about 1:1 in toluene. The preactivated catalyst solution was kept in an inert atmosphere with <1.5 ppm water content and was fed into the reactor by a metering pump through a separated line. Catalyst and monomer contacts took place in the reactor.

As an impurity scavenger, 200 ml of tri-n-octyl aluminum (TNOA) (25 wt % in hexane, Sigma Aldrich) was diluted in 22.83 kilogram of isohexane. The TNOA solution was stored in a 37.9-liter cylinder under nitrogen blanket. The solution was used for all polymerization runs until about 90% of consumption, and then a new batch was prepared. The feed rates of the TNOA solution were adjusted in a range from 0 (no scavenger) to 4 ml per minute to achieve a maximum catalyst activity.

The reactor was first prepared by continuously $N_2$ purging at a maximum allowed temperature, then pumping isohexane and scavenger solution through the reactor system for at least one hour. Monomers and catalyst solutions were then fed into the reactor for polymerization. Once the activity was established and the system reached equilibrium, the reactor was lined out by continuing operation of the system under the established condition for a time period of at least five times of mean residence time prior to sample collection. The resulting mixture, containing mostly solvent, polymer and unreacted monomers, was collected in a collection box. The collected samples were first air-dried in a hood to evaporate most of the solvent, and then dried in a vacuum oven at a temperature of about 90° C. for about 12 hours. The vacuum oven dried samples were weighed to obtain yields. All the reactions were carried out at a pressure of about 2 MPa.

1,9 decediene was diluted with isohexane and fed into the reactor using a metering pump. Both ethylene (bis indenyl) zirconium dimethyl (catalyst B) and rac-dimethylsilylbis (indenyl)zirconium dimethyl (Catalyst C) were preactivated with N,N-dimethyl anilinium tetrakis (heptafluoro-2-naphthyl) borate. The polymerization process condition and some characterization data are listed in Table 3. For each polymerization run, the catalyst feed rate and scavenger fed rate were adjusted to achieve a desired conversion listed in Table 3.

TABLE 3

| Branched modifier produced in a solution process | | | | |
|---|---|---|---|---|
| Modifier # | 5 | 6 | 7 | 8 |
| Reaction temperature (° C.) | 140 | 137 | 120 | 130 |
| ethylene feed rate (slpm) | 8 | 8 | 8 | 8 |
| 1-hexene feed rate (g/min) | 3 | 3 | 3 | 3 |
| 1,9 decadiene feed rate (ml/min) | 0.0476 | 0.0488 | 0.024 | 0.0488 |
| Catalyst | Catalyst B | Catalyst B | Catalyst B | Catalyst B |

TABLE 3-continued

| Branched modifier produced in a solution process | | | | |
|---|---|---|---|---|
| Yield (gram/min) | 8.97 | 9.43 | 10.14 | 9.68 |
| Conversion (%) | 74.5% | 78.2% | 84.2% | 80.4% |
| Catalyst efficiency (g poly/g catalyst) | 538200 | 565500 | 608600 | 580923 |
| Ethylene content (wt %) | 90.8 | 87.1 | 85.2 | 87.2 |
| Density (g/cm3) | 0.9215 | | | |
| Tc (° C.) | 94.4 | 86.7 | 83.5 | 87.4 |
| Tm (° C.) | 110.7 | 103.2 | 98.4 | 102.4 |
| Heat of fusion (J/g) | 136.9 | 118.2 | 101.7 | 116.1 |
| Mn_DRI (g/mol) | 12,180 | 12,029 | 16,650 | 9,559 |
| Mw_DRI (g/mol) | 90,693 | 44,213 | 87,965 | 76,219 |
| Mz_DRI (g/mol) | 463,907 | 85,791 | 276,492 | 284,371 |
| Mn_LS (g/mol) | 27,617 | 14,563 | 24,995 | 21,955 |
| Mw_LS (g/mol) | 174,260 | 36,154 | 95,374 | 100,539 |
| Mz_LS (g/mol) | 1,434,765 | 78,146 | 315,225 | 579,821 |
| $g'_{vis}$ | 0.513 | 0.88 | 0.718 | 0.696 |
| I2 (dg/min) | <0.1 | 81.6 | 1.1 | 1.8 |
| I21 (dg/min) | 29.4 | | 58.9 | 93.6 |
| MIR | | | 53.6 | 50.9 |
| Complex viscosity @ 0.01 rad/sec (Pa · s) | 43128 | 2497 | 22262 | 12201 |
| Complex viscosity @ 398 rad/sec (Pa · s) | 232 | 89 | 376 | 265 |
| Complex viscosity @ 100 rad/sec (Pa · s) | 521.5 | 134.2 | 842.8 | 569.6 |
| Complex viscosity @ 0.1 rad/sec (Pa · s) | 20162.0 | 173.8 | 16847.5 | 9893.2 |
| Phase angle at G* = 100,000 Pa (degree) | | | 38.2 | 39.8 |

| Modifier # | 9 | 10 | 11 | 12 | 13 |
|---|---|---|---|---|---|
| Reaction temperature (° C.) | 130 | 130 | 130 | 130 | 130 |
| ethylene feed rate (slpm) | 8 | 8 | 8 | 8 | 8 |
| 1-hexene feed rate (g/min) | 2.5 | 2 | 4 | 3 | 3 |
| 1,9 decadiene feed rate (ml/min) | 0.0488 | 0.0488 | 0.024 | 0.0488 | 0.0488 |
| Catalyst | Catalyst B | Catalyst B | Catalyst C | Catalyst C | Catalyst C |
| Yield (gram/min) | 9.85 | 9.81 | 9.64 | 10.58 | 9.78 |
| Conversion (%) | 85.3% | 88.8% | 73.8% | 88% | 81.2 |
| Catalyst efficiency (g poly/g catalyst) | 537,182 | 535,000 | 825,905 | 906,944 | 1,048,784 |
| Ethylene content (wt %) | 87.2 | 88.7 | 85.1 | 83.8 | 87.4 |
| Tc (° C.) | 88.3 | 91.7 | 75.4 | 80.9 | 83.4 |
| Tm (° C.) | 103.7 | 106.7 | 95.0 | 97.7 | 102.7 |
| Heat of fusion (J/g) | 112.8 | 123.0 | 97.7 | 100.0 | 114.2 |
| Mn_DRI (g/mol) | 17,728 | 10,786 | 25,011 | 25,347 | 31,746 |
| Mw_DRI (g/mol) | 101,280 | 51,964 | 87,916 | 128,813 | 181,281 |
| Mz_DRI (g/mol) | 433,198 | 105,012 | 243,019 | 504,459 | 729,567 |
| Mn_LS (g/mol) | 21,483 | 22,247 | 27,775 | 39,460 | 71,110 |
| Mw_LS (g/mol) | 174,433 | 55,077 | 105,137 | 225,011 | 390,378 |
| Mz_LS (g/mol) | 1,336,719 | 116,596 | 398,179 | 1,350,319 | 2,248,953 |
| $g'_{vis}$ | 0.593 | 0.853 | 0.739 | 0.574 | 0.43 |
| I2 (dg/min) | 12.2 | 6.4 | 0.4 | <0.1 | <0.1 |
| I21 (dg/min) | 447.8 | 265.8 | 22.3 | 12.2 | 2.1 |
| MIR | 36.8 | 41.5 | 59.5 | | |
| Complex viscosity @ 0.01 rad/sec (Pa · s) | 1540 | 1810 | 75288 | 81589 | 436290 |
| Complex viscosity @ 398 rad/sec (Pa · s) | 193 | 256 | 549.3 | | |
| Complex viscosity @ 100 rad/sec (Pa · s) | 352.6 | 506.5 | 1265 | 899.1 | 1304 |
| Complex viscosity @ 0.1 rad/sec (Pa · s) | 1214.2 | 2494.0 | 43220 | 37949 | 122420 |
| Phase angle at G* = 100,000 Pa (degree) | | 44.0 | 36.5 | 33 | 28 |

The complex viscosity of the branched modifier polymer produced in Examples 5 to 10 was measured at a temperature of 190° C. over an angular frequency ranging from 0.01 to 398 rad/s. Significant shear thinning was observed. The ratio of the complex viscosity at a frequency of 0.01 rad/s to the complex viscosity at a frequency of 398 rad/s was 186, 59.2, and 8 for materials produced in Examples 5, 7, and 9 respectively. The shear thinning slope, the slope of the log (complex viscosity) versus log (frequency) curve, for material produced in Examples 5, 7, and 9 were −0.494, −0.385, and −0.196, respectively. Significant shear thinning was also reflected in the high MIR values. The shear thinning for material produced in Examples 1 to 11 are greater than $53.9*I2^{(-0.74)}$, where I2 is the melt index (190° C., 2.16 kg).

The transient extensional viscosity of the modifier produced in Example 5 was measured at a temperature of 150° C. and a strain rate of 1 sec$^{-1}$. A strain hardening ratio of 7.3 was observed.

A melt strength value of 36.6 cN was observed for the modifier produced in Example 5.

Figure 4:
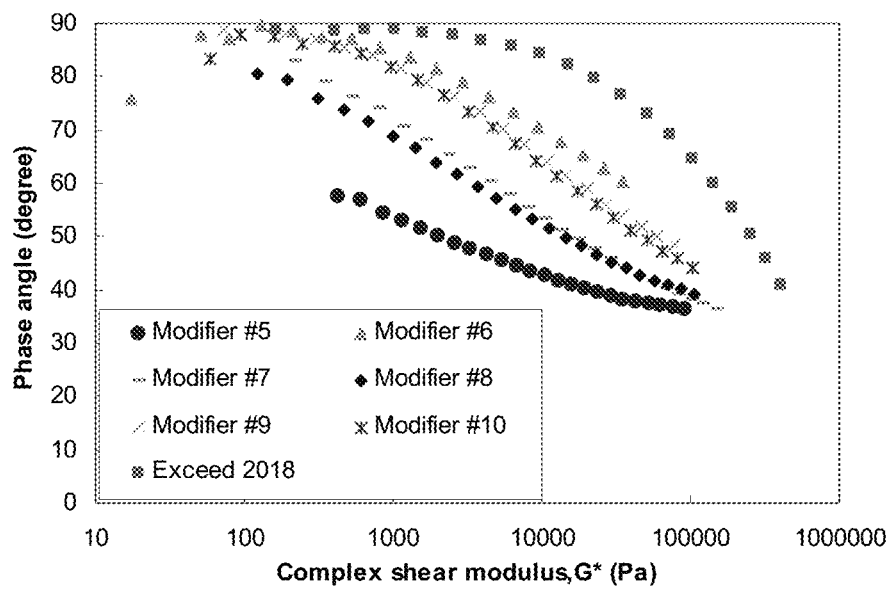
FIG. 4 is a Van Gurp-Palmen plot (phase angle vs. complex shear modulus) of branched polyethylene modifiers in Examples 5 to 10 and Exceed™ 2018 polyethylene.
Figure 5:
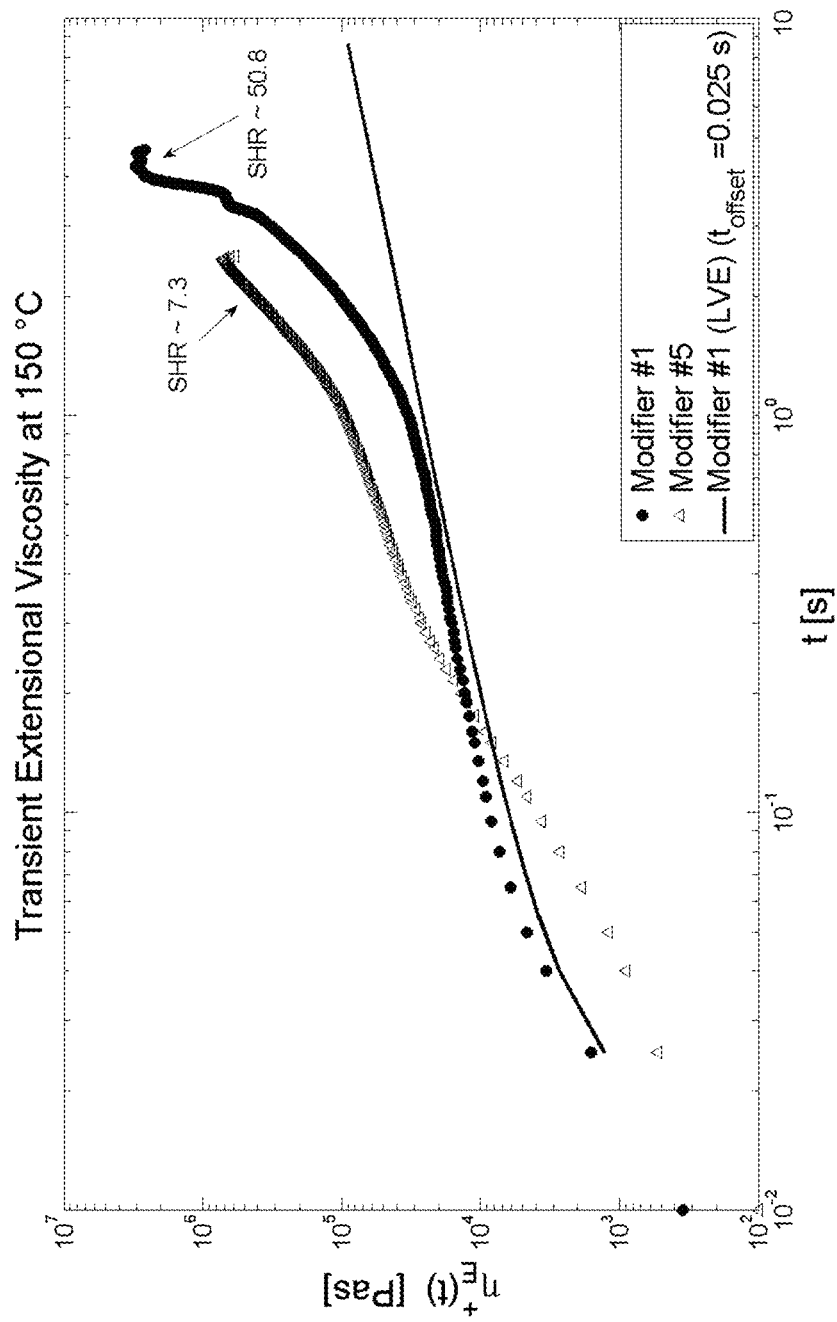
FIG. 5 depicts the transient uniaxial extensional viscosity of the branched polyethylene modifiers in Examples 1 and 5 as a function of time, showing strain hardening.
Figure 6:
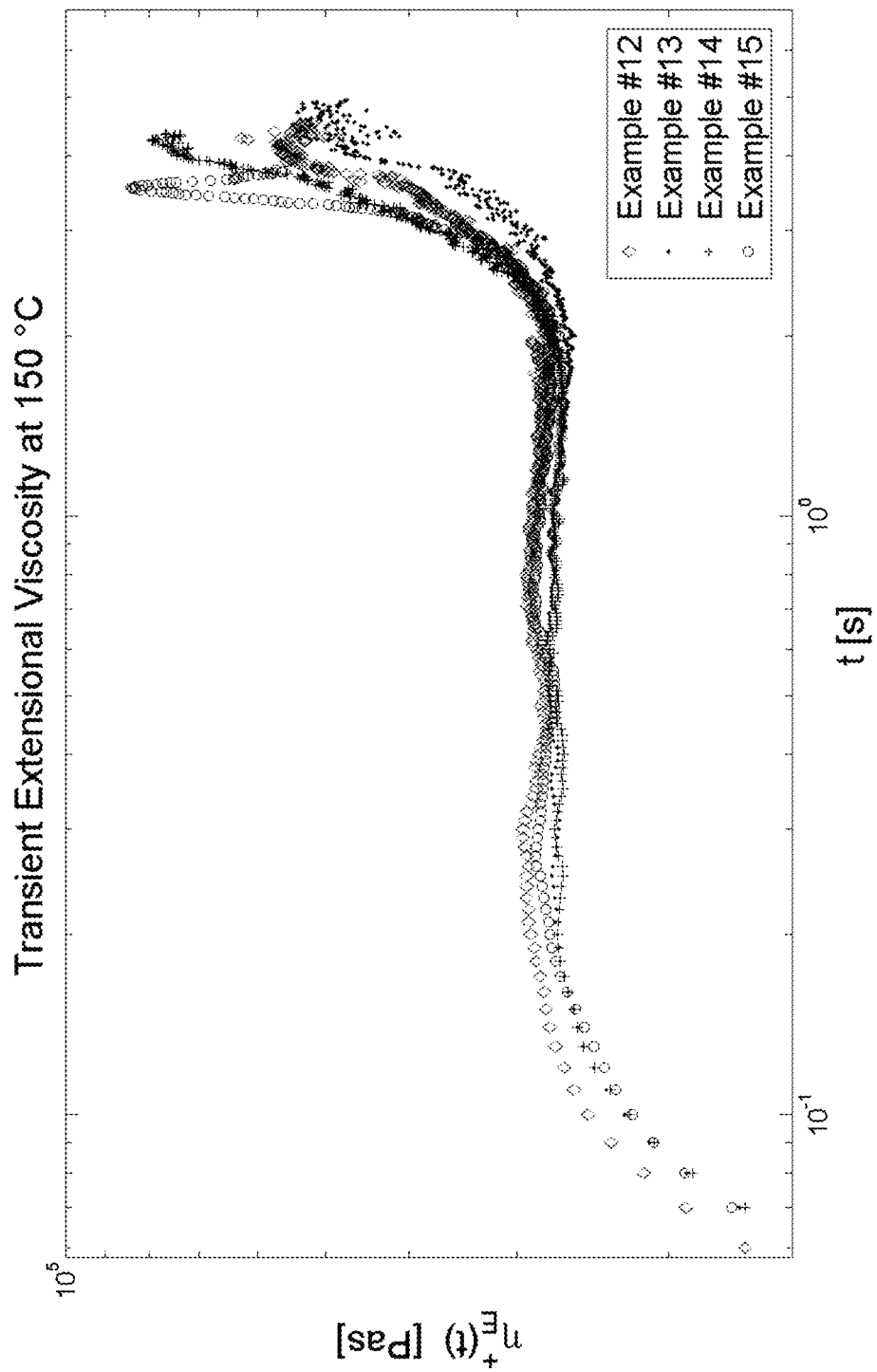
FIG. 6 depicts the transient uniaxial extensional viscosity of the inventive polymer composition in Examples 12 to 15 as a function of time.

The Van Gurp-Palmen plots of the branched modifiers produced in Examples 5 to 10 are shown in FIG. 4 in comparison with the Exceed™ Polyethylene 2018.

Exceed™ Polyethylene 2018 ("Exceed PE 2018"), an mLLDPE available from ExxonMobil Chemical Company (Houston, Tex.), has an MI of 2.0 dg/min and a density of 0.918 g/cm$^3$.

Exceed™ Polyethylene 1018 ("Exceed PE 2018"), is an mLLDPE (metallocene ethylene/hexene copolymer) available from ExxonMobil Chemical Company (Houston, Tex.), having an MI of 1.0 dg/min and a density of 0.918 g/cm$^3$.

mPE-5 is an mLLDPE produced following the methods described in U.S. Pat. No. 6,956,088 having a density of 0.917 g/cm$^3$ and melt index of 0.9 dg/min and melt flow ratio of 24.4.

Polyethylene LD071.LR™ is an LDPE available from ExxonMobil Chemical Company (Houston, Tex.) having an MI of 0.70 dg/min and a density of 0.924 g/cm$^3$.

Enable™ 20-10 polyethylene is a metallocene ethylene-hexene copolymer having a melt index of 1.0 dg/min (ASTM D 1238, 2.16 kg, 190° C.) and density of 0.920 g/cc.

POL-A is a metallocene ethylene-hexene copolymer having a melt index of 0.2 dg/min (ASTM D 1238, 2.16 kg, 190° C.), an MIR of 7, a peak melting temperature of 127° C. and a density of 0.940 g/cc.

The branched modifiers produced above were blended as a modifier with Exceed PE 2018. The compounding of the modifier with Exceed PE 2018 was carried out in a 1" Haake twin screw extruder with an L/D of 15 followed by a strand pelletizer. The branched modifier was pre-mixed in solid state with Exceed PE 2018 granules. A two-step compounding process was employed to ensure proper mixing. In the first compounding step, a blend of 60% of the modifier and 40% Exceed PE 2018 was produced in the twin screw extruder. The extrudate was pelletized using a strand pelletizer and used as a master batch. The master batch was then further diluted with additional ethylene polymer to produce the inventive composition with desired concentration of branched additives in the second compounding step. An antioxidant package was added into all the compounded compositions. The antioxidant consists of 0.05 wt % of Irganox™ 1076 (available from Ciba Specialty Chemicals Corporation, Tarrytown, N.Y.), 0.2 wt % of Weston™ 399 (available from Chemtura) and 0.08 wt % of Dynamar™ FX592DA (available from Dyneon LLC, Oakdale, Minn.). The concentration is the weight percent of the final blend.

The compounding extrusion conditions are listed below.

| Zone #1 | 180° C. |
|---|---|
| Zone #2 | 185° C. |
| Zone #3 | 190° C. |
| Die (Zone #5) | 195° C. |
| Extruder Speed (rpm) | 55 |

Examples 12 to 15

All of the blend compositions for Examples 12 to 15 were compounded with the branched modifier and Exceed PE 2018 according the procedure described above and contain the antioxidant package (0.33 wt %) described above.

TABLE 4

| Example # | 12 | 13 | 14 | 15 |
|---|---|---|---|---|
| Exceed PE 2018 (wt %) | 94.67 | 98.67 | 96.67 | 94.67 |
| Modifier # | Modifier #1 | Modifier #5 | Modifier #5 | Modifier #5 |
| Modifier (wt %) | 5 | 1 | 3 | 5 |

TABLE 4-continued

| Example # | 12 | 13 | 14 | 15 |
|---|---|---|---|---|
| Melt strength (cN) | 3.19 | 1.42 | 1.77 | 2.82 |
| Strain hardening ratio | 1.7 | 1.5 | 2.7 | 2.6 |
| Tc (° C.) | 106.2 | | | 103.0 |
| Tm (° C.) | 120.0 | | | 117.3 |

The complex viscosity profile of Example 15 is similar to that of Exceed™ 2018 polyethylene over an angular frequency range from 0.01 to 398 rad/sec at a temperature of 190° C. No significant viscosity change was observed when 5 wt % of the branched modifier #5 was blended with Exceed™ 2018 polyethylene.

Strain hardening was observed for all the polyethylene compositions produced in Examples 12 to 15. The thermal properties of the polyethylene compositions in the Examples 12 and 15 were measured using DSC. The crystallization peak and melting peak from DSC for Example #15 is almost overlapped with the peaks of Exceed 2018™ polyethylene. For Example #12, a two-hump crystallization peak was observed. Both the Tc and Tm are higher than that for Exceed 2018™ polyethylene.

Some of the inventive compositions were tested for film applications. Blown films were made using Haake Rheomex 252P single screw extruder in connection with a Brabender blown film die. The line contains a 1" single screw Haake extruder and a 1" mono-layer blown film die. The screw is a 3:1 compression ratio metering screw with a Maddock type mixing section before the metering section. The die gap is 0.022 mm. The extrusion die is also equipped with a cooling air ring on the outside of the die. The air ring is used to blow the air onto the film bubble to solidify the film. There is an air orifice in the center of the die to provide air to inflate the bubble. The line also contains two take-up nip rollers to pick up and collapse the film bubble. The film has 1.5 mil gauge and 2.8 bubble blow-up ratio (BUR). The film bubble BUR and gauge are achieved by adjusting extruder speed, take-up speed and amount of air in the bubble. The specified process conditions are listed in the table below.

| Extrusion condition | Unit | Set point |
|---|---|---|
| Zone #1 temperature | ° C. | 190 |
| Zone #2 temperature | ° C. | 195 |
| Zone #3 temperature | ° C. | 190 |
| Die (Zone #5) temperature | ° C. | 185 |
| Extruder speed | Rpm | 33 |
| Line speed | ft/min | 5.9 |
| Film gauge | Mil | 1.5 |
| Layflat | In | 4.4 |

Tables 5 and 6 provide some properties of the films produced from the inventive composition. All film compositions contain 0.33 wt % of the antioxidant package described above, 5 wt % of modifier and 94.67 wt % of Exceed PE 2018 unless noted otherwise. Films with 100% Exceed PE 2018 and 5 wt % of LD071.LR are comparative. All four modifier films (F01, F02, F03 and F04) exhibit significant improved haze property vs control Exceed 2018 (F06.) The haze level for these four modifier films is similar to 5% LD071.LR film. Samples (F01, F02 and F04) also exhibit the improved blown film processability characterized as TD film gauge coefficient of variation in comparison to Exceed 2018. The processability improvement for the modifier samples of F01, F02, and F04 are similar to that of 5% LD071.LR.

TABLE 5

Summary of film properties

| Example # | F01 | F02 | F03 | F04 | F05 | F06 |
|---|---|---|---|---|---|---|
| Exceed PE 2018 | 94.67 wt % | 94.67 wt % | 94.67 wt % | 94.67 wt % | 94.67 wt % | 99.67 wt % |
| Modifier # | 1 (5 wt %) | 2 (5 wt %) | 3 (5 wt %) | 4 (5 wt %) | LD071.LR (5 wt %) | none |
| *1% Secant (psi)* | | | | | | |
| MD | 31,946 | 29197 | 27319 | 28634 | 28,940 | 24225 |
| TD | 33,323 | 28580 | 28540 | 27579 | 28,503 | 25273 |
| *Tensile Yield Strength(psi)* | | | | | | |
| MD | | 1344 | 1482 | 1422 | 1,304 | 1180 |
| TD | | 1467 | 1428 | 1480 | 1,369 | 1332 |
| *Elongation @ Yield (%)* | | | | | | |
| MD | | 6 | 7 | 7 | 6 | 5.5 |
| TD | | 8 | 6 | 7 | 6 | 6.5 |
| *Tensile Strength (psi)* | | | | | | |
| MD | | 7219 | 7901 | 7421 | 7,564 | 7752 |
| TD | | 7008 | 7572 | 7482 | 7,326 | 8155 |
| *Elongation @ Break (%)* | | | | | | |
| MD | | 641 | 649 | 640 | 697 | 682 |
| TD | | 637 | 652 | 649 | 664 | 682 |
| *Elmendorf Tear* | | | | | | |
| MD (gms/mil) | 281 | 320 | 347 | 327 | 259 | 349 |
| TD (gms/mil) | | 447 | 458 | 468 | | 437 |
| Total Haze (%) | 16 | 17.7 | 16.0 | 16.2 | 17 | 48.2 |
| Dart drop (gms/mil) | 246 | 225 | 210 | 263 | 230 | 329 |
| Gauge COV | 7.9% | 5.4% | 15.7% | 6.8% | 7.1% | 11.6% |
| Averaged die pressure (psi). | 2875 | 2906 | 3007 | 3015 | 2933 | 3007 |
| Averaged motor load (N-m). | 43.5 | 40.9 | 45.2 | 45.0 | 36.5 | 45.6 |

TABLE 6

Summary of film properties

| Example # | F07 | F08 | F9 | F10 |
|---|---|---|---|---|
| Exceed PE 2018 | 94.67 wt % | 94.67 wt % | 94.67 wt % | 94.67 wt % |
| Modifier # | 7 (5 wt %) | 8 (5 wt %) | 10 (5 wt %) | 9 (5 wt %) |
| *1% Secant (psi)* | | | | |
| MD | 24373 | 24956 | 22620 | 24007 |
| TD | 23660 | 24158 | 22256 | 21105 |
| *Tensile Yield Strength(psi)* | | | | |
| MD | 1250 | 1294 | 1184 | 1207 |
| TD | 1303 | 1312 | 1257 | 1198 |
| *Elongation @ Yield (%)* | | | | |
| MD | 8 | 6 | 7 | 7 |
| TD | 6 | 6 | 7 | 7 |
| *Tensile Strength (psi)* | | | | |
| MD | 7398 | 8082 | 7385 | 7420 |
| TD | 7637 | 7428 | 7148 | 7389 |
| *Elongation @ Break (%)* | | | | |
| MD | 671 | 671 | 655 | 665 |
| TD | 652 | 658 | 651 | 667 |
| *Elmendorf Tear* | | | | |
| MD (gms/mil) | 361 | 338 | 368 | 351 |
| TD (gms/mil) | 416 | 427 | 438 | 431 |
| Total Haze (%) | 39.3 | 14.6 | 40.1 | 38.3 |
| Dart drop (gms/mil) | 337 | 229 | 299 | 386 |
| Gauge COV | 10.5% | 13.3% | 10.5% | 13.3% |
| Averaged die pressure (psi) | 2934 | 2982 | 3037 | 3031 |
| Averaged motor load (N-m). | 42.0 | 41.9 | 44.0 | 43.5 |

Table 7 summarizes the film properties for the inventive composition of the branched modifier produced in Example #5 and Exceed PE 2018. All of the compositions contain 0.33 wt % of the antioxidant package. The concentration of the modifier produced in Example #5 is listed in the table. Significant improvements in haze were observed for the films. F13, F14, and F15 with 1%, 3%, and 5% modifier were produced in Example 5. The total haze is reduced from 48.2% for Exceed 2018 film to 10.7% of 1% modifier and 7.3% for 5% modifier samples. The haze values for the samples with 1-5% modifier produced in Example 5 is also considerably lower than 5% LD071.LR sample (F12.) The blown film processability, which is characterized by the TD gauge coefficient of variation (COV,) is significantly improved (lower COV) for 1%-5% modifier samples in comparison to Exceed PE 2018. Meanwhile the processability for the modifier addition samples is also superior to the blend with 5% LD071.LR. The film with 1% modifier (F13) retains the dart impact property of Exceed PE 2018, while LD071.LR film (F12) shows a substantially reduced dart impact.

TABLE 7

Summary of film properties

|  | Unit | F11 | F12 | F13 | F14 | F15 |
|---|---|---|---|---|---|---|
| Film Composition |  | Exceed 2018 PE (100%) | 5 wt % LD071.LR | 1 wt % of 5 | 3 wt % of 5 | 5 wt % of 5 |
| 1% Secant-MD | psi | 24,225 | 28,940 | 25,406 | 26,088 | 27,811 |
| 1% Secant-TD | psi | 25,273 | 28,503 | 28,876 | 32,070 | 30,512 |
| Elmendorf Tear-MD | g/mil | 349 | 259 | 341 | 320 | 314 |
| Dart Drop, | g/mil | 329 | 230 | 345 | 205 | 206 |
| Total Haze | % | 48.2 | 17 | 10.7 | 7.5 | 7.3 |
| Gauge COV |  | 11.6% | 7.1% | 2.4% | 4.8% | 4.6% |
| Averaged die Pressure (psi) | psi | 3007 | 2933 | 3117 | 3026 | 2899 |
| Extruder Motor Load | N-m | 45.6 | 36.5 | 45.6 | 44.3 | 41.1 |

Example 16

All of the blend compositions for Example 16 were compounded with branched modifiers produced in examples #12 and #13 and various ethylene polymers listed in Table 8 according to the procedure described above and contain the antioxidant package (0.33 wt %) described above. The compounded blends were tested for film application. Blown films were made on a 2.5" Gloucester blown film. The line is equipped with a 2.5" extruder and 6" mono-layer circular blown film die. The extruder has 30 L/D length and has a Barrier-Maddock screw. The die gap is 60 mil. The extrusion die is also equipped with a Future Design dual lip cooling air ring on the outside of the die. The air ring is used to blow the air onto the film bubble to solidify the film. There is an air orifice in the center of the die to provide air to inflate the bubble. The line also contains the bubble cage, up-nip and secondary nip devices and collapsing frame to collapse the film bubble. The film has 1.0 mil gauge and 2.5 bubble blow-up ratio (BUR). The film bubble BUR and gauge are achieved by adjusting extruder speed, take-up speed and amount of air in the bubble. The specified process conditions are listed in the table below.

| Parameters | Unit | Set Point |
|---|---|---|
| Set Point - Barrel #1 | ° C. | 310 |
| Set Point - Barrel #2 | ° C. | 410 |
| Set Point - Barrel #3 | ° C. | 375 |
| Set Point - Barrel #4 | ° C. | 350 |
| Set Point - Barrel #5 | ° C. | 350 |
| Screen Changer | ° C. | 390 |
| Adapter | ° C. | 390 |
| Rotator | ° C. | 390 |
| Feed Throat | ° C. | 75 |
| Lower Die | ° C. | 390 |
| Upper Die | ° C. | 390 |
| Inside Die | ° C. | 390 |
| Upper Rotator | ° C. | 75 |
| Standard Rate | lbs/hr | 188 |
| Standard Line Speed | ft/min | 166 |
| Film Gauge | mil | 1 |
| Bubble Blow Up Ratio (BUR) |  | 2.5 |
| Film layflat | in | 23.6 |
| Die Gap | mil | 60 |

The film compositions and characterization data are reported in Table 8.

TABLE 8

Summary of film composition and properties

|  | Example # | | | | |
|---|---|---|---|---|---|
|  | F16 | F17 | F18 | F19 | F20 |
| Film composition | | | | | |
| Ethylene polymer | | | | | |
|  | Exceed PE2018 | Exceed PE2018 | Exceed PE2018 | Exceed PE1018 | Exceed PE1018 |
| Ethylene polymer (wt %) | 99.67 | 94.67 | 96.67 | 99.67 | 94.67 |
| Branched modifier # | none | LD071.LR | Modifier #13 | none | LD071.LR |
| Branched modifier (wt %) |  | 5 | 3 |  | 5 |
| Maximum rate | | | | | |
| Maximum line speed (ft/min) | 166 | 209.5 | 267.2 | 200 | 208 |
| Maximum extrusion rate (lb/hr) | 188 | 247 | 302 | 226 | 235 |
| Maximum line speed (%) | 100 | 126 | 161 | 120 | 125 |
| Die factor (lb/hr-in-c) | 10.0 | 13.1 | 16.0 | 12.0 | 12.5 |

TABLE 8-continued

Summary of film composition and properties

1% secant (psi)

| | | | | | |
|---|---|---|---|---|---|
| MD | 23,216 | 25,194 | 26,552 | 24,049 | 28,503 |
| TD | 25,870 | 31,246 | 31,893 | 28,506 | 35,317 |

Tensile properties
Yield strength (psi)

| | | | | | |
|---|---|---|---|---|---|
| MD | 1,162 | 1,353 | 1,285 | 1,361 | 1,421 |
| TD | 1,219 | 1,453 | 1,416 | 1,374 | 1,603 |

Elongation @ yield (%)

| | | | | | |
|---|---|---|---|---|---|
| MD | 6.2 | 7.5 | 6.7 | 7.1 | 6.1 |
| TD | 5.9 | 7.9 | 8.5 | 6.6 | 7.2 |

Tensile strength (psi)

| | | | | | |
|---|---|---|---|---|---|
| MD | 7,168 | 7,622 | 6,471 | 9,473 | 9,572 |
| TD | 6,980 | 7,135 | 7,111 | 8,308 | 8,052 |

Elongation @ break (%)

| | | | | | |
|---|---|---|---|---|---|
| MD | 568 | 568 | 510 | 512 | 521 |
| TD | 697 | 706 | 703 | 665 | 662 |

Elmendorf tear (gms/mil)

| | | | | | |
|---|---|---|---|---|---|
| MD | 336 | 142 | 193 | 250 | 136 |
| TD | 443 | 510 | 451 | 430 | 522 |
| Haze (%) | 47.1 | 4.2 | 4.1 | 16.5 | 2.4 |

Puncture

| | | | | | |
|---|---|---|---|---|---|
| Peak force (lbs/mil) | 7.0 | 9.6 | 9.0 | 8.0 | 8.9 |
| Break energy (in-lbs/mil) | 18.68 | 27.52 | 25.09 | 21.2 | 19.2 |
| Dart drop (gms/mil) | 682 | 412 | 426 | 911 | 647 |

Gauge (mils)

| | | | | | |
|---|---|---|---|---|---|
| Average | 1.00 | 1.00 | 1.01 | 1.00 | 1.00 |
| Low | 0.90 | 0.87 | 0.93 | 0.93 | 0.93 |
| High | 1.12 | 1.17 | 1.12 | 1.08 | 1.11 |

| | Example # | | | |
|---|---|---|---|---|
| | F21 | F22 | F23 | F24 |

Film composition

Ethylene polymer

| | | | | |
|---|---|---|---|---|
| | Exceed PE1018 | mPE-5 | mPE-5 | mPE-5 |
| Ethylene polymer (wt %) | 97.67 | 99.67 | 94.67 | 97.67 |
| Branched modifier # | Modifier #12 | none | LD071.LR | Modifier #12 |
| Branched modifier (wt %) | 9 | | 5 | 2 |

Maximum rate

| | | | | |
|---|---|---|---|---|
| Maximum line speed (ft/min) | 208 | 207 | 206 | 241 |
| Maximum extrusion rate (lb/hr) | 235 | 234 | 233 | 273 |
| Maximum line speed (%) | 125 | 124 | 124 | 145 |
| Die factor (lb/hr-in-c) | 12.5 | 12.4 | 12.4 | 14.5 |

1% secant (psi)

| | | | | |
|---|---|---|---|---|
| MD | 29,212 | 25,348 | 29,021 | 27,477 |
| TD | 34,717 | 29,900 | 38,739 | 34,952 |

Tensile properties
Yield Strength (psi)

| | | | | |
|---|---|---|---|---|
| MD | 1,461 | 1,304 | 1,389 | 1,365 |
| TD | 1,574 | 1,442 | 1,626 | 1,472 |

Elongation @ yield (%)

| | | | | |
|---|---|---|---|---|
| MD | 6.6 | 6.8 | 6.2 | 6.3 |
| TD | 8.1 | 7.6 | 6.6 | 6.3 |

Tensile strength (psi)

| | | | | |
|---|---|---|---|---|
| MD | 8,462 | 9,708 | 8.738 | 8,358 |
| TD | 8,911 | 7,993 | 7.574 | 8,490 |

Elongation @ break (%)

| | | | | |
|---|---|---|---|---|
| MD | 419 | 420 | 413 | 382 |
| TD | 694 | 661 | 638 | 675 |

TABLE 8-continued

Summary of film composition and properties

Elmendorf tear (gms/mil)

| | | | | |
|---|---|---|---|---|
| MD | 165 | 302 | 152 | 177 |
| TD | 491 | 460 | 513 | 554 |
| Haze (%) | 2.4 | 10.0 | 3.7 | 4.3 |
| Puncture | | | | |
| Peak force (lbs/mil) | 9.1 | 8.4 | 8.3 | 8.4 |
| Break energy (in-lbs/mil) | 23.8 | 21.1 | 17.7 | 20.7 |
| Dart drop (gms/mil) | 746 | ≥1,359 | 1,017 | 1,037 |
| Gauge (mils) | | | | |
| Average | 1.02 | 1.01 | 1.02 | 1.02 |
| Low | 0.94 | 0.94 | 0.89 | 0.91 |
| High | 1.12 | 1.10 | 1.11 | 1.09 |

The extrusion rates in Examples F18, F21, and F24 were increased while maintaining the film gauge and blow-up ratio during the film blowing process as compared with the extrusion rate of ethylene polymers without branched modifier. The maximum extrusion rate is determined to be the extrusion rate right before the film bubble becomes unstable and the normal operation can no-longer be achieved. Likewise, the maximum line speed is determined to be the line speed right before the film bubble becomes unstable and the normal operation can no-longer be achieved. The maximum line speed (%) is ratio of the maximum line speed of a blend to the maximum line speed of the same ethylene polymer used in the blend. Significant improvements in haze were observed for the films with branched modifier. The blown film processability, which is characterized by the maximum line speed, is significantly improved. Meanwhile the processability for the blends with branched modifier is also superior to the blend with 5% LD071.LR.

For reference purposes the following data is included.

TABLE 9A

Selected Physical and Mechanical Properties of ZN-LLDPE[#] and m-LLDPE films.[*]

| Resin | Comonomer Type/Loading (mol %) | MI (g/10 min) | Density (g/cm$^3$) | MD 1% Secant Modulus (MPa) | MD Yield Stress (MPa) | MD Ultimate Properties (%) | MD Ultimate Properties (MPa) |
|---|---|---|---|---|---|---|---|
| LL 1001[#] | C4/3.6 | 1.0 | 0.918 | 220 | 9.4 | 590 | 57.0 |
| LL 3001[#] | C6/3.6 | 1.0 | 0.917 | 200 | 9.0 | 500 | 58.0 |
| Exact 4056* | C6/>3.5 | 2.2 | 0.833 | 30 | 3.5 | 390 | 64.3 |
| Exact 4151* | C6 > 3.5 | 2.2 | 0.889 | 56 | 5.4 | 400 | 84.8 |
| Exceed 1012* | C6/3.5 | 1.0 | 0.912 | 131 | 7.4 | 500 | 72.6 |
| Exceed 1018* | C6/1.5 | 1.0 | 0.918 | 183 | 9.2 | 540 | 74.5 |
| Exceed 1023* | C6/<1.5 | 1.0 | 0.923 | 240 | 11.0 | 542.0 | 65.0 |

*Data in Tables 9A and 9B were taken from ExxonMobil's technical data sheets.

TABLE 9B

Selected Physical and Mechanic Properties of ZN-LLDPE[#] and m-LLDPE films.[*]

| Resin | MD Ultimate Strain/Stress Ratio | Elmendorf Tear MD (g/micron) | Elmendorf Tear TD (g/micron) | TD/MD Ratio | Dart Drop (g/micron)* |
|---|---|---|---|---|---|
| LL 1001[#] | 10.4 | 4.0 | 16.0 | — | 4.0 |
| LL 3001[#] | 8.6 | 17.3 | 17.3 | — | 5.5 |

TABLE 9B-continued

Selected Physical and Mechanic Properties of ZN-LLDPE[#] and m-LLDPE films.[*]

| Resin | MD Ultimate Strain/Stress Ratio | Elmendorf Tear MD (g/micron) | Elmendorf Tear TD (g/micron) | TD/MD Ratio | Dart Drop (g/micron)* |
|---|---|---|---|---|---|
| Exact 4056* | 6.1 | 2.2 | 5.3 | — | 32.4 |
| Exact 4151* | 4.7 | 3.5 | 11.0 | — | 37.0 |
| Exceed 1012* | 6.9 | 8.3 | 13.0 | 1.6 | 32.2 |
| Exceed 1018* | 7.2 | 11.0 | 18.1 | 1.6 | 22.4 |
| Exceed 1023* | 8.3 | 7.0 | 21.1 | 3.0 | 7.4 |

*Data in Tables 9A and 9B were taken from ExxonMobil's technical data sheets.

Example 17

Unless otherwise indicated, all reactions in the following examples were performed using as-received starting materials without any purification.

Two branched polyethylene modifiers were made according to the procedure described in Examples 5-13. The reaction conditions and characterization data are reported in Table 15.

TABLE 15

| Modifier # | 14 | 15 |
|---|---|---|
| Polymerization temperature (° C.) | 130 | 130 |
| Ethylene feed rate (SLPM) | 8 | 8 |
| 1-hexene feed rate (g/min) | 1.8 | 1.8 |
| 1,9 decadiene feed rate (ml/min) | 0.049 | 0.024 |
| Catalyst | Catalyst C | Catalyst C |
| Isohexane feed rate (g/min) | 54 | 54 |
| Polymer made (gram) | 2378.1 | 377.4 |
| Yield (gram/min) | 9.51 | 9.435 |
| Conversion (%) | 87.7% | 87.0% |
| Catalyst efficiency (g poly/g catalyst) | 815,349 | 808,714 |
| 1-hexene content (wt %) | 10.8 | 11.3 |
| Tc (° C.) | 90.5 | 85.9 |
| Tm (° C.) | 113.3 | 108.8 |
| Heat of fusion (J/g) | 123.0 | 128.7 |
| Mn_DRI (g/mol) | 32,033 | 32,339 |
| Mw_DRI (g/mol) | 197,817 | 149,504 |
| Mz_DRI (g/mol) | 734,947 | 489,096 |
| Mn_LS (g/mol) | 80,867 | 45,787 |
| Mw_LS (g/mol) | 397,764 | 215,440 |
| Mz_LS (g/mol) | 2,088,097 | 982,314 |
| g'vis | 0.5 | 0.64 |
| I2 (dg/min) | <0.1 | <0.1 |
| I21 (dg/min) | 0.04 | 0.43 |
| Complex viscosity at 0.1 rad/sec (Pa · s) | 481000 | 316363 |
| Complex viscosity at 100 rad/sec (Pa · s) | 2218 | 2310.3 |
| Complex viscosity at 0.158 rad/sec (Pa · s) | 325916 | |
| Complex viscosity at 1 rad/sec (Pa · s) | 77136 | |
| Phase angle at complex modulus G* = 100,000 Pa (degrees) | 20.7 | 24 |

The complex viscosity of the branched modifier polymer produced in Modifier #14 and #15 was measured at a temperature of 190° C. over an angular frequency ranging from 0.01 to 398 rad/s. Significant shear thinning was observed. The ratio of the complex viscosity at a frequency of 0.1 rad/s to the complex viscosity at a frequency of 100 rad/s was 216.9 and 186.5 for materials produced in Modifier #14 and #15 respectively.

The transient extensional viscosity of the modifier produced in Modifier #14 and #15 was measured at a temperature of 150° C. and a strain rate of 1 sec$^{-1}$.

Polyethylene Blends

The branched polyethylene modifiers and matrix polyethylene (Exceed™ 2018 PE, Enable™ 20-10 polyethylene, or POL-A) were compounded in a 1" Haake twin screw extruder with 0.05 wt % Irganox 1076™, 0.2 wt % Weston 399™ and 0.08 wt % of FX592DA™. The Haake twin screw extruder was set at 50 rpm and the melt temperature was targeted at 190° C.

Comparative blends with 5 wt % LDPE (ExxonMobil Chemical Company, Houston, Tex. LD071.LR™ PE, 0.924 g/cc, 0.70 dg/min, 190° C., 2.16 kg) and 0.05 wt % Irganox 1076™, 0.2 wt % Weston 399™ and 0.08 wt % of FX592DA™ were also prepared under the conditions described above (referred to as Blends B, H, I, J, K and N), except that the extruder temperatures were 190° C., 195° C., 190° C., and 185° C., respectively. The blend compositions and film properties are listed in Tables 10, 11, and 12.

TABLE 10

| | Blend A | Blend B | Blend C | Blend D | Blend E |
|---|---|---|---|---|---|
| Exceed ™ LLDPE 1018 | 100 | 95 | 95 | 95 | 90 |
| LD071.LR (wt %) | 0 | 5 | | | |
| Modifier 14 (wt %) | | | 5 | | |
| Modifier 15 (wt %) | | | | 5 | 10 |
| Draw Ratio | 13.7 | 15.7 | 7.6 | 8.5 | 8.9 |
| Melt strength (cN) | 3.2 | 4.8 | 30.4 | 9.6 | 20.3 |
| Complex viscosity at 1 rad/s (Pa · s) | 6446 | 6676 | 7731 | 8076 | 8076 |
| Complex viscosity at 0.1 rad/s (Pa · s) | 6839 | | | | |
| Complex viscosity at 0.158 rad/s (Pa · s) | 6839 | 7497 | 6886 | | |
| Phase angle at complex modulus G* = 100,000 Pa (degrees) | 62 | | | | |
| Strain Hardening Ratio | | | 10.8 | | |

TABLE 11

| | Blend F | Blend G | Blend H | Blend I | Blend J | Blend K |
|---|---|---|---|---|---|---|
| POL-A | 100 | 95 | 95 | 90 | 80 | 70 |
| LD071.LR (wt %) | 0 | | 5 | 10 | 20 | 30 |
| Modifier 14 (wt %) | | 5 | | | | |
| Draw Ratio | 6.1 | 7.7 | 6.6 | 6.9 | 7.3 | 6.0 |
| Melt strength (cN) | 8.4 | 24.4 | 8.7 | 9.8 | 12.0 | 13.9 |
| Complex viscosity at 1 rad/s (Pa · s) | 24870 | 25595 | 22557 | | | |
| Complex viscosity at 0.1 rad/s (Pa · s) | 87088 | | | | | |
| Complex viscosity at 0.158 rad/s (Pa · s) | 67665 | 68592 | 60645 | | | |
| Phase angle at complex modulus G* = 100,000 Pa (degrees) | 42 | | | | | |
| Strain Hardening Ratio | | 4.6 | | | | |

TABLE 12

| | Blend L | Blend M | Blend N |
|---|---|---|---|
| Enable 20-10 | 100 | 95 | 95 |
| LD071.LR (wt %) | 0 | | 5 |
| Modifier 14 (wt %) | | 5 | |
| Draw Ratio | 19.2 | 8.2 | 14.2 |
| Melt strength (cN) | 3.5 | 15 | 3.9 |
| Complex viscosity at 1 rad/s (Pa · s) | 7195 | 8660 | 7804 |
| Complex viscosity at 0.1 rad/s (Pa · s) | 13511 | | |
| Complex viscosity at 0.158 rad/s (Pa · s) | 12076 | 15975 | 13484 |
| Phase angle at complex modulus G* = 100,000 Pa (degrees) | 50 | | |
| Strain Hardening Ratio | | 3.3 | |

All documents described herein are incorporated by reference herein for purposes of all jurisdictions where such practice is allowed, including any priority documents, related applications, and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

The invention claimed is:

1. A blend comprising:
   1) branched polyethylene modifier comprising at least 50 mol % ethylene, one or more $C_4$ to $C_{40}$ comonomers, and a polyene having at least two polymerizable bonds, wherein said branched polyethylene modifier has: a) a $g'_{vis}$ of 0.70 or less; b) an Mw of 100,000 g/mol or more; c) an Mw/Mn of 4.0 or more; d) a shear thinning ratio of 110 or more, e) a melt strength of 10 cN or more; f) a complex viscosity at 0.1 rad/sec at 190° C. of at least 130,000 Pa·s; and g) a phase angle of Z° or less where $Z=138.3G^{*(-0.142)}$, where G* is the complex modulus measured at 190° C., reported in Pascals, and further wherein the phase angle is taken at a G* value between 1,000 and 1,000,000 Pa;
   2) polyethylene having a density of 0.88 g/cc or more, a $g'_{vis}$ of 0.97 or more.

2. The blend of claim 1, wherein the complex viscosity at 0.1 rad/sec of the branched polyethylene modifier is at least 320% greater than the complex viscosity at 0.1 rad/sec of the polyethylene prior to combination with the branched polyethylene modifier.

3. The blend of claim 1, wherein the branched polyethylene modifier is present at 0.5 wt % to 10 wt %, based upon the weight of the blend.

4. The blend of claim 1, wherein the polyethylene comprises a copolymer of ethylene and one or more $C_3$ to $C_{20}$ alphaolefins and has an Mw of 20,000 to 1,000,000 g/mol.

5. The blend of claim 1, wherein the polyethylene has a density of 0.91 to 0.96 g/cm³.

6. The blend of claim 1, wherein the branched polyethylene modifier has a strain-hardening ratio of 1.5 or greater.

7. The blend of claim 1, wherein where the polyethylene has a $g'_{vis}$ of 0.975 or more.

8. A film comprising the blend of claim 1.

9. The blend of claim 1, wherein the branched polyethylene modifier has an Mw of 200,000 g/mol or more.

10. The blend of claim 1, wherein the blend has a melt strength at least 60% higher than the melt strength of the 2) polyethylene of the blend.

11. The blend of claim 1, wherein the blend has a melt strength at least 100% higher than the melt strength of the polyethylene prior to combination with the branched polyethylene modifier.

12. The blend of claim 1, wherein the blend has a melt strength ratio of T or more, where $T=1.6762[(\eta^*_{blend}$ minus $\eta^*_{matrix})$ divided by $(\eta^*_{matrix})]-5$, where $\eta^*_{blend}$ is the complex viscosity of the blend measured at 0.158 rad/sec and 190° C., and $\eta^*_{matrix}$ is the complex viscosity of the 2) polyethylene measured at 0.158 rad/sec and 190° C.; and the melt strength ratio is defined to be $[(MS_{blend}$ minus $MS_{matrix})$ divided by $(MS_{matrix})]$, where $MS_{blend}$ is the melt strength of the blend, $MS_{matrix}$ is the melt strength of the 2) polyethylene.

13. The blend of claim 1, wherein the blend has a strain hardening ratio of at least 50% higher than the strain hardening ratio of the 2) polyethylene of the blend.

14. The blend of claim 1, wherein the polyene is selected from the group consisting of: 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, tetrahydroindene, norbornadiene also known as bicyclo-(2.2.1)-hepta-2,5-diene, dicyclopentadiene, 5-vinyl-2-norbornene, 1,4-cyclohexadiene, 1,5-cyclooctadiene, and 1,7-cyclododecadiene.

15. The blend of claim 1, wherein the polyethylene has an Mw of 20,000 g/mol or more, wherein the melt strength ratio is Q or more, where $Q=0.0805[(\eta^*_{modifier}-\eta^*_{matrix})/(\eta^*_{matrix})]\pm0.5$, wherein $\eta^*_{modifier}$ is the complex viscosity of the modifier measured at 0.158 rad/sec and 190° C., and $\eta^*_{matrix}$ is the complex viscosity of the polyethylene measured at 0.158 rad/sec and 190° C.; and the melt strength ratio is defined to be $[(MS_{blend}-MS_{matrix})/(MS_{matrix})]$, where $MS_{blend}$ is the melt strength of the blend and $MS_{matrix}$ is the melt strength of the polyethylene.

16. The blend of claim 1, wherein the branched polyethylene modifier has a complex viscosity ratio of Y or more, where $Y=-0.27*(Log\ \eta^*_{matrix})+1.4$, and the complex viscosity ratio is defined to be $(Log\ \eta^*_{modifier}$ minus $Log\ \eta^*_{matrix})$ divided by $(Log\ \eta^*_{matrix})$, wherein $\eta^*_{modifier}$ is the complex viscosity of the modifier measured at 0.1 rad/sec and 190° C., and $\eta^*_{matrix}$ is the complex viscosity of the 2) polyethylene of the blend below measured at 0.1 rad/sec and 190° C.

* * * * *